(12) United States Patent
Cheng et al.

(10) Patent No.: US 11,233,652 B2
(45) Date of Patent: Jan. 25, 2022

(54) METHOD AND SYSTEM TO DERIVE A SESSION KEY TO SECURE AN INFORMATION EXCHANGE CHANNEL BETWEEN A HOST SYSTEM AND A DATA PROCESSING ACCELERATOR

(71) Applicants: Baidu USA LLC, Sunnyvale, CA (US); Baidu.com Times Technology (Beijing) Co., Ltd., Beijing (CN)

(72) Inventors: Yueqiang Cheng, Sunnyvale, CA (US); Yong Liu, Sunnyvale, CA (US); Tao Wei, Sunnyvale, CA (US); Jian Ouyang, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 459 days.

(21) Appl. No.: 16/316,011

(22) PCT Filed: Jan. 4, 2019

(86) PCT No.: PCT/CN2019/070401
§ 371 (c)(1),
(2) Date: Jan. 7, 2019

(87) PCT Pub. No.: WO2020/140260
PCT Pub. Date: Jul. 9, 2020

(65) Prior Publication Data
US 2021/0250174 A1    Aug. 12, 2021

(51) Int. Cl.
*H04L 29/06* (2006.01)
*H04L 9/32* (2006.01)
*H04L 9/08* (2006.01)

(52) U.S. Cl.
CPC .......... *H04L 9/3228* (2013.01); *H04L 9/0825* (2013.01); *H04L 9/0861* (2013.01); *H04L 9/3297* (2013.01)

(58) Field of Classification Search
CPC ... H04L 9/3228; H04L 9/0825; H04L 9/3297; H04L 9/0861; G06F 21/606
See application file for complete search history.

(56) References Cited

U.S. PATENT DOCUMENTS

| 5,778,237 A | 7/1998 | Mitsuyoshi et al. |
| 5,870,467 A | 2/1999 | Imai et al. |

(Continued)

FOREIGN PATENT DOCUMENTS

| CN | 104283860 A | 1/2015 |
| WO | 2020140259 A1 | 7/2020 |

*Primary Examiner* — Thaddeus J Plecha
(74) *Attorney, Agent, or Firm* — Womble Bond Dickinson (US) LLP

(57) ABSTRACT

According to one embodiment, in response to receiving a temporary public key (PK_d) from a data processing (DP) accelerator, a system generates a first nonce (nc) at the host system, where the DP accelerator is coupled to the host system over a bus. The system transmits a request to create a session key from the host system to the DP accelerator, the request including a host public key (PK_O) and the first nonce. The system receives a second nonce (ns) from the DP accelerator, where the second nonce is encrypted using the host public key and a temporary private key (SK_d) corresponding to the temporary public key. The system generates a first session key based on the first nonce and the second nonce, which is utilized to encrypt or decrypt subsequent data exchanges between the host system and the DP accelerator.

21 Claims, 37 Drawing Sheets

(56) References Cited

U.S. PATENT DOCUMENTS

| | | | |
|---|---|---|---|
| 6,704,867 B1 | 3/2004 | Cordery | |
| 7,941,662 B2 | 5/2011 | Tardo et al. | |
| 8,689,000 B2 | 4/2014 | Chen et al. | |
| 9,645,951 B1 | 5/2017 | Wang et al. | |
| 9,735,962 B1 | 8/2017 | Yang et al. | |
| 10,320,569 B1 | 6/2019 | Wentz et al. | |
| 10,977,104 B2 | 4/2021 | Chiou et al. | |
| 2002/0184217 A1 | 12/2002 | Bisbee et al. | |
| 2003/0041118 A1 | 2/2003 | Elnozahy et al. | |
| 2003/0135744 A1 | 7/2003 | Almeida | |
| 2003/0140241 A1 | 7/2003 | England et al. | |
| 2003/0226018 A1 | 12/2003 | Tardo et al. | |
| 2004/0005061 A1 | 1/2004 | Buer et al. | |
| 2004/0078568 A1 | 4/2004 | Pham et al. | |
| 2007/0038853 A1 | 2/2007 | Day et al. | |
| 2007/0067633 A1 | 3/2007 | Pauly et al. | |
| 2008/0027602 A1 | 1/2008 | Yeap et al. | |
| 2008/0181399 A1 | 7/2008 | Weise et al. | |
| 2008/0281908 A1 | 11/2008 | Mccanne et al. | |
| 2009/0172411 A1* | 7/2009 | Kershaw | G06F 21/53 713/189 |
| 2011/0035556 A1 | 2/2011 | Aho et al. | |
| 2011/0295967 A1* | 12/2011 | Wang | G06F 3/0646 709/212 |
| 2011/0296440 A1 | 12/2011 | Launch et al. | |
| 2013/0055004 A1 | 2/2013 | Koniaris et al. | |
| 2013/0246679 A1 | 9/2013 | Miyoshi | |
| 2014/0109170 A1 | 4/2014 | Nemiroff et al. | |
| 2014/0156989 A1* | 6/2014 | Lalwani | H04W 12/0431 713/155 |
| 2015/0160950 A1 | 6/2015 | Wang | |
| 2016/0043869 A1 | 2/2016 | Smith et al. | |
| 2016/0065362 A1* | 3/2016 | Choyi | H04L 9/0847 380/279 |
| 2016/0191248 A1 | 6/2016 | Johnston et al. | |
| 2016/0254906 A1 | 9/2016 | Castellucci et al. | |
| 2016/0330112 A1 | 11/2016 | Raindel et al. | |
| 2016/0350093 A1 | 12/2016 | Walker et al. | |
| 2016/0364921 A1 | 12/2016 | Iyoda et al. | |
| 2016/0373416 A1 | 12/2016 | Burger et al. | |
| 2017/0109533 A1 | 4/2017 | Shah et al. | |
| 2017/0155378 A1 | 6/2017 | Hu et al. | |
| 2017/0357496 A1 | 12/2017 | Smith et al. | |
| 2018/0026800 A1 | 1/2018 | Munoz et al. | |
| 2018/0027062 A1 | 1/2018 | Bernat et al. | |
| 2018/0114013 A1 | 4/2018 | Sood et al. | |
| 2018/0145828 A1* | 5/2018 | Coon | H04L 63/08 |
| 2018/0232266 A1 | 8/2018 | Ikeda et al. | |
| 2018/0278588 A1 | 9/2018 | Cela et al. | |
| 2018/0307499 A1 | 10/2018 | Chen et al. | |
| 2018/0365426 A1 | 12/2018 | Callaghan | |
| 2019/0018800 A1 | 1/2019 | Jayasena et al. | |
| 2019/0023146 A1 | 1/2019 | Lee et al. | |
| 2019/0044724 A1 | 2/2019 | Sood et al. | |
| 2019/0081962 A1 | 3/2019 | Teal | |
| 2019/0089530 A1 | 3/2019 | Wu et al. | |
| 2019/0132136 A1 | 5/2019 | Scarlata et al. | |
| 2019/0213029 A1 | 7/2019 | Liu et al. | |
| 2019/0319933 A1 | 10/2019 | Jiang | |
| 2020/0004993 A1 | 1/2020 | Volos et al. | |
| 2020/0218821 A1 | 7/2020 | Liu et al. | |
| 2020/0280749 A1 | 9/2020 | Nakamura et al. | |
| 2020/0314644 A1 | 10/2020 | Dean et al. | |

* cited by examiner

| DP Accelerator ID | Allocated Memory Regions |
|---|---|
| DP Accelerator 1 | Region 1 ... Region 11 |
| DP Accelerator 2 | Region 12 |
| ... | |
| DP Accelerator N | Region N |

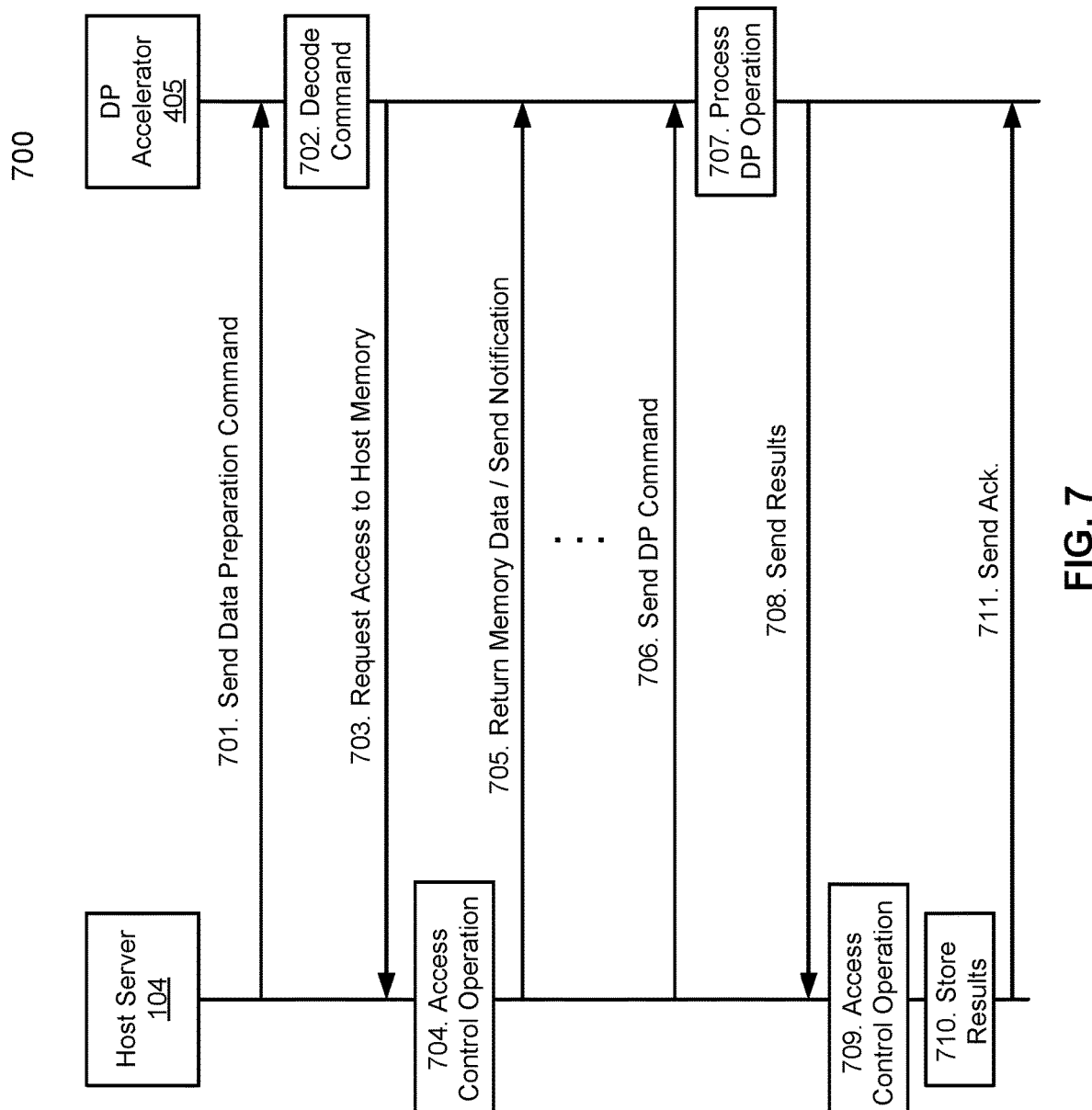

| Application ID | Channel/Session Key IDs |
|---|---|
| Application 1 | Key 1 ... Key 11 |
| Application 2 | Key 12 |
| ... | ... |
| Application N | Key N |

FIG. 11

100
METHOD AND SYSTEM TO DERIVE A SESSION KEY TO SECURE AN INFORMATION EXCHANGE CHANNEL BETWEEN A HOST SYSTEM AND A DATA PROCESSING ACCELERATOR

CROSS-REFERENCE TO RELATED APPLICATION

This patent application is a U.S. National Phase Application under 35 U.S.C. § 371 of International Application No. PCT/CN2019/070401, filed Jan. 4, 2019, entitled "METHOD AND SYSTEM TO DERIVE A SESSION KEY TO SECURE AN INFORMATION EXCHANGE CHANNEL BETWEEN A HOST SYSTEM AND A DATA PROCESSING ACCELERATOR," which is incorporated by reference herein by its entirety.

TECHNICAL FIELD

Embodiments of the invention relate generally to searching content. More particularly, embodiments of the invention relate to a method and system to derive a session key to secure an information exchange channel between a host system and a data processing (DP) accelerator.

BACKGROUND

Sensitive transactions are increasingly being performed by data processing (DP) accelerators such as artificial intelligence (AI) accelerators or co-processors. This has increased the need for securing communication channels for DP accelerators and securing an environment of a host system to protect the host system from unauthorized accesses.

For example, AI training data, models, and inference outputs may not be protected and thus would be leaked to untrusted parties. Thus, there is a need for a system to protect data processed by data processing accelerators.

SUMMARY

In an aspect of the disclosure, embodiments of the disclosure provide a computer-implemented method for generating a session key for a secure channel between a host system and a data processing accelerator, the method including: in response to receiving a temporary public key (PK_d) from a data processing (DP) accelerator, generating a first nonce (nc) at the host system, wherein the DP accelerator is coupled to the host system over a bus; transmitting a request to create a session key from the host system to the DP accelerator, the request including a host public key (PK_O) and the first nonce; receiving a second nonce (ns) from the DP accelerator, wherein the second nonce is encrypted using the host public key and a temporary private key (SK_d) corresponding to the temporary public key; and generating a first session key based on the first nonce and the second nonce, which is utilized to encrypt or decrypt subsequent data exchanges between the host system and the DP accelerator.

In another aspect of the disclosure, embodiments of the disclosure provide a non-transitory machine-readable medium having instructions stored therein, which when executed by a processor, cause the processor to perform operations, the operations including: in response to receiving a temporary public key from a data processing (DP) accelerator, generating a first nonce at the host system, wherein the DP accelerator is coupled to the host system over a bus; transmitting a request to create a session key from the host system to the DP accelerator, the request including a host public key and the first nonce; receiving a second nonce from the DP accelerator, wherein the second nonce is encrypted using the host public key and a temporary private key corresponding to the temporary public key; and generating a first session key based on the first nonce and the second nonce, which is utilized to encrypt or decrypt subsequent data exchanges between the host system and the DP accelerator.

In another aspect of the disclosure, embodiments of the disclosure provide a computer-implemented method for generating a session key for a secure channel between a host system and a data processing accelerator, the method including: in response to a request received from a host system, generating, at a data processing (DP) accelerator, a temporary private key and a temporary public key, wherein the DP accelerator is coupled to the host system over a bus; encrypting the temporary public key using an accelerator private root key associated with the DP accelerator; transmitting the temporary public key in an unencrypted form and the encrypted temporary public key to the host system to allow the host system to verify the temporary public key; receiving a first nonce from the host system, wherein the first nonce was generated by the host system after the temporary public key has been verified; and generating a session key based on the first nonce and a second nonce, wherein the second nonce has been generated locally at the DP accelerator.

BRIEF DESCRIPTION OF THE DRAWINGS

Embodiments of the invention are illustrated by way of example and not limitation in the figures of the accompanying drawings in which like references indicate similar elements.

FIG. 6 is a block diagram illustrating regions of memory allocated to a number of DP accelerators according to one embodiment.

FIG. 7 is a block diagram illustrating an example communication between a host and a DP accelerator according to one embodiment.

FIG. 11 is a block diagram illustrating user application to channel mappings using channel/session keys according to one embodiment.

DETAILED DESCRIPTION

Figure 1:
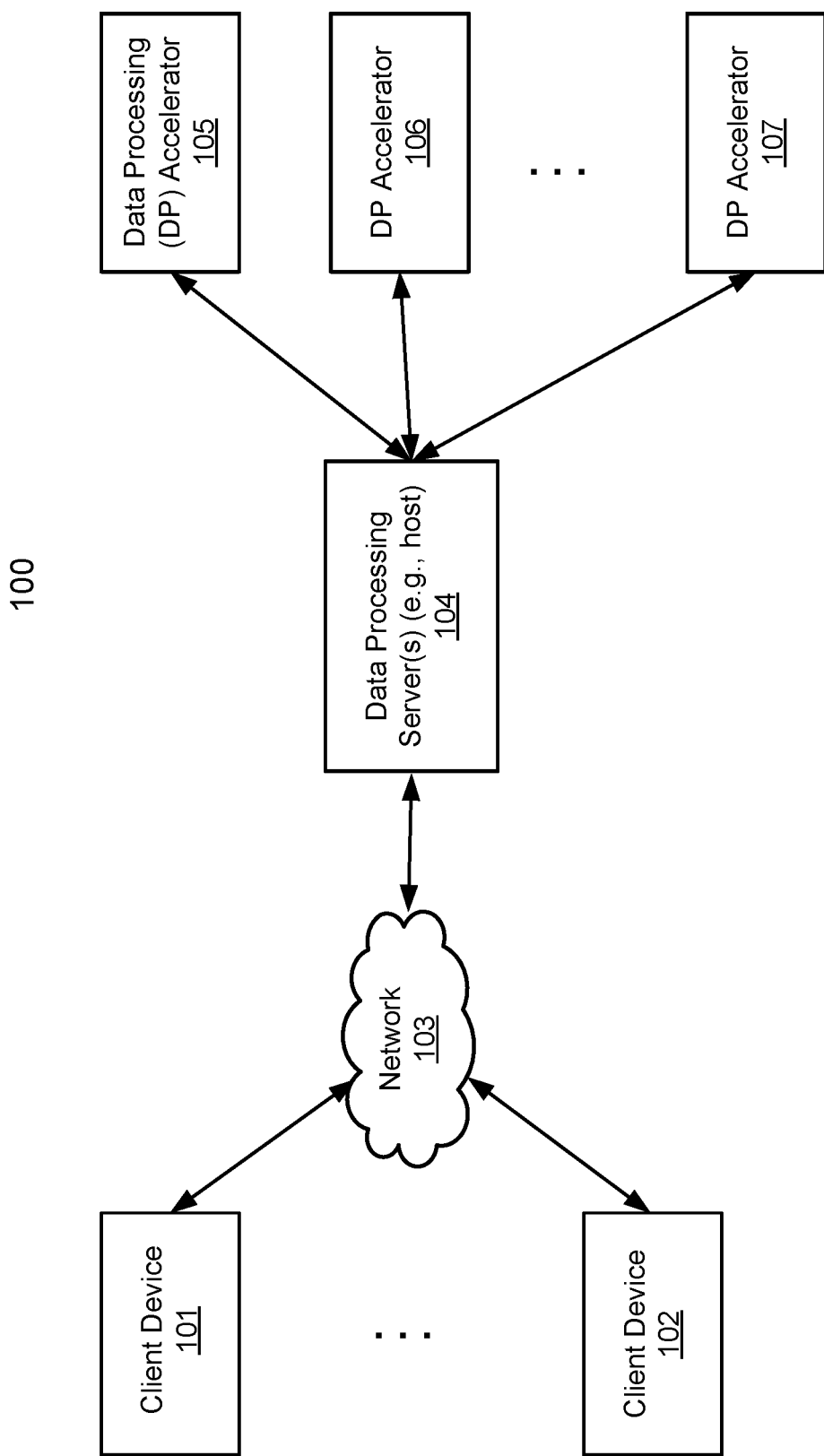
FIG. 1 is a block diagram illustrating an example of system configuration for securing communication between a host and data process (DP) accelerators according to some embodiments.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect of the disclosure, a data processing system performs a secure boot using a security module (e.g., trusted platform module (TPM)) of a host system. The system verifies that an operating system (OS) and one or more drivers including an accelerator driver associated with a data processing (DP) accelerator are provided by a trusted source. The system launches the accelerator driver within the OS. The system establishes a trusted execution environment (TEE) associated with one or more processors of the host system. The system launches an application and a runtime library within the TEE, where the application communicates with the DP accelerator via the runtime library and the accelerator driver.

According to a second aspect, a system establishes a secure connection (having one or more secure channels) between a host system and a data processing (DP) accelerator over a bus, the secure connection including one or more command channels and/or data channels. In one embodiment, the one or more command channels may be unsecured. The system transmits a first instruction from the host system to the DP accelerator over a command channel, the first instruction requesting the DP accelerator to perform a data preparation operation. The system receives a first request to read first data from a first memory location of the host system from the DP accelerator over a data channel, in response to the first instruction. In response to the request, the system transmits the first data retrieved from the first memory location of the host system to the DP accelerator over the data channel, where the first data is utilized for a computing or a configuration operation. The system transmits a second instruction from the host system to the DP accelerator over the command channel, the second instruction requesting the DP accelerator to perform the computing or the configuration operation.

In one embodiment, a system establishes a secure connection between a host system and a data processing (DP) accelerator over a bus, the secure connection including one or more command channels and/or data channels. The command channel(s) may be unsecured. The system receives, at the DP accelerator, a first instruction from the host system over a command channel, the first instruction requesting the DP accelerator to perform a data preparation operation. In response to the first instruction, the system transmits a first request from the DP accelerator to the host system over a data channel to read first data from a first memory location of the host system. The system receives the first data from the host system over the data channel, where the first data was retrieved by the host system from the first memory location of the host system. The system receives a second instruction from the host system over the command channel, the second instruction requesting the DP accelerator to perform a computing or a configuration operation. The system performs the computing or the configuration operation based on at least the first data.

According to a third aspect, a system receives, at a host channel manager (HCM) of a host system, a request from an application to establish a secure channel with a data processing (DP) accelerator, where the DP accelerator is coupled to the host system over a bus. In response to the request, the system generates a first session key for the secure channel based on a first private key of a first key pair associated with the HCM and a second public key of a second key pair associated with the DP accelerator. In response to a first data associated with the application to be sent to the DP accelerator, the system encrypts the first data using the first session key. The system then transmits the encrypted first data to the DP accelerator via the secure channel over the bus.

In one embodiment, a system receive, at an accelerator channel manager (ACM) of a data processing (DP) accelerator, a request from an application of a host channel manager (HCM) of a host system to establish a secure channel between the host system and the DP accelerator, where the DP accelerator is coupled to the host system over a bus. In response to the request, the system generates a second session key for the secure channel and encrypts the second session key based on a second private key of a second key pair associated with the DP accelerator and a first public key of a first key pair associated with the HCM before sending the encrypted second session key to the HCM. In response to a first data to be sent to the host system, the system encrypts the first data using the second session key. The system then transmits the encrypted first data to the HCM of the host system via the secure channel.

According to a fourth aspect, in response to receiving a temporary public key (PK_d) from a data processing (DP) accelerator, a system generates a first nonce (nc) at the host system, where the DP accelerator is coupled to the host system over a bus. The system transmits a request to create a session key from the host system to the DP accelerator, the request including a host public key (PK_O) and the first nonce. The system receives a second nonce (ns) from the DP accelerator, where the second nonce is encrypted using the host public key and a temporary private key (SK_d) corresponding to the temporary public key. The system generates a first session key based on the first nonce and the second nonce, which is utilized to encrypt or decrypt subsequent data exchanges between the host system and the DP accelerator.

In one embodiment, in response to a request received from a host system, a system generates, at a data processing (DP) accelerator, a temporary private key and a temporary public key, where the DP accelerator is coupled to the host system over a bus. The system encrypts the temporary public key using an accelerator private root key associated with the DP accelerator. The system transmits the temporary public key in an unencrypted form and the encrypted temporary public key to the host system to allow the host system to verify the temporary public key. The system receives a first nonce from the host system, where the first nonce was generated by the host system after the temporary public key has been verified. The system generates a session key based on the first nonce and a second nonce, where the second nonce has been generated locally at the DP accelerator.

According to a fifth aspect, a system performs a secure boot using a security module (e.g., trusted platform module (TPM)) of a host system. The system establishes a trusted execution environment (TEE) associated with one or more processors of the host system. The system launches a memory manager within the TEE, where the memory manager is configured to manage memory resources of a data processing (DP) accelerator coupled to the host system over a bus, including maintaining memory usage information of global memory of the DP accelerator. In response to a request received from an application running within the TEE for accessing a memory location of the DP accelerator, the system allows or denies the request based on the memory usage information.

According to a sixth aspect, a DP accelerator includes one or more execution units (EUs) configured to perform data processing operations in response to an instruction received from a host system coupled over a bus. The DP accelerator includes a security unit (SU) configured to establish and maintain a secure channel with the host system to exchange commands and data associated with the data processing operations. The DP accelerator includes a time unit (TU) coupled to the security unit to provide timestamp services to the security unit, where the time unit includes a clock generator to generate clock signals locally without having to derive the clock signals from an external source. The TU includes a timestamp generator coupled to the clock generator to generate a timestamp based on the clock signals, and a power supply to provide power to the clock generator and the timestamp generator.

In one embodiment, the TU further includes a counter coupled to the clock generator to count a count value based on the clock signals generated from the clock generator and a persistent storage to store the count value, where the count value is utilized by the timestamp generator to generate the timestamp. In another embodiment, the counter is to increment the count value in response to each of the clock signals, and where the persistent storage includes a 32-bit variable. However, the persistent storage can include variables of any size such as 8-bit, 16-bit, 64-bit, etc.

In one embodiment, the time unit further includes a local oscillator coupled to the clock generator to provide precise pulse signals. In one embodiment, the power supply comprises a battery to provide the power without having to draw power from an external power source. In one embodiment, the clock signals are generated without having to communicate with an external clock source. In one embodiment, the time unit further includes a clock calibrator configured to calibrate the clock generator.

In one embodiment, the timestamp is utilized by the security unit to time stamp a session key for encrypting the exchanged data between the DP accelerator and the host system. In another embodiment, the timestamp is utilized to time stamp an information exchange for the DP accelerator, and the timestamp can be used to determine a freshness of the information exchange. In another embodiment, the timestamp of the session key is utilized to determine whether the session key has expired.

According to a seventh aspect, a DP accelerator includes one or more execution units (EUs) configured to perform data processing operations in response to an instruction received from a host system coupled over a bus. The DP accelerator includes a time unit (TU) coupled to the security unit to provide timestamp services. The DP accelerator includes a security unit (SU) configured to establish and maintain a secure channel with the host system to exchange commands and data associated with the data processing operations, where the security unit includes a secure storage area to store a private root key associated with the DP accelerator, where the private root key is utilized for authentication. The SU includes a random number generator to generate a random number, and a cryptographic engine to perform cryptographic operations on data exchanged with the host system over the bus using a session key derived based on the random number.

In one embodiment, the private root key is preconfigured and stored in the secure storage area during manufacturing of the DP accelerator. In one embodiment, the security unit is to receive a request from the host system to establish a secure connection with the DP accelerator and in response to the request, generate the session key based on the random number generated by the random number generator, where the session key is utilized to encrypt or decrypt the data exchanged with the host system over the secure connection.

In another embodiment, the random number generator is to generate the random number based on a seed value. In another embodiment, the timestamp is further to determine whether the session key has expired, in which a new session key is to be generated.

In another embodiment, in generating the session key based on the random number, the security unit is to generate a temporary key pair having a temporary private key and a temporary public key, transmit the temporary public key and a signed temporary public key to the host, where the signed temporary public key is signed by the private root key to allow the host system authenticate the DP accelerator, receive a first nonce from the host system, and generate a first session key based on the first nonce and a second nonce generated locally at the DP accelerator. In another embodiment, the security unit is further configured to transmit the first nonce and the second nonce signed by the private root key (e.g., of the DP accelerator) and encrypted by a public key associated with the host system.

In another embodiment, the host system is configured to decrypt the encrypted first nonce and the second nonce using a public root key (e.g., of the DP accelerator) corresponding to the private root key and a private key of the host system to recover the first nonce and the second nonce. In another embodiment, the host system is configured to generate a second session key based on the recovered first nonce and the second nonce, where the second session key is utilized by the host system for encryption and decryption.

In one embodiment, the time unit includes a clock generator to generate clock signals locally without having to derive the clock signals from an external source, a timestamp generator coupled to the clock generator to generate a timestamp based on the clock signals, and a power supply to provide power to the clock generator and the timestamp generator without having to draw power from an external power source.

According to an eighth aspect, a system receives, at a runtime library executed within a trusted execution environment (TEE) of a host system, a request from an application to invoke a predetermined function to perform a predefined operation. In response to the request, the system identifies a kernel object associated with the predetermined function. The system verifies an executable image of the kernel object using a public key corresponding to a private key that was used to sign the executable image of the kernel object. In response to successfully verifying the executable image of the kernel object, the system transmits the verified executable image of the kernel object to a data processing (DP) accelerator over a bus to be executed by the DP accelerator to perform the predefined operation.

According to a ninth aspect, a system receives, at a host system a public attestation key (PK_ATT) or a signed PK_ATT from a data processing (DP) accelerator over a bus. The system verifies the PK_ATT using a public root key (PK_RK) associated with the DP accelerator. In response to successfully verifying the PK_ATT, the system transmits a kernel identifier (ID) to the DP accelerator to request attestation of a kernel object stored in the DP accelerator. In response to receiving a kernel digest or a signed kernel digest corresponding to the kernel object form the DP accelerator, the system verifies the kernel digest using the PK_ATT. The system sends the verification results to the DP accelerator for the DP accelerator to access the kernel object based on the verification results.

In one embodiment, in response to an attestation request received from a host system, a system generates at a data processing (DP) accelerator an attestation key pair having a public attestation key (PK_ATT) and a private attestation key (SK_ATT). The system transmits the PK_ATT or a signed PK_ATT from the DP accelerator to the host system, where the DP accelerator is coupled to the host system over a bus. The system receives a kernel identifier (ID) identifying a kernel object from the host system, where the kernel ID is received in response to successful verification of the PK_ATT. The system generates a kernel digest by hashing an executable image of the kernel object in response to the kernel ID. The system transmits the kernel digest or a signed kernel digest to the host system to allow the host system to verify and attest the kernel object before accessing the kernel object to be executed within the DP accelerator.

According to a tenth aspect, a system receives, at a host system from a data processing (DP) accelerator, an accelerator identifier (ID) that uniquely identifies the DP accelerator, where the host system is coupled to the DP accelerator over a bus. The system transmits the accelerator ID to a predetermined trusted server over a network. The system receives a certificate from the predetermined trusted server over the network, the certificate certifying the DP accelerator. Optionally, the system verifies that the certificate is associated with the trusted server, e.g., by verifying a certificate chain for the trusted server. The system extracts a public root key (PK_RK) from the certificate, the PK_RK corresponding to a private root key (SK_RK) associated with the DP accelerator. The system establishes a secure channel with the DP accelerator using the PK_RK to exchange data securely between the host system and the DP accelerator.

FIG. 1 is a block diagram illustrating an example of system configuration for securing communication between a host and data process (DP) accelerators according to some embodiments. Referring to FIG. 1, system configuration 100 includes, but is not limited to, one or more client devices 101-102 communicatively coupled to DP server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu artificial intelligence (AI) chipset available from Baidu, Inc. or alternatively, the DP accelerator may be an AI chipset from NVIDIA, an Intel, or some other AI chipset providers.

According to one embodiment, each of the applications accessing any of DP accelerators 105-107 and hosted by DP server 104, also referred to as a host, may be verified that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, a secure connection will be established between host 104 and the corresponding one of the DP accelerator 105-107, such that the data exchanged between host 104 and each of DP accelerators 105-107 is protected against the attacks from malwares.

Figure 2:
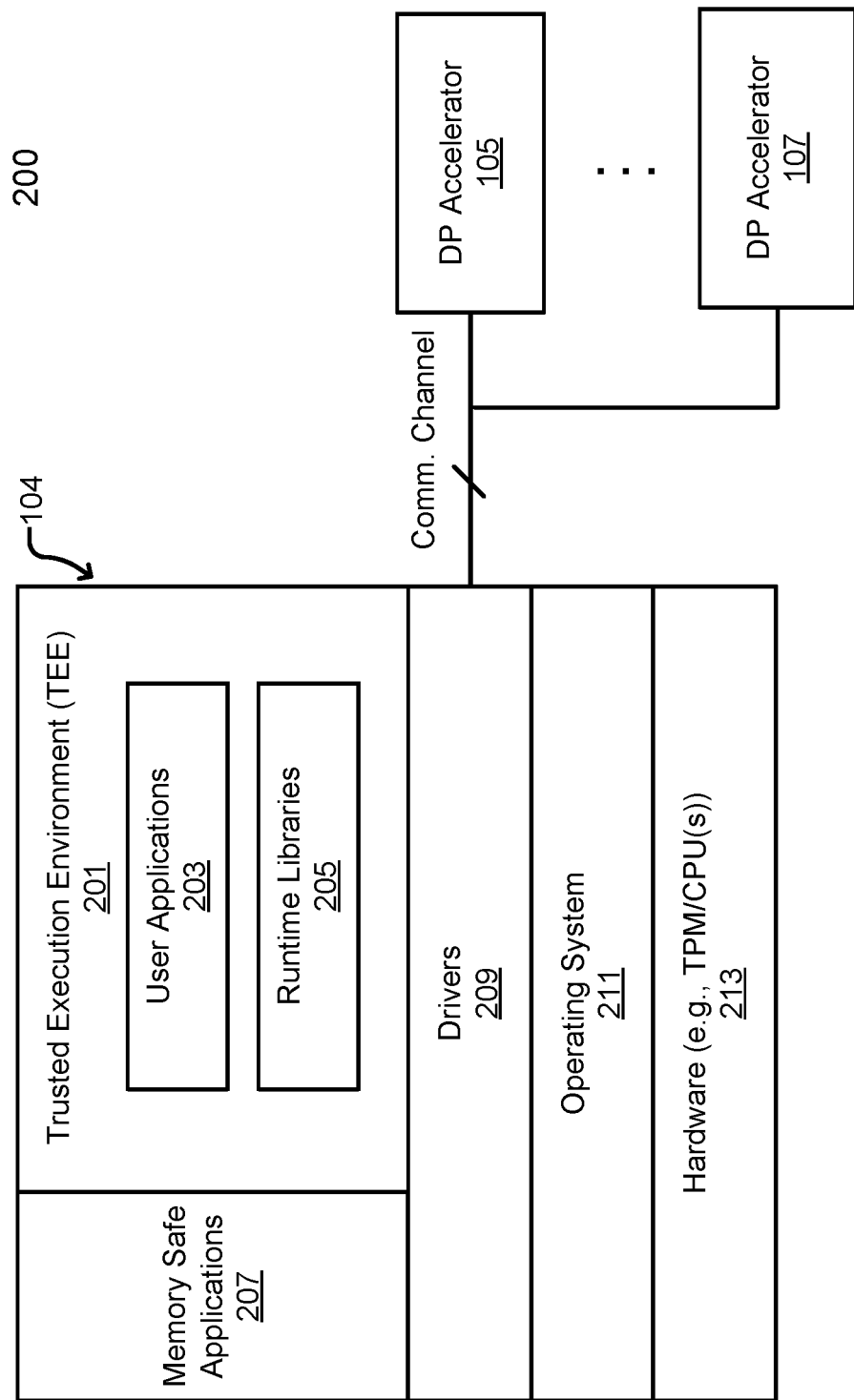
FIG. 2 is a block diagram illustrating an example of a multi-layer protection solution for securing communications between a host and data process (DP) accelerators according to some embodiments.

FIG. 2 is a block diagram illustrating an example of a multi-layer protection solution for securing communications between a host system and data process (DP) accelerators according to some embodiments. In one embodiment, system 200 provides a protection scheme for secure communications between host and DP accelerators with or without hardware modifications to the DP accelerators. Referring to FIG. 2, host machine or server 104 can be depicted as a system with one or more layers to be protected from intrusion such as user application 203, runtime libraries 205, driver 209, operating system 211, and hardware 213 (e.g., security module (trusted platform module (TPM))/central processing unit (CPU)). Host machine 104 is typically a CPU system which can control and manage execution jobs on the host system or DP accelerators 105-107. In order to secure a communication channel between the DP accelerators and the host machine, different components may be required to protect different layers of the host system that are prone to data intrusions or attacks. For example, a trusted execution environment (TEE) can protect the user application layer and the runtime library layer from data intrusions.

Referring to FIG. 2, system 200 includes host system 104 and DP accelerators 105-107 according to some embodiments. DP accelerators include Baidu AI chipsets or any other AI chipsets such as NVIDIA graphical processing units (GPUs) that can perform AI intensive computing tasks. In one embodiment, host system 104 is to include a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secures driver 209 and operating system (OS) 211 in a working kernel space to communicate with the DP accelerators. Here, driver 209 is provided by a DP accelerator vendor and can serve as a driver for the user application to control a communication channel between host and DP accelerators. Because TPM chip and secure boot protects the OS and drivers in their kernel space, TPM also effectively protects the driver 209 and operating system 211.

Since the communication channels for DP accelerators 105-107 may be exclusively occupied by the OS and driver, thus, the communication channels are also secured through the TPM chip.

In one embodiment, host machine 104 includes trusted execution environment (TEE) 201 which is enforced to be secure by TPM/CPU 213. A TEE is a secure environment. TEE can guarantee code and data which are loaded inside the TEE to be protected with respect to confidentiality and integrity. Examples of a TEE may be Intel software guard extensions (SGX), or AMD secure encrypted virtualization (SEV). Intel SGX and/or AMD SEV can include a set of central processing unit (CPU) instruction codes that allows user-level code to allocate private regions of memory of a CPU that are protected from processes running at higher privilege levels. Here, TEE 201 can protect user applications 203 and runtime libraries 205, where user application 203 and runtime libraries 205 may be provided by end users and DP accelerator vendors, respectively. Here, runtime libraries 205 can convert API calls to commands for execution, configuration, and/or control of the DP accelerators. In one embodiment, runtime libraries 205 provides a predetermined set of (e.g., predefined) kernels for execution by the user applications.

In another embodiment, host machine 104 includes memory one or more safe applications 207 which are implemented using memory safe languages such as Rust, and GoLang, etc. These memory safe applications running on memory safe Linux releases, such as MesaLock Linux, can further protect system 200 from data confidentiality and integrity attacks. However, the operating systems may be any Linux distributions, UNIX, Windows OS, or Mac OS.

In one embodiment, the system can be set up as follows: A memory-safe Linux distribution is installed onto a system (such as host system 104 of FIG. 2) equipped with TPM secure boot. The installation can be performed offline during a manufacturing or preparation stage. The installation can also ensure that applications of a user space of the host system are programmed using memory-safe programming languages. Ensuring other applications running on host system 104 to be memory-safe applications can further mitigate potential confidentiality and integrity attacks on host system 104.

After installation, the system can then boot up through a TPM-based secure boot. The TPM secure boot ensures only a signed/certified operating system and an accelerator driver are launched in a kernel space that provides the accelerator services. In one embodiment, the operating system can be loaded through a hypervisor. Note, a hypervisor or a virtual machine manager is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After the secure boot, runtime libraries 205 runs and creates TEE 201, which places runtime libraries 205 in a trusted memory space associated with CPU 213. Next, user application 203 is launched in TEE 201. In one embodiment, user application 203 and runtime libraries 205 are statically linked and launched together. In another embodiment, runtime 205 is launched in TEE first and then user application 205 is dynamically loaded in TEE 201. In another embodiment, user application 205 is launched in TEE first, and then runtime 205 is dynamically loaded in TEE 201. Note, statically linked libraries are libraries linked to an application at compile time. Dynamic loading can be performed by a dynamic linker. Dynamic linker loads and links shared libraries for running user applications at runtime. Here, user applications 203 and runtime libraries 205 within TEE 201 are visible to each other at runtime, e.g., all process data are visible to each other. However, external access to the TEE is denied.

In another embodiment, the user application can only call a kernel from a set of kernels as predetermined by runtime libraries 205. In another embodiment, user application 203 and runtime libraries 205 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In summary, system 200 provides multiple layers of protection for DP accelerators (such as communications of data such as machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory-safe programming languages, which can further eliminate attacks by eliminating potential memory corruptions/vulnerabilities. Moreover, system 200 can include applications that use side-channel free algorithms so to defend against side channel attacks, such as cache based side channel attacks.

Figure 3:
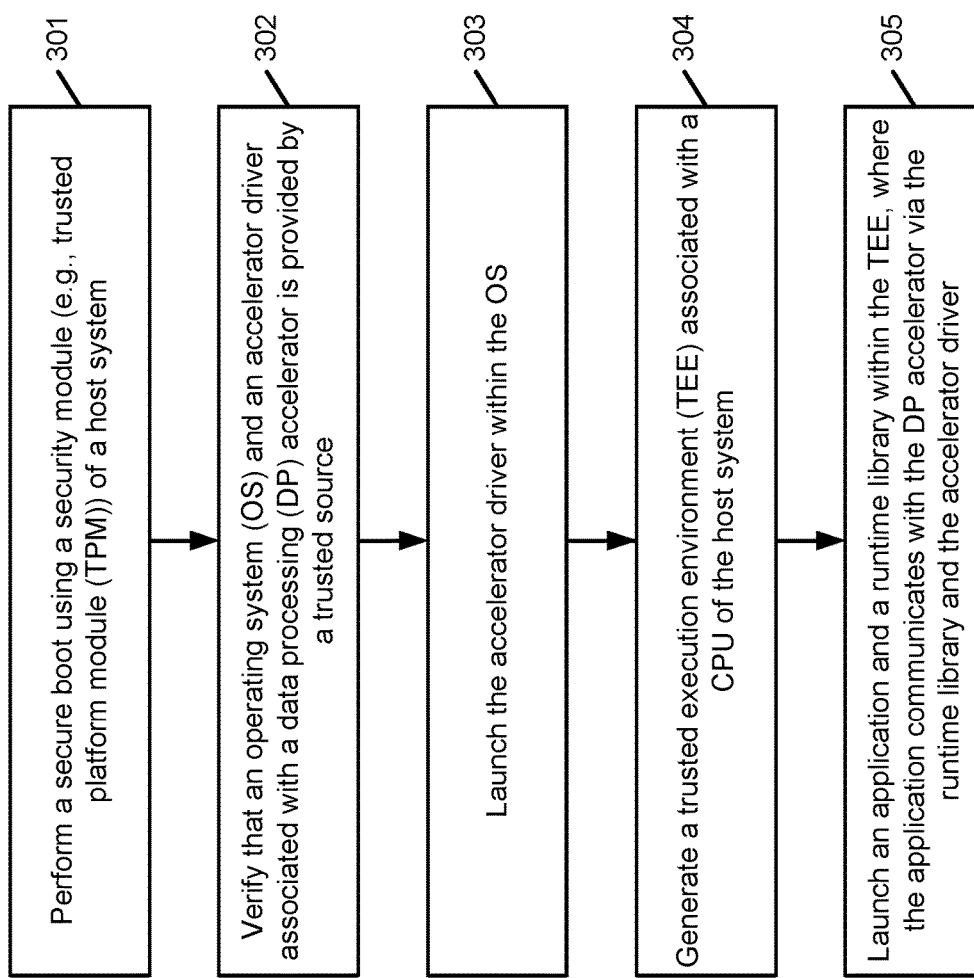
FIG. 3 is a flow diagram illustrating an example of a method according to one embodiment.

FIG. 3 is a flow diagram illustrating an example of a method according to one embodiment. Process 300 may be performed by processing logic which may include software, hardware, or a combination thereof. For example, process 300 may be performed by a host system, such as host system 104 of FIG. 1. Referring to FIG. 3, at block 301, processing logic performs a secure boot using a security module such as a trusted platform module (TPM) of a host system. At block 302, processing logic verifies that an operating system (OS) and an accelerator driver associated with a data processing (DP) accelerator are provided by a trusted source. At block 303, processing logic launches the accelerator driver within the OS. At block 304, processing logic generates a trusted execution environment (TEE) associated with a CPU of the host system. At block 305, processing logic launches an application and a runtime library within the TEE, where the application communicates with the DP accelerator via the runtime library and the accelerator driver.

In one embodiment, the application and the runtime library are statically linked and launched together. In another embodiment, the runtime library is launched in the TEE, and after the runtime library is launched, the application is dynamically loaded for launching. In one embodiment, processing logic further launches other applications on the host machine which are memory safe applications. In another embodiment, the memory safe applications are implemented by one or more memory safe programming languages. In one embodiment, the runtime library provides a predetermined set of kernels to be launched by the application to run a task by the DP accelerator. In one embodiment, processing logic further hardens the application and the runtime library running in the TEE with side channel free algorithms to defend against cache-based side channel attacks.

Figure 4:
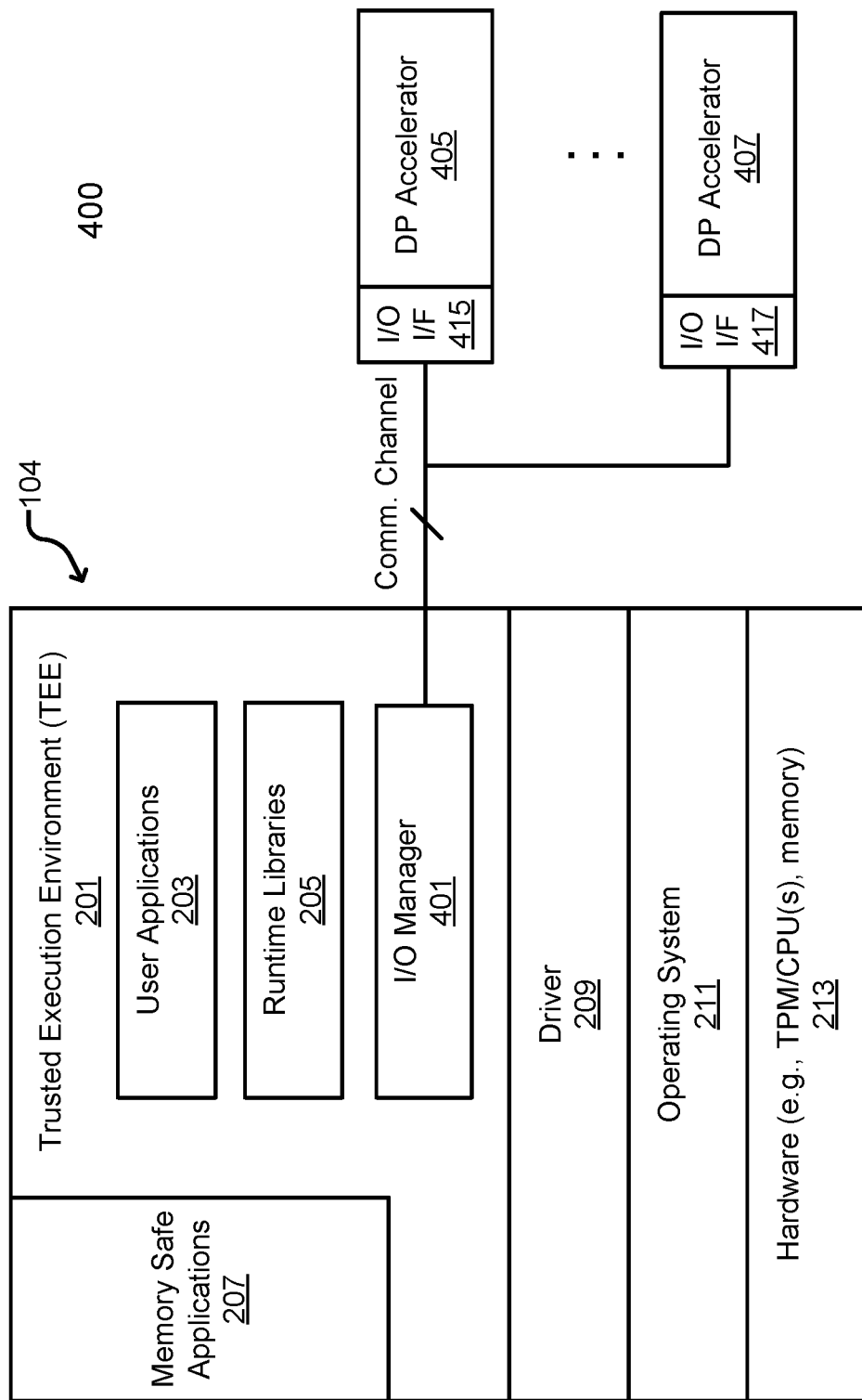
FIG. 4 is a block diagram illustrating an example of a host having an I/O manager according to one embodiment.

FIG. 4 is a block diagram illustrating an example of a host having an I/O manager according to one embodiment. System 400 may represent system 200 of FIG. 2 to provide a protection scheme for secure communications between the host and DP accelerators. Referring to FIG. 4, in one embodiment, TEE 201 of host system 104 includes I/O manager 401. In one embodiment, DP accelerators 405-407 include I/O interface 415-417, respectively, which blocks, forbids, or denies a host from accessing a memory of the DP accelerators directly, while I/O manager 401 allows the DP accelerators to only access certain memory blocks of host system 104.

A conventional DP accelerator has an I/O interface which gives a host machine access permission to an entire global memory of the DP accelerator. Indeed, malicious application might abuse this permission to steal or change a memory buffer in the global memory of the DP accelerators. To address this technical problem, embodiments of the disclosure implements a communication protocol to forbid accesses to a memory system of the DP accelerator. E.g., a host machine can only communicate with a DP accelerator through a command channel to issue commands, while DP accelerators can communicate through a data channel to read or write data, to and from, the host machine through an I/O manager of the host machine. The I/O manager can thus further characterize the data access by the DP accelerator and may allow the DP accelerator to only access a limited memory range of the host system.

For illustration purposes, an example operation performed by the DP may be an addition operation, such as: 1+2=3. In this case, a host system having access to a memory address of a DP accelerator may issue a number of data preparation instructions remotely to load data into memory buffers of the DP accelerators before the addition operation is carried out.

However, a host system with no memory access to DP accelerator would not be able to reference a memory address of the accelerator and has to issue a different set of processor instructions for the data preparation operations. It is then up to the DP accelerator to issue follow up instructions to read data from the host machine to obtain the data (e.g., operands for the addition instruction). Here, the memory address of the DP accelerator is not visible to the host system.

Figure 5:
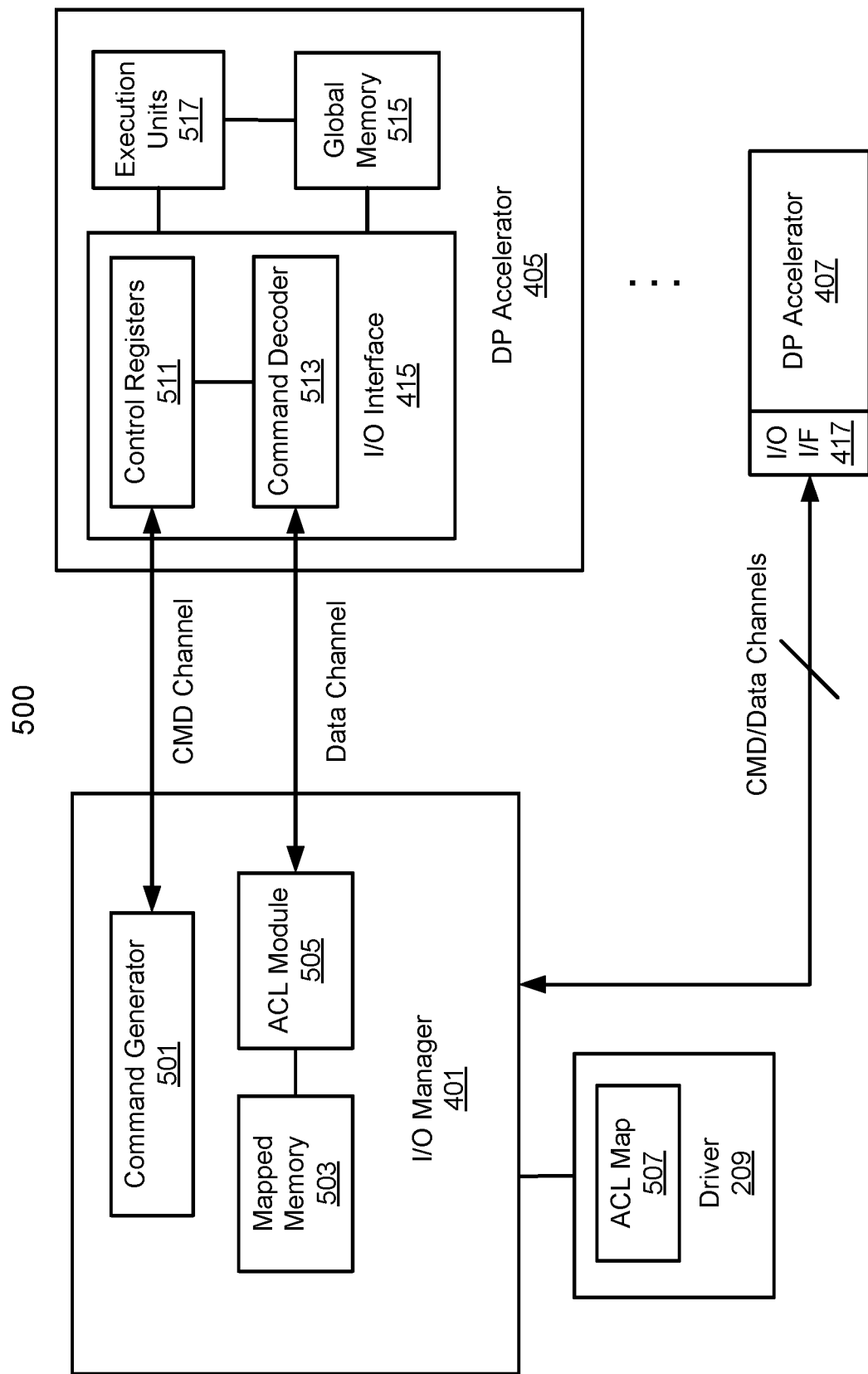
FIG. 5 is a block diagram illustrating an example of an I/O manager in communication with DP accelerators according to some embodiments.

FIG. 5 is a block diagram further illustrating an example of an I/O manager in communication with a DP accelerator according to some embodiments. System 500 may be a detailed view of system 400 of FIG. 4. Referring to FIG. 5, in one embodiment, I/O manager 401 includes command generator 501, mapped memory 503, and access control list (ACL) module 505. I/O manager 401 can be communicatively coupled to driver 209, and driver 209 can include ACL map 507 (e.g., IO MMU). Command generator 501 can generate a command to be issued to a DP accelerator. Mapped memory 503 can include a number of memory regions of host server 104 which are mapped to each DP accelerator. Mapped memory 503 can be a memory (e.g., as part of hardware 213 of FIG. 4) of host server 104. ACL module 505 can control (e.g., permit or deny) access to a corresponding mapped memory region of host server 104 according to a logic table for a corresponding DP accelerator. ACL map 507 can contain a mapping table that maps different memory regions of memory 503 to DP accelerators as illustrated by FIG. 6. Here, FIG. 6 shows that DP accelerator 1 is mapped to more than one region (e.g., regions 1 . . . 11) and DP accelerator 2 is mapped to region 12 according to one embodiment. E.g., each DP accelerator can be mapped to many memory regions.

For example, in one embodiment, a DP accelerator is not allowed to directly access memory locations (e.g., mapped memory 503) of a host server. However, the DP accelerator can access a memory region of the host server (through ACL module 505) provided that ACL map 507 contains an entry of the DP accelerator mapped to the memory region(s) to be accessed. In one embodiment, when a DP accelerator is added to host system 104, e.g., host system 104 discovers that a new DP accelerator is connected, ACL module 505 assigns an identifier to the DP accelerator, inserts an entry onto ACL map 507 corresponding to the DP accelerator, and/or reserves or allocates a block of available memory from memory 503, e.g., a memory of host server 104 (as part of hardware 213 of FIG. 4) for the DP accelerator. In one embodiment, ACL module 505 can send a notification to the DP accelerator to inform the DP accelerator of the available memory block. In one embodiment, the DP accelerator identifier can be a generated GUID/UUID (universally unique identifier), a MAC address, an IP address associated with the DP accelerator, or a combination thereof. In some embodiments, the host system is coupled to a number of DP accelerators. In one embodiment, when a DP accelerator is removed from host system 104, e.g., host system 104 discovers that an existing DP accelerator is no longer connected to host server 104, ACL module can remove an entry from ACL map 507 corresponding to the DP accelerator and/or deallocate a block of memory from memory 503 corresponding to the DP accelerator.

Referring to FIG. 5, in one embodiment, I/O interface 415 of DP accelerator 405 includes modules such as: control registers 511 and command decoder 513. Control register 511 can control a behavior of execution units 517 and/or global memory 515. Command decoder 513 can decode a command received by DP accelerator 405. In one embodiment, DP accelerator 405 can issue subsequent commands, e.g., read/write commands to fetch data, from and to, IO manager 401, to complete a requested command.

FIG. 7 is a block diagram illustrating an example communication between a host and a DP accelerator according to one embodiment. Operations 700 may be performed by a host server 104 and/or a DP accelerator 405. Referring to FIG. 7, in operation 701, host server 104 sends a data preparation command request (e.g., a data preparation instruction to perform a data preparation operation) to DP accelerator 405 to be processed by the DP accelerator via a command channel. In operation 702, DP accelerator 405 decodes the requested command to determine the type of command to be a data preparation operation command.

If it is determined that data from host server 104 is required to fulfill the requested command, in operation 703, DP accelerator 405 requests read access from host memory (e.g., a read operation) for the data, where the data may reside in a first memory location of the host system (e.g., mapped memory 503 of FIG. 5). In operation 704, in response to receiving the read access request, host server 104 identifies the requesting DP accelerator and the memory region on the host server 104 that is being requested (e.g., the first memory location), and queries an ACL map to determine whether the DP accelerator has access permission to the requested memory region.

For example, host server 104 can query the ACL map for the DP accelerator by an identifier associated with the DP accelerator. If there is a query result entry, host server 104 would determine if the requested memory location lies within a memory region from the result entry. If yes, DP accelerator 405 has read/write access permission. If it is determined that the DP accelerator has read access permission to the memory region, in operation 705, host server 104 returns the requested data, via a data channel. If it is determined that the DP accelerator has no read access permission, host server 104 may then send a notification of a read failure to DP accelerator 405.

In operation 706, host server 104 sends a DP command or a computing or a configuration command or DP instruction. In operation 707, DP accelerator 405 processes the DP command or DP operations. In operation 708, when the requested command completes, DP accelerator 405 store the completion results in a global memory of DP accelerator 405 (e.g., global memory 515 of FIG. 5). DP accelerator 405 subsequently sends the completion results to host server 104 as a write request, via the data channel. In operation 709, host server 104 identifies the DP accelerator and the memory region (e.g., a second memory location) requested for write access, and queries the ACL map to determine whether DP accelerator 405 has write access permission to the requested memory region.

If it is determined that the DP accelerator has write access permission, in operation 710, host server 104 stores the results in the requested memory location. In operation 711, host server 104 can subsequently send an acknowledgement as the results are successfully received. Note that a DP/computing command refers to a command for data processing operation(s) to be processed by a DP accelerator. A configuration command refers to command for configuration of the DP accelerator. A data preparation command refers to a command for a data preparation operation, e.g., to fetch a data, such as an operand for a DP command, from a host server.

Figure 8A:
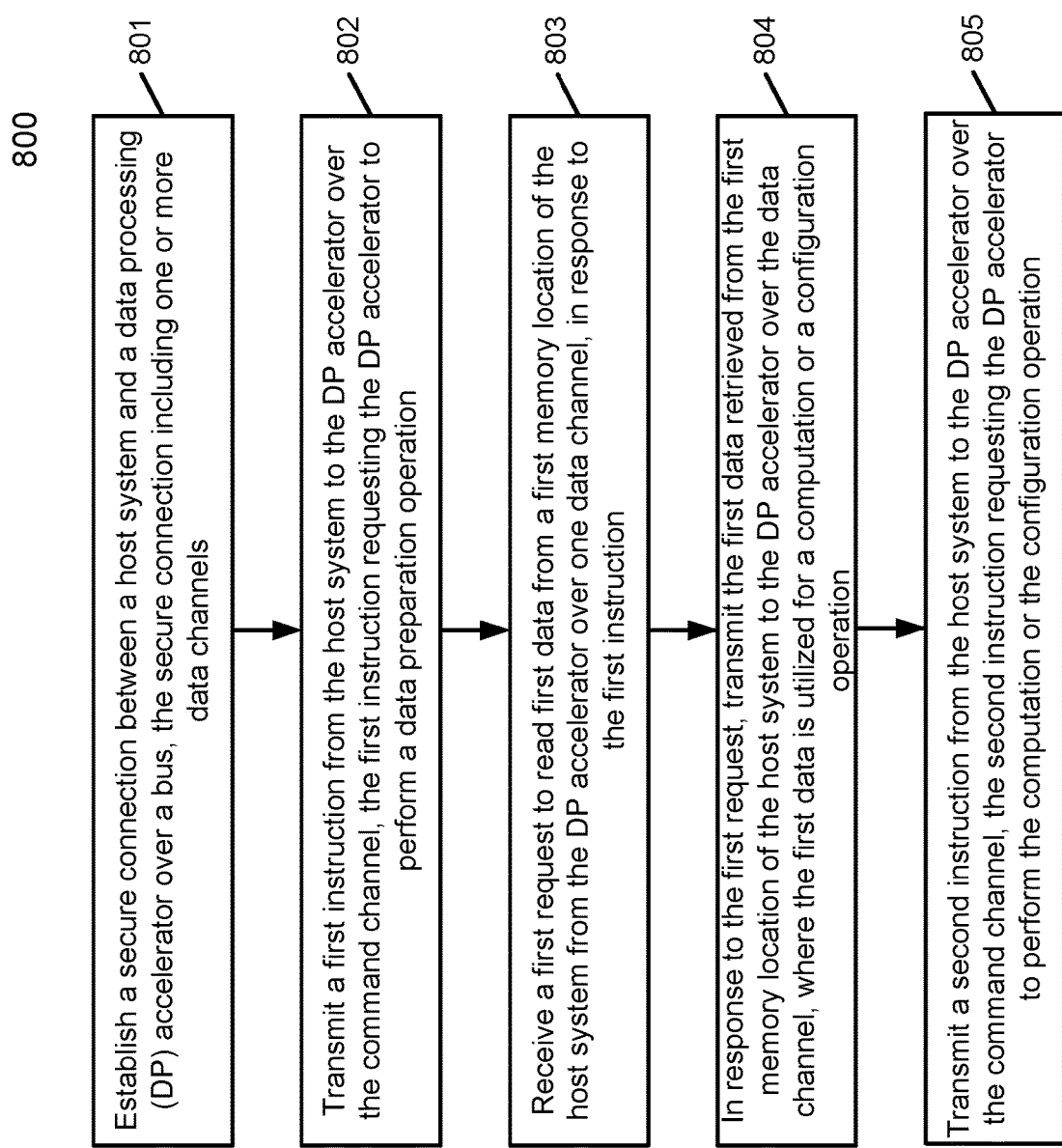
FIGS. 8A and 8B are flow diagrams illustrating example methods according to some embodiments.
Figure 8B:
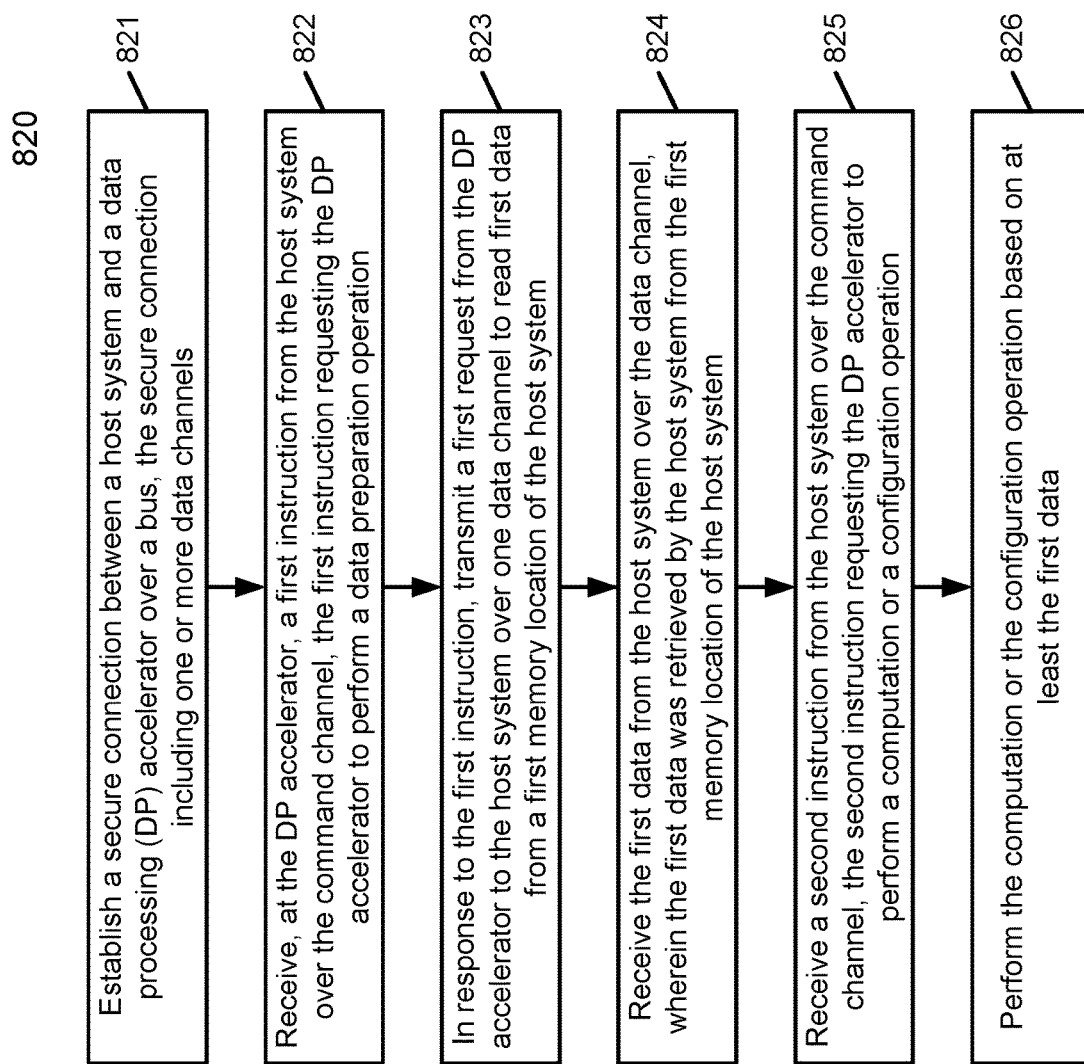

FIGS. 8A and 8B are flow diagrams illustrating example methods according to some embodiments. Processes 800 and 820 may be performed by processing logic which may include software, hardware, or a combination thereof. For example, process 800 may be performed by a host system (e.g., I/O manager 401) of FIG. 4, and process 820 may be performed by a DP accelerator (e.g., I/O interface 415) of FIG. 4. Referring to FIG. 8A, at block 801, processing logic establishes a secure connection between a host system and a data processing (DP) accelerator over a bus, the secure connection including one or more data channels. In another embodiment, the secure connection includes one or more command channels. At block 802, processing logic transmits a first instruction from the host system to the DP accelerator over one command channel, the first instruction requesting the DP accelerator to perform a data preparation operation. At block 803, processing logic receives a first request to read first data from a first memory location of the host system from the DP accelerator over one data channel, in response to the first instruction. At block 804, in response to the first request, processing logic transmits the first data retrieved from the first memory location of the host system to the DP accelerator over the data channel, where the first data is utilized for a computation or a configuration operation. At block 805, processing logic transmits a second instruction from the host system to the DP accelerator over the command channel, the second instruction requesting the DP accelerator to perform the computation or the configuration operation.

In one embodiment, processing logic further examines the first request to determine whether the DP accelerator is entitled to read from the first memory location of the host system and allows the DP accelerator to read from the first memory location, in response to determining that the DP accelerator is entitled to read from the first memory location. In one embodiment, the DP accelerator is not allowed to directly access the first memory location of the host system. In one embodiment, the DP accelerator is one of a number of DP accelerators coupled to the host system.

In one embodiment, processing logic further receives a second request to write a second data from the DP accelerator over the data channel, where the second data is to be written to a second memory location of the host system. In response to the second request, processing logic stores the second data at the second memory location of the host system. In another embodiment, processing logic further examines the second request to determine whether the DP accelerator is entitled to write to the second memory location of the host system. Processing logic allows the DP accelerator to write to the second memory location, in response to determining that the DP accelerator is entitled to write to the second memory location. In another embodiment, the second data represents at least a portion of a result of the computation or the configuration operation in response to the instruction.

Referring to FIG. 8B, in one embodiment, at block 821, processing logic establishes a secure connection between a host system and a data processing (DP) accelerator over a bus, the secure connection including one or more command channels and/or one or more data channels. At block 822, processing logic receives, at the DP accelerator, a first instruction from the host system over one command channel, the first instruction requesting the DP accelerator to perform a data preparation operation. At block 823, in response to the first instruction, processing logic transmits a first request from the DP accelerator to the host system over one data channel to read a first data from a first memory location of the host system. At block 824, processing logic receives the first data from the host system over the data channel, wherein the first data was retrieved by the host system from the first memory location of the host system. At block 825, processing logic receives a second instruction from the host system over the command channel, the second instruction requesting the DP accelerator to perform a computation or configuration operation. At block 826, processing logic performs the computation or configuration operation based on at least the first data.

In one embodiment, the host system is to examine the first request to determine whether the DP accelerator is entitled to read from the first memory location of the host system, and where the host system is to allow the DP accelerator to read from the first memory location, in response to determining that the DP accelerator is entitled to read from the first memory location. In another embodiment, the DP accelerator is not allowed to directly access the first memory location of the host system. In another embodiment, the DP accelerator is one of a number of DP accelerators coupled to the host system.

In another embodiment, processing logic further transmits a second request from the DP accelerator to the host system over the data channel to write second data to a second memory location of the host system, where the second data represents at least a portion of a result of the computation or configuration operation. In another embodiment, the host system is to examine the second request to determine whether the DP accelerator is entitled to write to the second memory location of the host system, and where the host system is to allow the DP accelerator to write to the second memory location, in response to determining that the DP accelerator is entitled to write to the second memory location.

Figure 9:
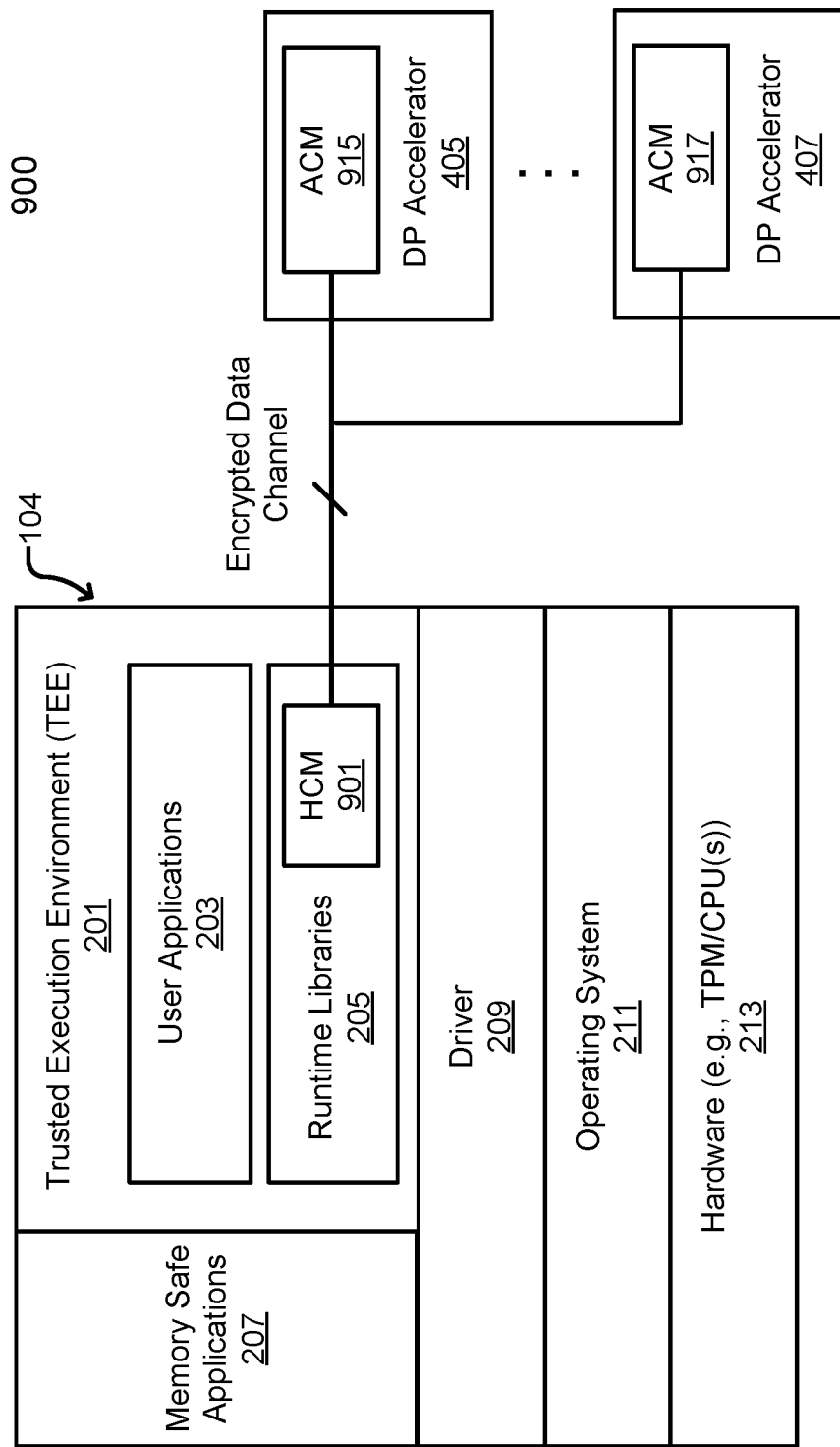
FIG. 9 is a block diagram illustrating an example of a host having a host channel manager (HCM) according to one embodiment.

FIG. 9 is a block diagram illustrating an example of a host having a host channel manager according to one embodiment. System 900 may represent system 200 of FIG. 2 to provide a protection scheme to secure an information exchange channel between a host and one or more DP accelerators. Referring to FIG. 9, in one embodiment, host system 104 includes runtime libraries 205 which includes host channel manager (HCM) 901. Correspondingly, DP accelerators 405-407 include accelerator channel managers (ACMs) 915-917, respectively. HCM and ACMs support generation of cryptographic keys to setup an asymmetrical (e.g., RSA) and/or symmetrical (e.g., AES) cryptography based information exchange channel between host system 104 and DP accelerators 405-407. Here, DP accelerators 405-407 can be DP accelerators 205-207 of FIG. 2.

Figure 10:
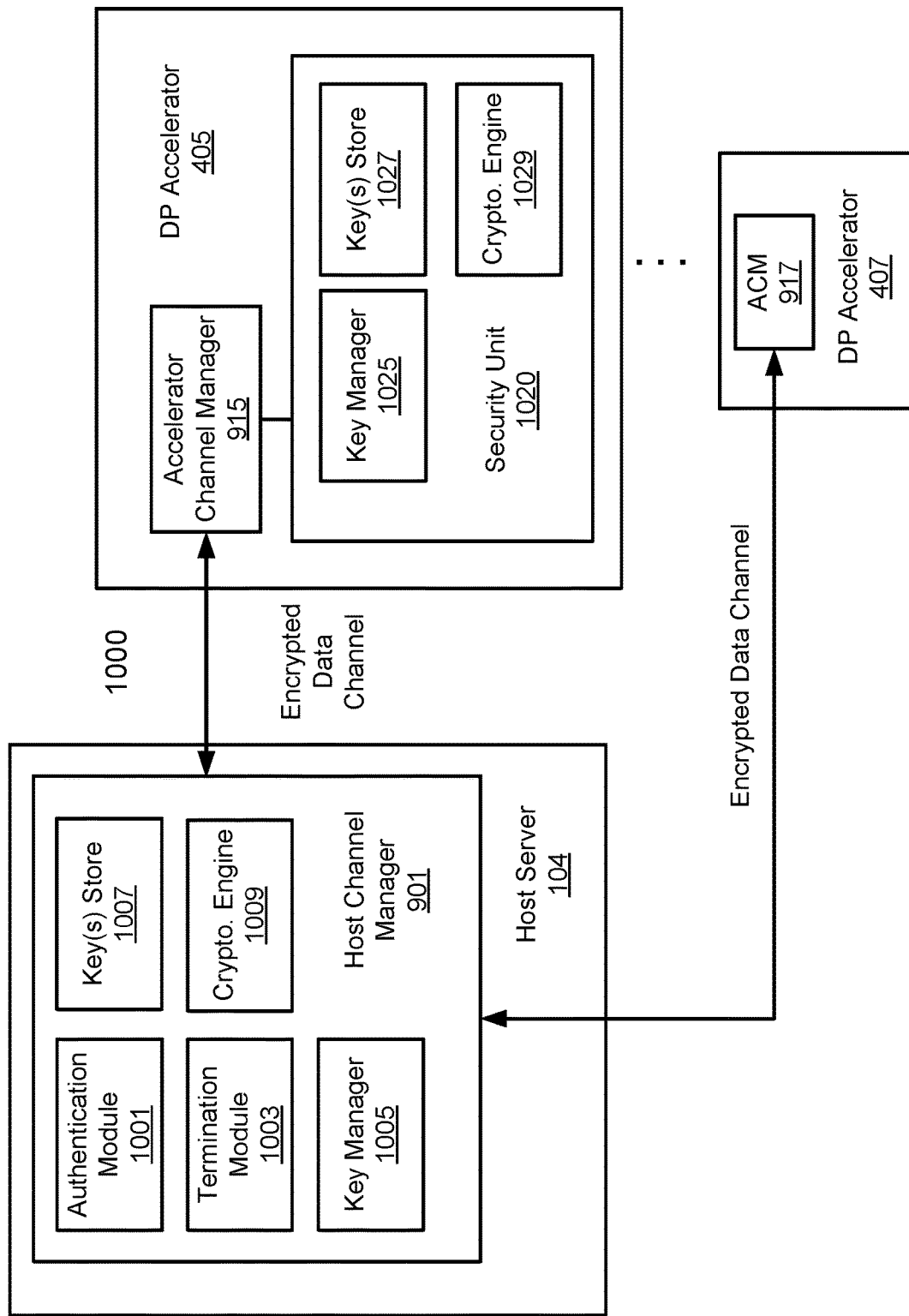
FIG. 10 is a block diagram illustrating an example of a host channel manager (HCM) communicatively coupled to one or more accelerator channel managers (ACMs) according to some embodiments.

FIG. 10 is a block diagram illustrating an example of a host channel manager (HCM) communicatively coupled to one or more accelerator channel managers (ACMs) according to some embodiments. System 1000 may be a detailed view of system 900 of FIG. 9. Referring to FIG. 10, in one embodiment, HCM 901 includes authentication module 1001, termination module 1003, key manager 1005, key(s) store 1007, and cryptography engine 1009. Authentication module 1001 can authenticate a user application running on host server 104 for permission to access or use a resource of a DP accelerator. Termination module 1003 can terminate a connection (e.g., channels associated with the connection would be terminated). Key manager 1005 can manage (e.g., create or destroy) asymmetric key pairs or symmetric keys for encryption/decryption of one or more data packets for different secure data exchange channels. Here, each user application (as part of user applications 203 of FIG. 9) can correspond or map to different secure data exchange channels, on a one-to-many relationship, and each data exchange channel can correspond to a DP accelerator. An example of a user application mapping to channels using channel/session keys can be illustrated by FIG. 11, according to one embodiment. Here, application 1 maps to channel session keys 1-11, where each session key is for a secure channel corresponding to a DP accelerator (e.g., 11 DP accelerators); application 2 is mapped to channel session key 12, and key 12 correspond to a particular DP accelerator. Key(s) store 1007 can store encryption asymmetric key pairs or symmetric keys. Cryptography engine 1009 can encrypt or decrypt a data packet for the data exchanged through any of the secure channels. Note that some of these modules can be integrated into fewer modules.

Referring to FIG. 10, in one embodiment, DP accelerator 405 includes ACM 915 and security unit (SU) 1020. Security unit 1020 can include key manager 1025, key(s) store 1027, and cryptography engine 1029. Key manager 1025 can manage (e.g., generate, safe keep, and/or destroy) asymmetric key pairs or symmetric keys. Key(s) store 1027 can store the cryptography asymmetric key pairs or symmetric keys. Cryptography engine 1029 can encrypt or decrypt key information or data packets for data exchanges. In some embodiments, ACM 915 and SU 1020 is an integrated module.

Figure 12A:
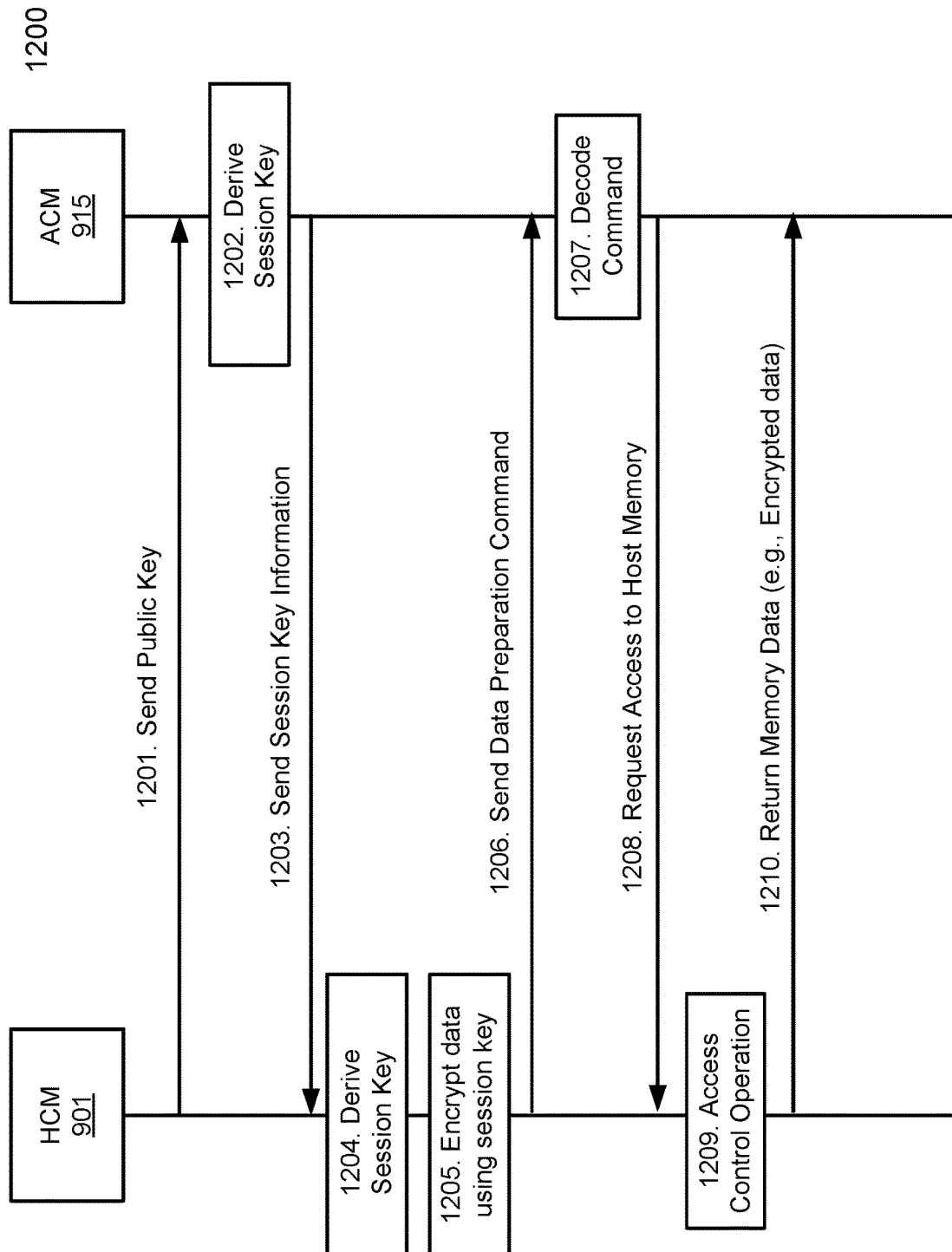
FIGS. 12A-12B are block diagrams illustrating an example of a secure information exchange between a host and a DP accelerator according to one embodiment.
Figure 12B:
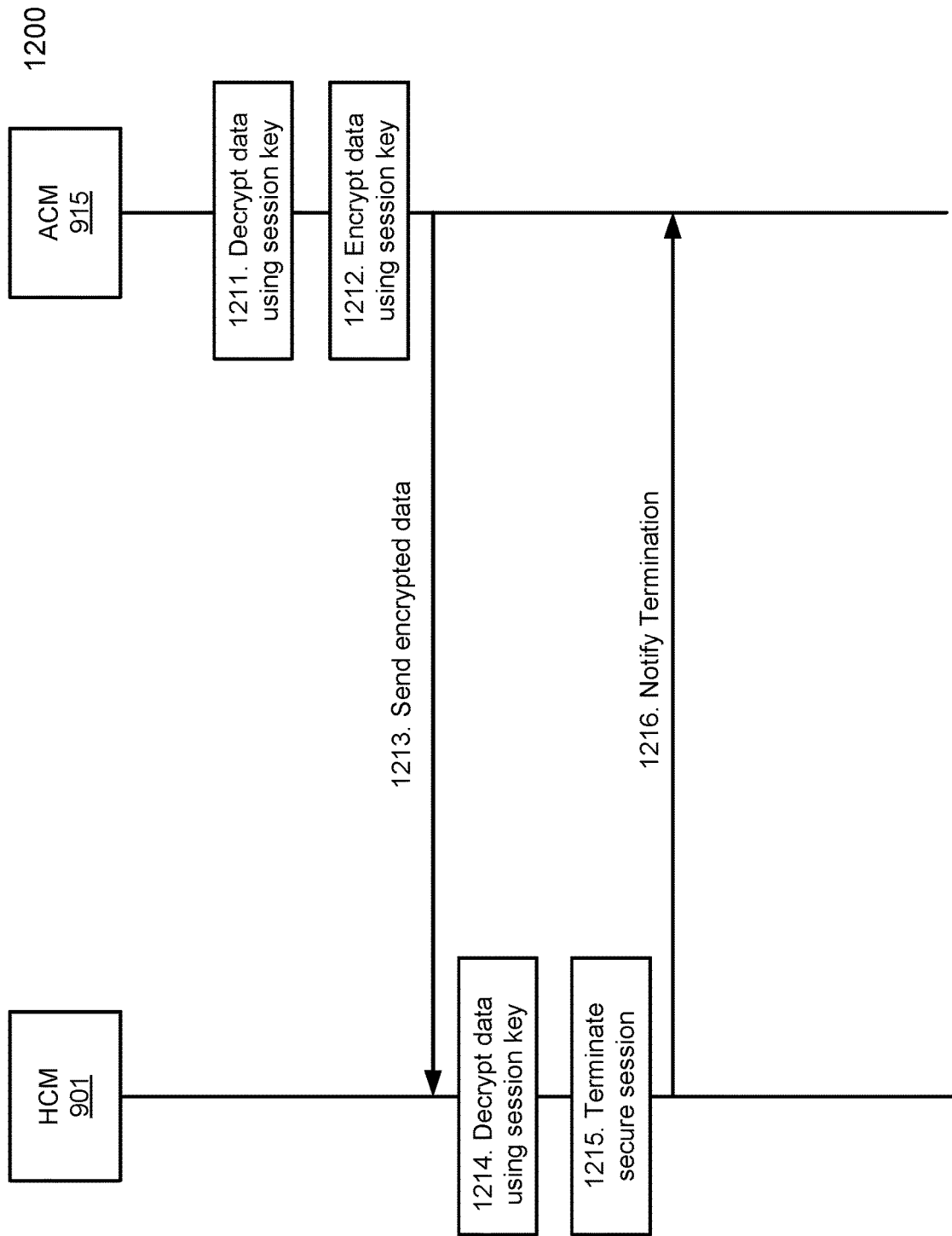

FIGS. 12A-12B are block diagrams illustrating an example of a secure information exchange between a host and a DP accelerator according to one embodiment. Example 1200 may be performed by system 1000 of FIG. 10. Referring to FIGS. 10 and 12A-12B, in one embodiment, before any data communication is to take place between a DP accelerator (such as DP accelerators 405) and an application (hosted on host server 104) requesting DP accelerator resources, a secured information exchange channel is required to be setup or established between host server 104 and the DP accelerator. The information exchange channel setup can be initiated by a user application of host server 104. For example a user application (such as a user application of application 203 of FIG. 9) can request HCM 901 to setup a secure data exchange channel. Authentication module 1001 can receive the request and authenticate that the user application is a trusted application. In one embodiment, authentication module 1001 verifies a permission of the user application or of a client access the user application, e.g., verifies whether the user application or client has a permission to use resources from the requested DP accelerator(s). If permitted, information can then be exchanged between the user application and the DP accelerator through the secure channel by way of a session key to encrypt and decrypt the information exchanges.

In one embodiment, to create a session key, HCM 901 generates a first public/private key pair associated with the application and/or channel, or the first public/private key pair may be a key pair associated with HCM 901. The first public/private key pair can be stored in the key(s) store 1007 and the first public key is sent to DP accelerator 405 (or ACM 915) (e.g., operation 1201). ACM 915 then generates a unique session key (e.g., a second session key) for the session (e.g., operation 1202), where the session key can be used to encrypt/decrypt data packets communicated to and from host server 104 (e.g., operations 1205-1216). In one embodiment, the session key is a symmetric key derived (or generated) based on a hash function, such as a cyclical redundancy check, a checksum, or a cryptographic hash function, or a random hash/number generator.

In one embodiment, when ACM 915 receives the first public key, ACM 915 generates a second public/private key pair for the channel, where the second private key of the second public/private key pair and the first public key are used to encrypt the session key or constituents of the session key. In another embodiment, the second public/private key pair is a key pair associated with DP accelerator 405. In one embodiment, the first public key, second public key, second private key, and/or the session key can be stored in key(s) store 1027. The session key (or constituents thereof) can then be encrypted by the first public key and the encrypted can be further encrypted by the second private key (e.g., doubly encrypted), and the doubly encrypted session key information together with the second public key can be sent to HCM 901 (e.g., operation 1203).

Key manager 1005 of HCM 901 can then decrypt the encrypted session key based on the second public key and the first private key (e.g., operation 1204) to derive the session key (e.g., to generate a first session key). Thereafter, data communicated from the DP accelerator to the host server 104, or vice versa (e.g., operations 1205-1216), can use the symmetrical session key to encrypt and decrypt the data for communication. E.g., data are encrypted and are then sent over the information exchange channel by a sender. The received data is to be decrypted by a receiver. Here, host server 104 and DP accelerator 405 can read these data packets because host server 104 and DP accelerator 405 have the same symmetric session key to encrypt and decrypt the data packets.

In one embodiment, host server 104 (e.g., HCM 901) cannot directly access a memory buffer of DP accelerator 405 (e.g., ACM 915), but DP accelerator can access a memory buffer of host server 104. Thus, operations 1205-1211 are operations to send an encrypted data packet from host server 104 to DP accelerator 405, while operations 1212-1216 are operations to send an encrypted data packet from DP accelerator 405 to host server 104. Here, operations 1206-1210 are similar to operations 701-705 of FIG. 7 for the host server 104 to provide a data packet to DP accelerator 405.

Finally, when the application signals a completion for the session, application can request HCM 901 to terminate the session. Termination module 1003 can then request key manager 1005 to destroy the session key (e.g., the first session key) associated with the session (as part of operation 1215) and send a termination notification (e.g., operation 1216) to ACM 915 of DP accelerator 405 to request key manager 1025 to destroy the symmetric session key (e.g., the second session key) associated with the session. Although HCM 901 is shown to communicate with only ACM 915, however, HCM 901 can communicate with multiples of ACMs corresponding to multiples of DC accelerators to establish multiple data exchange connections at the same time.

Figure 13A:
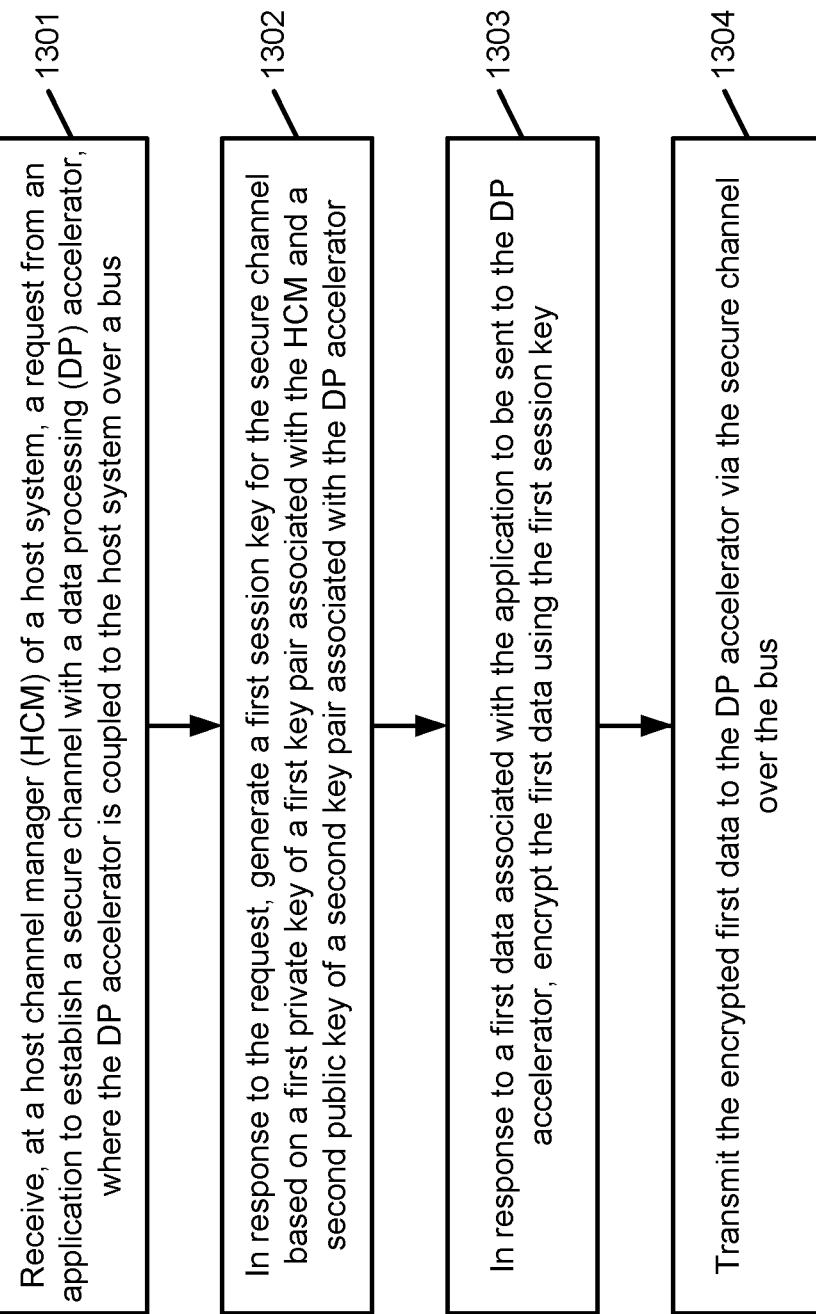
FIGS. 13A and 13B are flow diagrams illustrating example methods according to some embodiments.
Figure 13B:
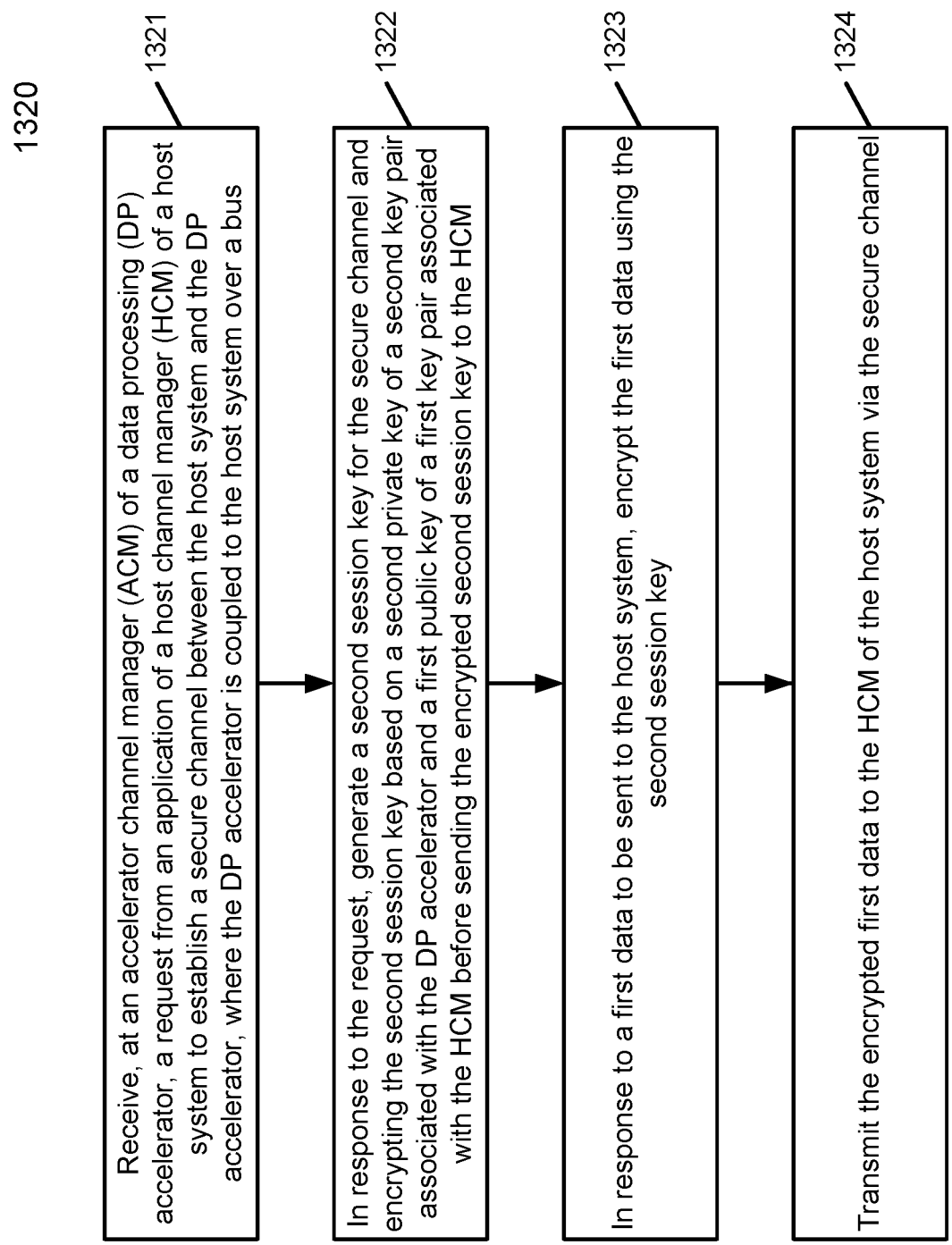

FIGS. 13A and 13B are flow diagrams illustrating example methods according to some embodiments. Processes 1300 and 1320 may be performed by processing logic which may include software, hardware, or a combination thereof. For example, process 1300 may be performed by a host system (e.g., HCM 901) of FIG. 9, and process 1320 may be performed by a DP accelerator (e.g., ACM 915) of FIG. 9. Referring to FIG. 13A, at block 1301, processing logic receives, at a host channel manager (HCM) of a host system, a request from an application to establish a secure channel with a data processing (DP) accelerator, where the DP accelerator is coupled to the host system over a bus. At block 1302, in response to the request, processing logic generates a first session key for the secure channel based on a first private key of a first key pair associated with the HCM and a second public key of a second key pair associated with the DP accelerator. At block 1303, in response to a first data associated with the application to be sent to the DP accelerator, processing logic encrypt the first data using the first session key. At block 1304, processing logic transmits the encrypted first data to the DP accelerator via the secure channel over the bus.

In one embodiment, in response to the request, processing logic further transmits a first public key of the first key pair associated with the HCM to the DP accelerator. Processing logic then receives the second public key of the second key pair associated with the DP accelerator from an accelerator channel manager (ACM) of the DP accelerator, in response to transmitting the first public key. In another embodiment, the ACM is configured to derive a second session key and to encrypt the second session key based on the first public key and a second private key of the second key pair before sending the encrypted second session key to the HCM, where the first session key and the second session key is a same symmetric key. In another embodiment, the ACM is configured to decrypt the encrypted first data using the second session key to recover the first data.

In one embodiment, processing logic further receives an encrypted second data from the ACM of the DP accelerator, wherein the second data was encrypted using the second session key. Processing logic then decrypts the encrypted second data using the first session key to recover the second data. In one embodiment, in response to the request, processing logic further examines an application identifier (ID) of the application to determine whether the application is entitled to access the DP accelerator, where the first session key is generated only if the application is entitled to access the DP accelerator. In one embodiment, processing logic further receives a request to terminate the secure channel from the application. In response to the request, processing logic transmits an instruction to the ACM instructing the ACM to terminate the secure connection by destroying the second session key. Processing logic then destroys the first session key by the HCM.

Referring to FIG. 13B, in one embodiment, at block 1321, processing logic receives, at an accelerator channel manager (ACM) of a data processing (DP) accelerator, a request from an application of a host channel manager (HCM) of a host system to establish a secure channel between the host system and the DP accelerator, where the DP accelerator is coupled to the host system over a bus. At block 1322, in response to the request, processing logic generates a second session key for the secure channel and encrypts information of the second session key based on a second private key of a second key pair associated with the DP accelerator and a first public key of a first key pair associated with the HCM before sending the encrypted second session key information to the HCM. At block 1323, in response to a first data to be sent to the host system, processing logic encrypts the first data using the second session key. At block 1324, processing logic transmits the encrypted first data to the HCM of the host system via the secure channel.

In one embodiment, in response to the request, processing logic further transmits a second public key of the second key pair associated with the DP accelerator to the HCM of the host system and receives the first public key of the first key pair associated with the HCM from the HCM. In another embodiment, the HCM is configured to derive a first session key based on the first private key of the first key pair associated with the HCM and a second public key of the second key pair associated with the DP accelerator. In another embodiment, the HCM is configured to decrypt the encrypted first data using the first session key to recover the first data.

In another embodiment, processing logic further receives encrypted second data from the HCM of the host system, where the second data was encrypted using the first session key. Process logic then decrypts the encrypted second data using the second session key to recover the second data, where the first session key and the second session key is a same symmetric key. In one embodiment, processing logic further receives a request to terminate the secure channel from the HCM of the host system and in response to the request, processing logic destroys the first session key by the ACM.

Figure 14:
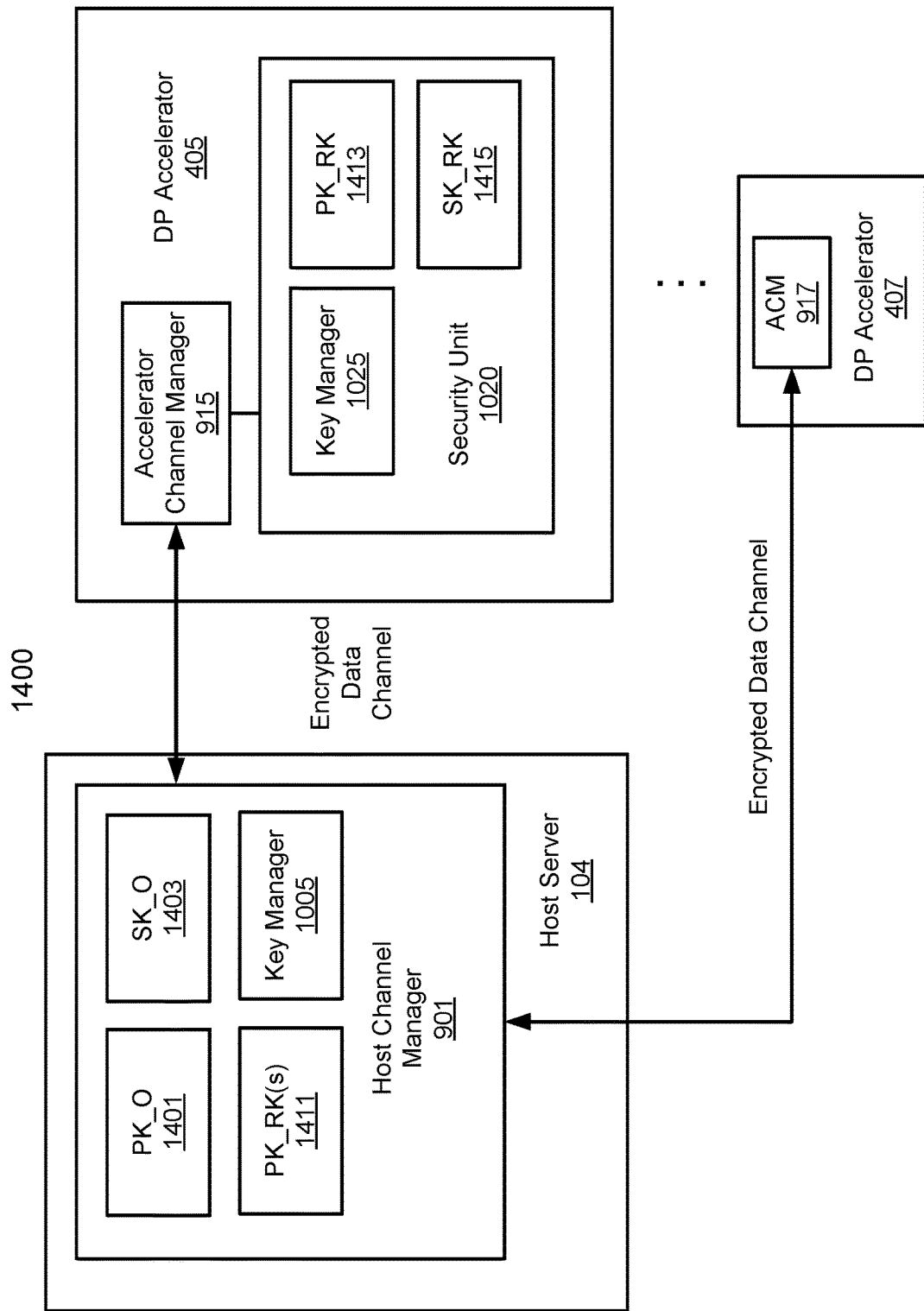
FIG. 14 is a block diagram illustrating an example system for establishing a secure information exchange channel between a host channel manager (HCM) and an accelerator channel manager (ACM) according to one embodiment.

FIG. 14 is a block diagram illustrating an example system for establishing a secure information exchange channel between a host channel manager (HCM) and an accelerator channel manager (ACM) according to one embodiment. System 1400 may be a detailed view of system 900 of FIG. 9. Referring to FIG. 14, in one embodiment, HCM 901 includes keys PK_O 1401, SK_O 1403, and PK_RK(s) 1411. Keys PK_O 1401 and SK_O 1403 are respectively a public key and a private key of an asymmetric cryptographic key pair associated with HCM 901 and/or an application/runtime of host server 104, and key PK_RK(s) 1411 are one or more public keys associated with ACM 915 of DP accelerator 405 and/or other DP accelerators. HCM 901 can also include key manager 1005. DP accelerator 405 can include security unit 1020 coupled to ACM 915, where the security unit 1020 can include keys PK_RK 1413 and SK_RK 1415, which are respectively a public and a private key of an asymmetric cryptographic key pair associated with ACM 915 and/or DP accelerator 405. ACM 915 also includes key manager 1025. Key managers 1005 and 1025 can generate encryption/decryption keys using a symmetric algorithm (e.g., AES) and/or an asymmetric algorithm (e.g., Diffie-Hellman key exchange protocol, RSA, etc.).

Figure 15:
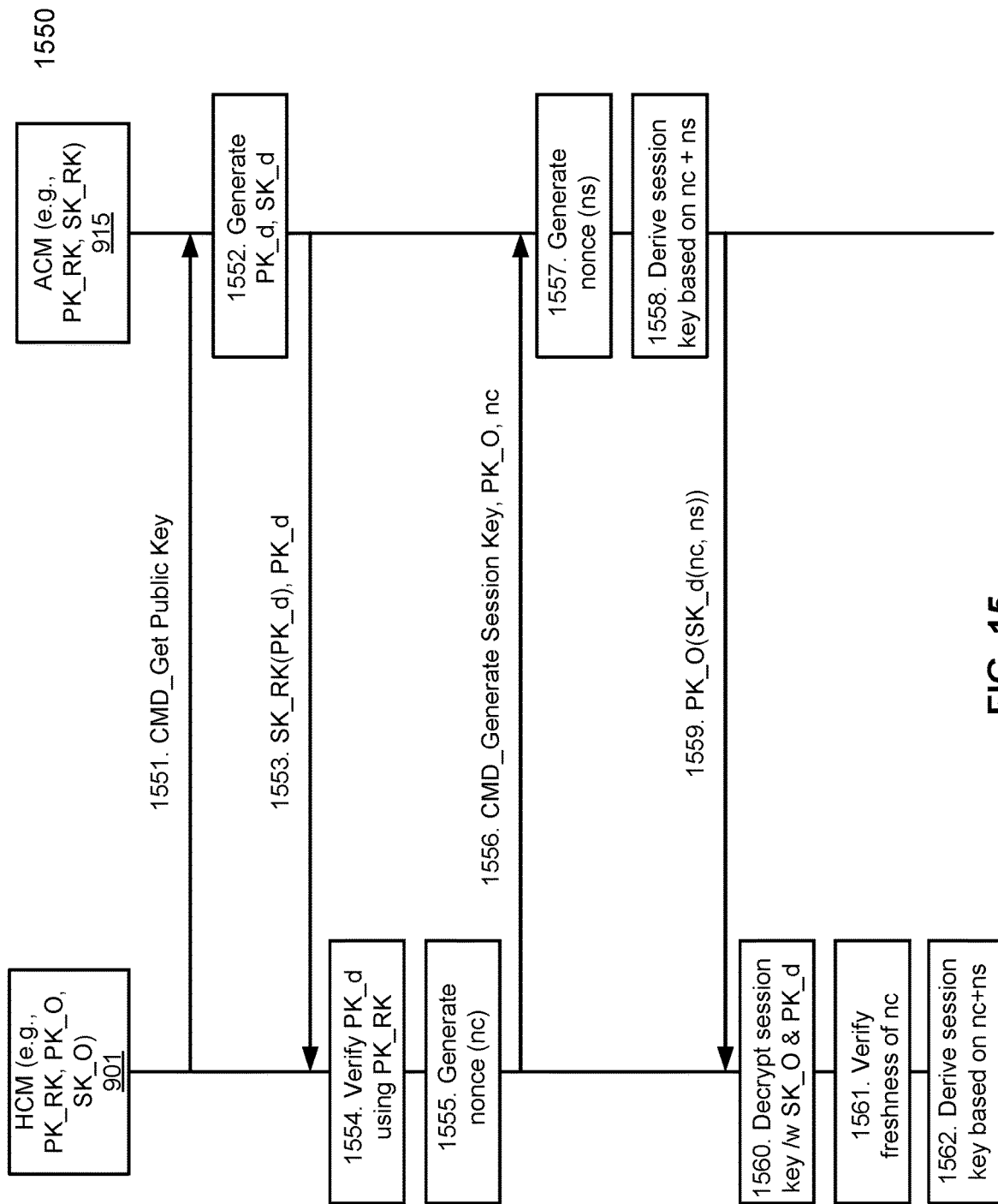
FIG. 15 is a block diagram illustrating an example information exchange to derive a session key between a host and a DP accelerator according to one embodiment.

FIG. 15 is a block diagram illustrating an example information exchange to derive a session key between a host and a DP accelerator according to one embodiment. Example 1550 includes a number of operations to derive a session key, which may be performed by system 1400 of FIG. 14. Referring to FIGS. 14 and 15, in one embodiment, at operation 1551, HCM 901 sends a command "CMD get public key" to ACM 915 to initiate a process to derive a session key. At operation 1552, upon receipt of the request command, ACM 915 generates a temporary (or a derived) public/private key pair (e.g., PK_d and SK_d) for derivation of a session key. ACM 915 encrypts the temporary public key PK_d with a private root key (e.g., SK_RK) associated with the DP accelerator. At operation 1553, a copy of the encrypted temporary public key and a copy of the temporary public key are sent by ACM 915 to HCM 901. At operation 1554, HCM 901 receives the copies and decrypts the encrypted temporary public key using PK_RK (here, PK_RK can be previous received by HCM 901 and is stored as PK_RK(s) 1411 of HCM 901 of FIG. 14) and the temporary public key that is decrypted is compared with the copy of temporary public key PK_d received at operation 1553. If the decrypted key matches the temporary public key, then HCM 901 has verified that the message is from an expected party. Note, PK_RK(s) 1411 can contain a number of public keys for a number of DP accelerators 405-407.

At operation 1555, HCM 901 generates a first random nonce (nc). At operation 1556, HCM 901 sends a command "CM_generate session key", a public key associated with the HCM (e.g., PK_O), and the nonce nc to ACM 915. At operation 1557, upon receiving the "CM_generate session key" command, ACM 915 generates a second random nonce (ns). At operation 1558, ACM 915 derives a session key based on the first and the second random nonce, nc and ns. In one embodiment, the session key is derived by a hash function of random nonce nc concatenated with random nonce ns. In another embodiment, the session key is derived by a hash function of a valued based on nc added with ns. The session key is then used to encrypt and decrypt data exchanged between ACM 915 and HCM 901.

At operation 1559, ACM 915 doubly encrypts the nonces nc and ns with the temporary private key (e.g., SK_d), followed by the public key associated with the HCM (e.g., PK_O). ACM 915 then sends the doubly encrypted nonces, nc and ns, to HCM 901. At operation 1560, HCM 901 decrypts the doubly encrypted nonces nc and ns based on the HCM associated private key (e.g., SK_O) and the temporary public key (e.g., PK_d). At operation 1561, HCM 901 verifies a freshness of the session key by verifying random nonce nc is indeed identical to a copy of the random nonce nc originally generated by HCM 901. If yes, at operation 1562, HCM 901 derives a session key based on the first and the second random nonce (e.g., nc and ns). In one embodiment, the session key is derived by a hash function of random nonce nc concatenated with random nonce ns. In another embodiment, the session key is derived by a hash function of a valued based on nc added with ns. The session key is then used to encrypt and decrypt data exchanged between HCM 901 and ACM 915. Note, although the session key is described as a cryptographic key based on a symmetric encrypt algorithm, the session key may also be a public/private key pair.

Figure 16A:
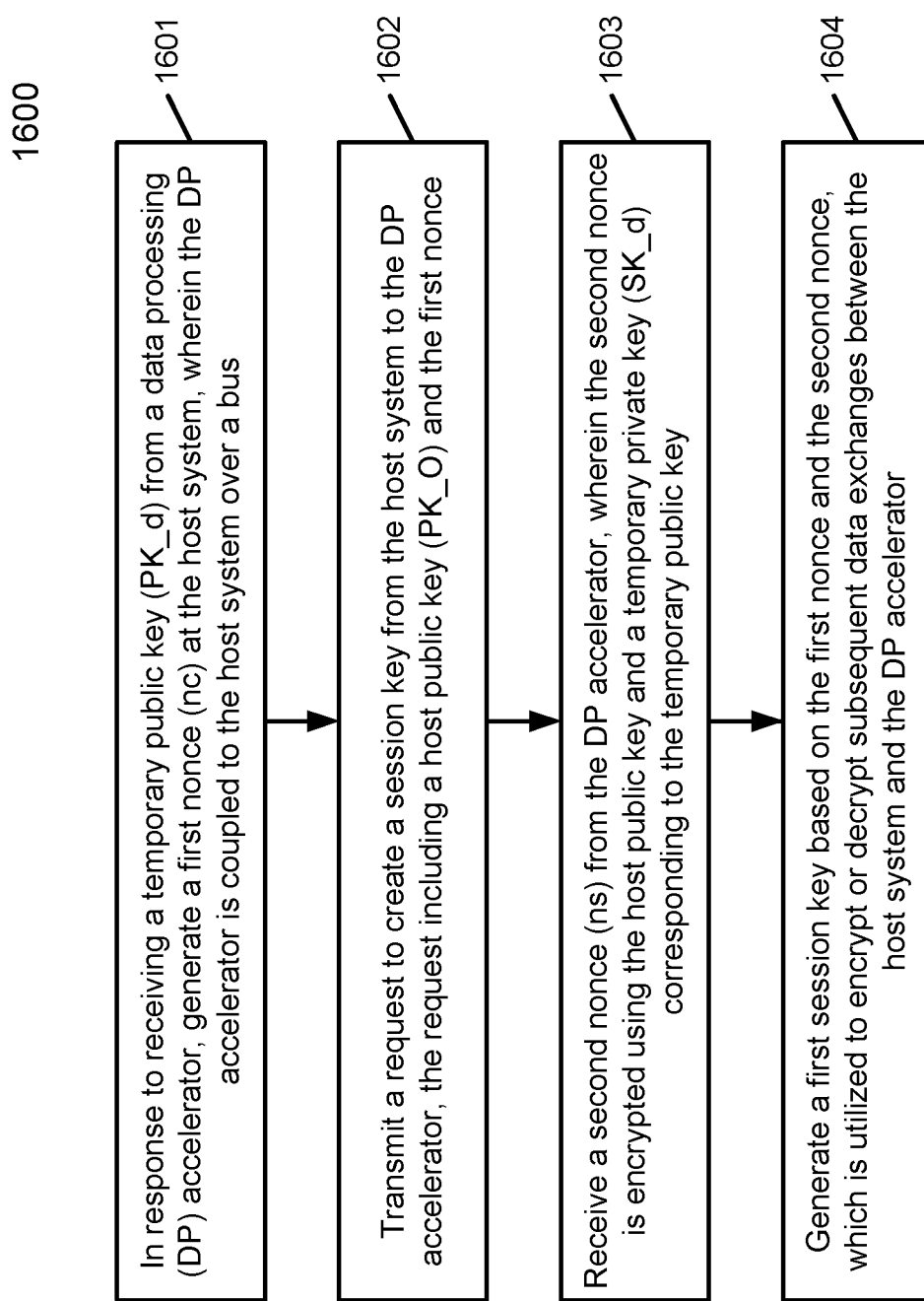
FIGS. 16A and 16B are flow diagrams illustrating example methods according to some embodiments.
Figure 16B:
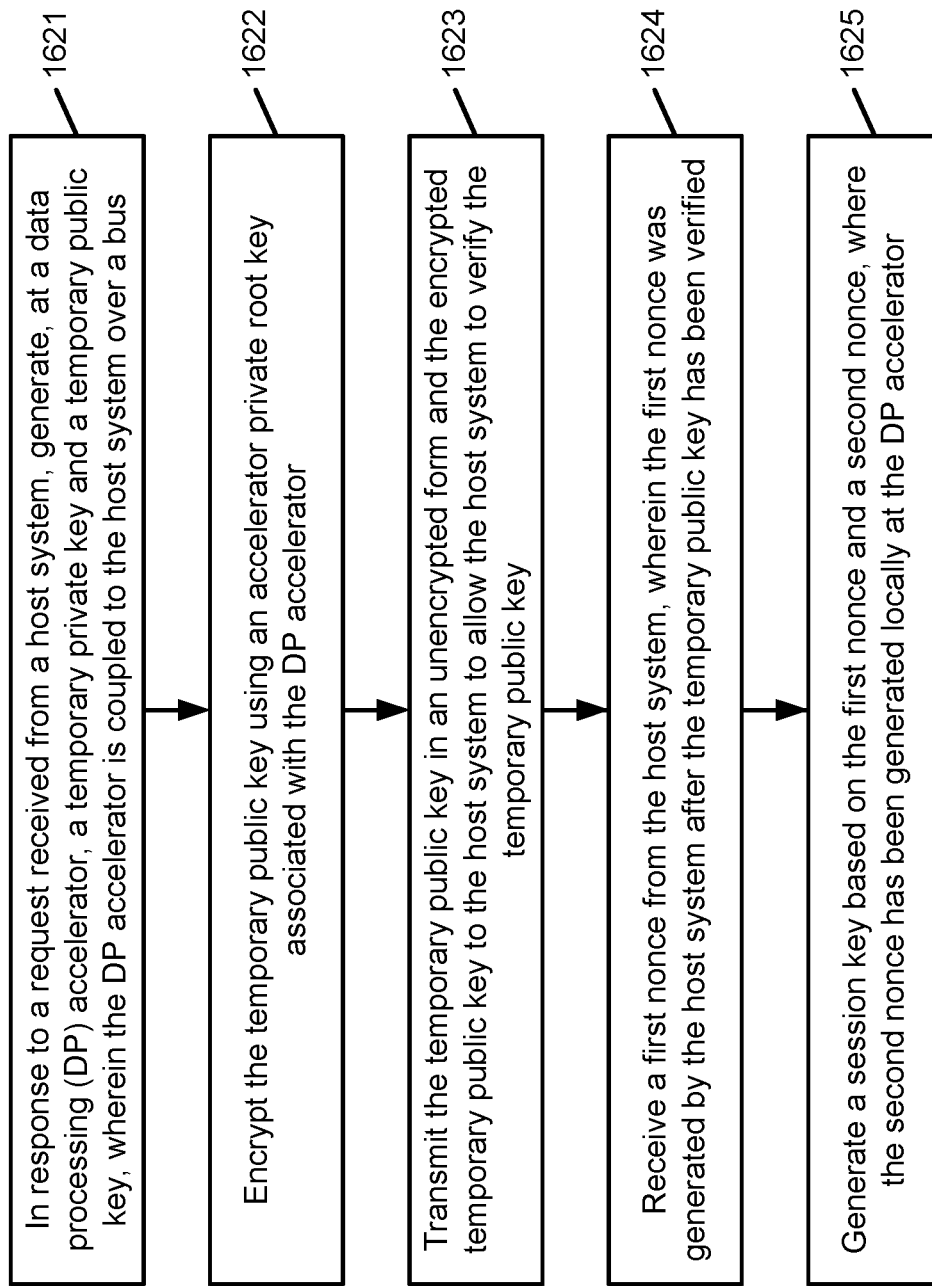

FIGS. 16A and 16B are flow diagrams illustrating example methods according to some embodiments. Processes 1600 and 1620 may be performed by processing logic which may include software, hardware, or a combination thereof. For example, process 1600 may be performed by a host server (e.g., HCM 901) of FIG. 14, and process 1620 may be performed by a DP accelerator (e.g., ACM 915) of FIG. 14. Referring to FIG. 16A, at block 1601, in response to receiving a temporary public key (PK_d) from a data processing (DP) accelerator, processing logic generates a first nonce (nc) at the host system, where the DP accelerator is coupled to the host system over a bus. At block 1602, processing logic transmits a request to create a session key from the host system to the DP accelerator, the request including a host public key (PK_O) and the first nonce. At block 1603, processing logic receives a second nonce (ns) from the DP accelerator, where the second nonce is encrypted using the host public key and a temporary private key (SK_d) corresponding to the temporary public key. At block 1604, processing logic generates a first session key based on the first nonce and the second nonce, which is utilized to encrypt or decrypt subsequent data exchanges between the host system and the DP accelerator.

In one embodiment, processing logic further transmits a request from the host system to the DP accelerator to request the DP accelerator to generate a derived or temporary key pair having the temporary public key and the temporary private key, where the DP accelerator creates the temporary key pair in response to the request. The temporary key may be used once or several times over a predetermined period of time such as days, weeks, or even months depending on an implementation by the DP accelerator. In another embodiment, the temporary public key from the DP accelerator is a first temporary public key, and processing logic further receives an encrypted second temporary public key that has been encrypted using an accelerator private root key (SK_RK) by the DP accelerator. In another embodiment, processing logic further decrypts the encrypted second temporary public key using an accelerator public root key (PK_RK) corresponding to the accelerator private root key to recover a second temporary public key. Processing logic then verifies whether the first temporary public key and the second temporary public key are identical, where the first nonce is generated when the first and second temporary public keys are identical.

In one embodiment, receiving a second nonce from the DP accelerator includes receiving the first nonce and the second nonce that have been encrypted using a temporary private key corresponding to the temporary public key. In another embodiment, processing logic further decrypts the encrypted first nonce and second nonce using the first or the second temporary public key at the host system to recover the first nonce and the second nonce. In another embodiment, the first nonce and the second nonce encrypted by the temporary private key are further encrypted using the host public key by the DP accelerator. In another embodiment, processing logic further decrypts the encrypted first nonce and second nonce using a host private key corresponding to the host public key to recover the first nonce and the second nonce.

Referring to FIG. 16B, in one embodiment, at block 1621, in response to a request received from a host system, processing logic generates, at a data processing (DP) accelerator, a temporary private key and a temporary public key, where the DP accelerator is coupled to the host system over a bus. At block 1622, processing logic encrypts the temporary public key using an accelerator private root key associated with the DP accelerator. At block 1623, processing logic transmits the temporary public key in an unencrypted form and the encrypted temporary public key to the host system to allow the host system to verify the temporary public key. At block 1624, process logic receives a first nonce from the host system, where the first nonce was generated by the host system after the temporary public key has been verified. At block 1625, processing logic generates a session key based on the first nonce and a second nonce, where the second nonce has been generated locally at the DP accelerator.

In one embodiment, processing logic further encrypts the first nonce and the second nonce using the temporary private key to generate encrypted first nonce and second nonce. Process logic then transmits the encrypted first nonce and second nonce to the host system to enable the host system to create a corresponding host session key. In another embodiment, processing logic further encrypts the encrypted first nonce and second nonce using a host public key associated with the host system, prior to transmitting the encrypted first nonce and second nonce. In another embodiment, the host system is configured to decrypt the encrypted first nonce and second nonce using a host private key associated with the host system and the temporary public key to recover the first nonce and the second nonce. In another embodiment, the host system is configured to verify freshness of the first nonce, where the host session key is generated only if the first nonce was generated within a predetermined period of time.

Memory buffers of DP accelerators can contain programs required to run a DP accelerator, input data to the programs, and output results from the programs. Unsecured memory buffers of DP accelerators can lead to a compromise in the overall host server-DP accelerators system architecture. Memory buffers of DP accelerators can be secured by not allowing a host server to access these PD accelerators, as described above. For the scenario where a host server cannot access a memory buffer of DP accelerators, the host server however can retain memory usage information for the DP accelerators. The memory usage information can be retained in a trusted execution environment (TEE) which can ensure data confidentiality and integrity.

Figure 17:
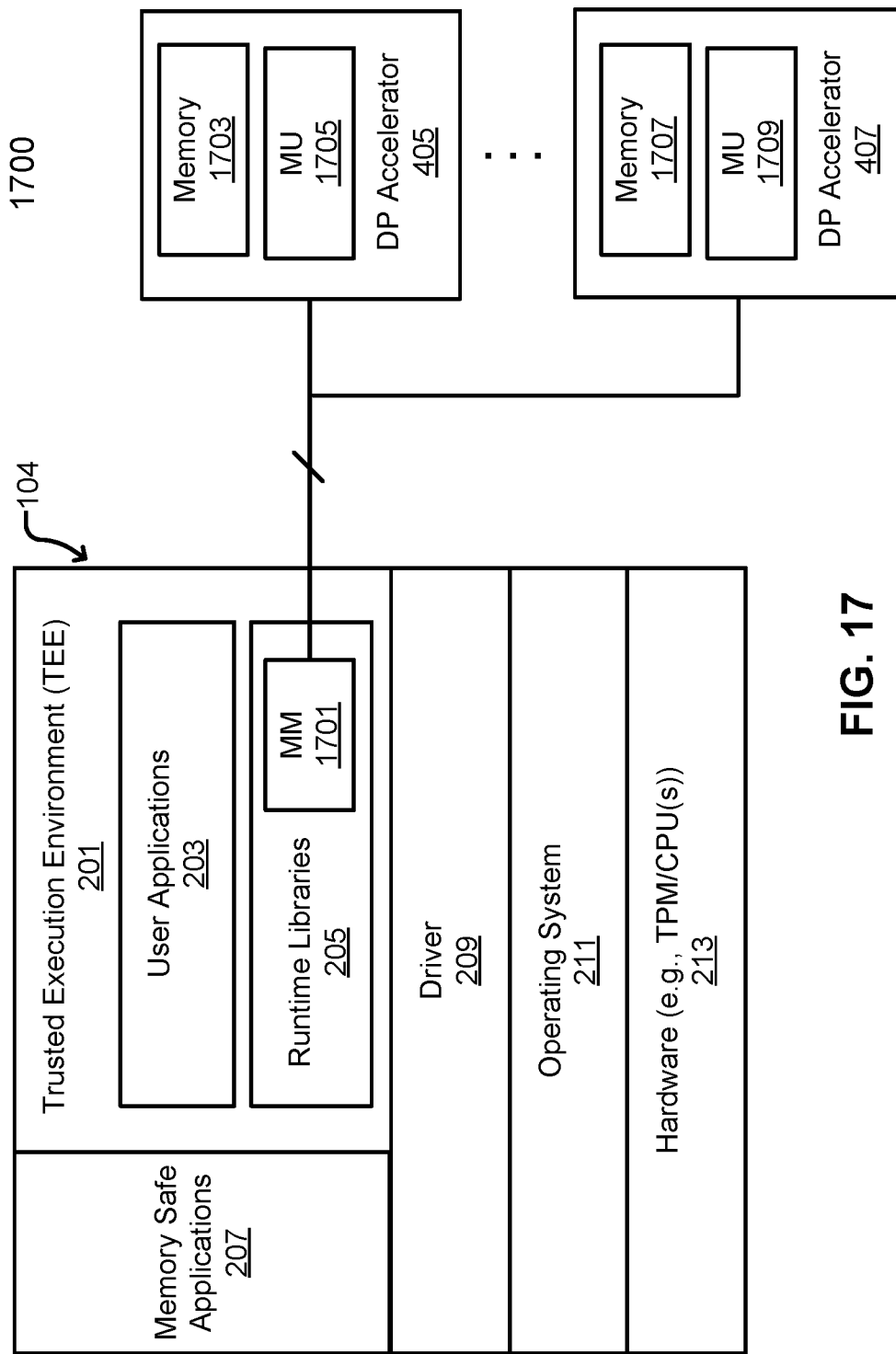
FIG. 17 is a block diagram illustrating an example of a host having a secure memory manager (MM) to secure memory buffers of DP accelerators according to one embodiment.

FIG. 17 is a block diagram illustrating an example of a host having a secure memory manager (MM) to secure memory buffers of DP accelerators according to one embodiment. System 1700 may represent system 900 of FIG. 9 to provide the secure memory manager on host server 104 to manage memory of DP accelerators. Referring to FIG. 17, in one embodiment, host server 104 includes runtime libraries 205 which includes MM 1701. Correspondingly, DP accelerator 405 can include memory 1703 and memory unit (MU) 1705, while DP accelerator 407 can include memory 1707 and MU 1709. Memory manager can manage a memory of DP accelerator. Memories 1703 and 1707 can be global memories of DP accelerators. A global memory can be a component in accelerator for storing information such as program codes to be executed on DP accelerators, inputs to the program codes and output results from execution of the program. MU 1705 and 1709 can communicate and coordinate with MM 1701 about memory layout and memory usage of memories 1703 and 1707 of DP accelerators, respectively.

Figure 18:
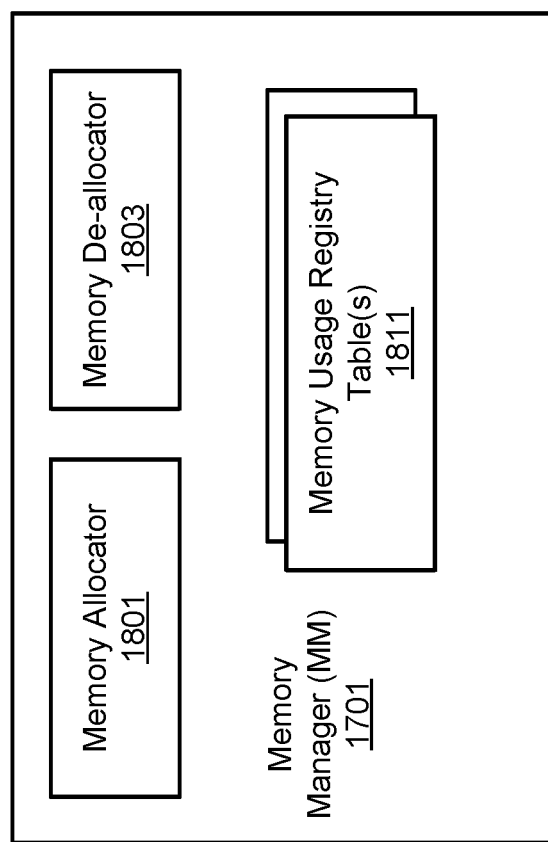
FIG. 18 is a block diagram illustrating an example of a memory manager (MM) according to some embodiments.

FIG. 18 is a block diagram illustrating an example of a memory manager (MM) according to some embodiments. Referring to FIG. 18, memory manager 1701 can includes memory allocator 1801, memory de-allocator 1803, and memory usage registry table(s) 1811. Memory allocator 1801 can allocate a block of memory from a global memory of a DP accelerator (e.g., memory 1703 of DP accelerator 405). Memory de-allocator 1803 can de-allocate a block of memory from a global memory of a DP accelerator. Memory usage registry table(s) 1811 can record memory layout and usage information for memory blocks associated with DP accelerators of the host server. In one embodiment, each table (as part of registry table(s) 1811) can be related to a DP accelerator and the table can have multiple entries for multiple user applications. For example, a user application can have two entries for to reserve two memory blocks of the DP accelerator. The registry table(s) can then be used as a reference to allocate or de-allocate memory blocks for the DP accelerators. Memory usage registry table(s) 1811 can include one or more memory management tables. A memory management table is a data structure used by a system in a computer operating system to store a mapping between user applications and physical addresses and/or virtual addresses. An example memory usage registry table for a DP accelerator can have fields such as application ID, start address, and size, where the application ID denotes which user application has been allocated a block of memory, and the start address and size denotes an address and a size of the block of memory. In some embodiments, registry table(s) can include additional fields such as flags indicating whether a corresponding memory block has been allocated, a physical address to virtual address memory is mapped, read or write access, etc. Note that there may be many memory usage registry tables, one for each DP accelerator.

Referring to FIGS. 17-18, for one example, a remote client may issue a command to run a particular application (as part of user applications 203) on host server 104. The application can request via a call to an API provided by runtime libraries 205 to use resources from DP accelerators 405-407. The resources can be a memory resource or a processor resource. For a memory resource example, upon receiving the request, runtime libraries 205 can launch an instance of MM 1701. Runtime libraries 205 can then command DP accelerator 405, via memory allocator 1801 of the instance, to allocate a memory block of a designated size from memory 1703 of DP accelerator 405 for execution of the application.

In one embodiment, prior to requesting the resource block, MM 1701 can query memory usage registry table(s) 1811 to determine if a resource block has already been allocated. MM 1701 then sends an allocation command to DP accelerator 405 to allocate the first memory block of the global memory to the application, in response to determining that the first memory block has not been allocated. In another embodiment, MM 1701 denies the first request, in response to determining that a request memory block has been allocated.

MU 1705 receives the command and carries out the memory allocation. In one embodiment, MU 1705 can traverse memory 1703 to find a continuous memory block having the request memory block size to be allocated. Here, MU 1705 can also retain a similar memory usage registry table (e.g., memory usage data structure) for DP accelerator 405 for MU 1705 to traverse memory 1703 for DP accelerator 405. In another embodiment, MM 1701 sends the allocation command and a copy of the memory usage registry table to DP accelerator 405. This way, MU 1705 is aware of the already allocated memory. MU 1705 can then allocate a memory block based on the memory usage information and return new memory usage information for the newly allocated memory block back to MM 1701. MM 1701 then records an application identifier corresponding to the application requesting the memory block, a starting address and the size for the allocated memory block onto memory usage registry table(s) 1811. Subsequent to the memory allocation, if an application running within the TEE tries to access a memory location of DP accelerator 405-407, MM 1701 can search registry table(s) 1811 and verify if the memory location is allocated to the application. If it is, the application is allowed to access the memory location. Otherwise, the application is denied access to the memory location. Note that once a memory block is allocated, the memory block cannot be subsequently allocated until it is free.

In another embodiment, when MU 1705 returns memory usage information upon allocation of a memory block, to avoid transmission of a physical address across a communicate channel, MU 1705 can instead return a virtual memory address to MU 1701. Here, MU 1705 can include a physical memory address to virtual memory address mapping table. The mapping table can map a virtual memory address to a physical memory address for memory 1703 of DP accelerator 405. This way, MU 1705 only discloses a virtual memory address so that a physical address of memory 1703 is not disclosed over a communication channel.

When an execution of the user application completes or when a client issues a completion command, in one embodiment, the user application can send a memory deallocation command for memory block(s) associated with the user application to DP accelerator 405. In another embodiment, a copy of a registry table is also sent to DP accelerator 405. In one embodiment, prior to sending a memory deallocation command, MM 1701 determines whether the memory block has been allocated to the application based on the memory usage information stored in the memory usage data structure. If it is then the deallocation command is sent. Otherwise, a deallocation command is not sent (e.g., the deallocation request may be denied).

MU 1705 receives the deallocation command and carries out the memory deallocation. In one embodiment, MU 1705 traverses memory 1703 to locate the memory block to reset the memory buffers for the memory block. MU 1705 then returns a status completion and/or new memory usage information to MM 1701. MM 1701 then updates (e.g., deletes an entry) memory usage registry table(s) 1811 according to the status completion and/or new memory usage information.

Figure 19:
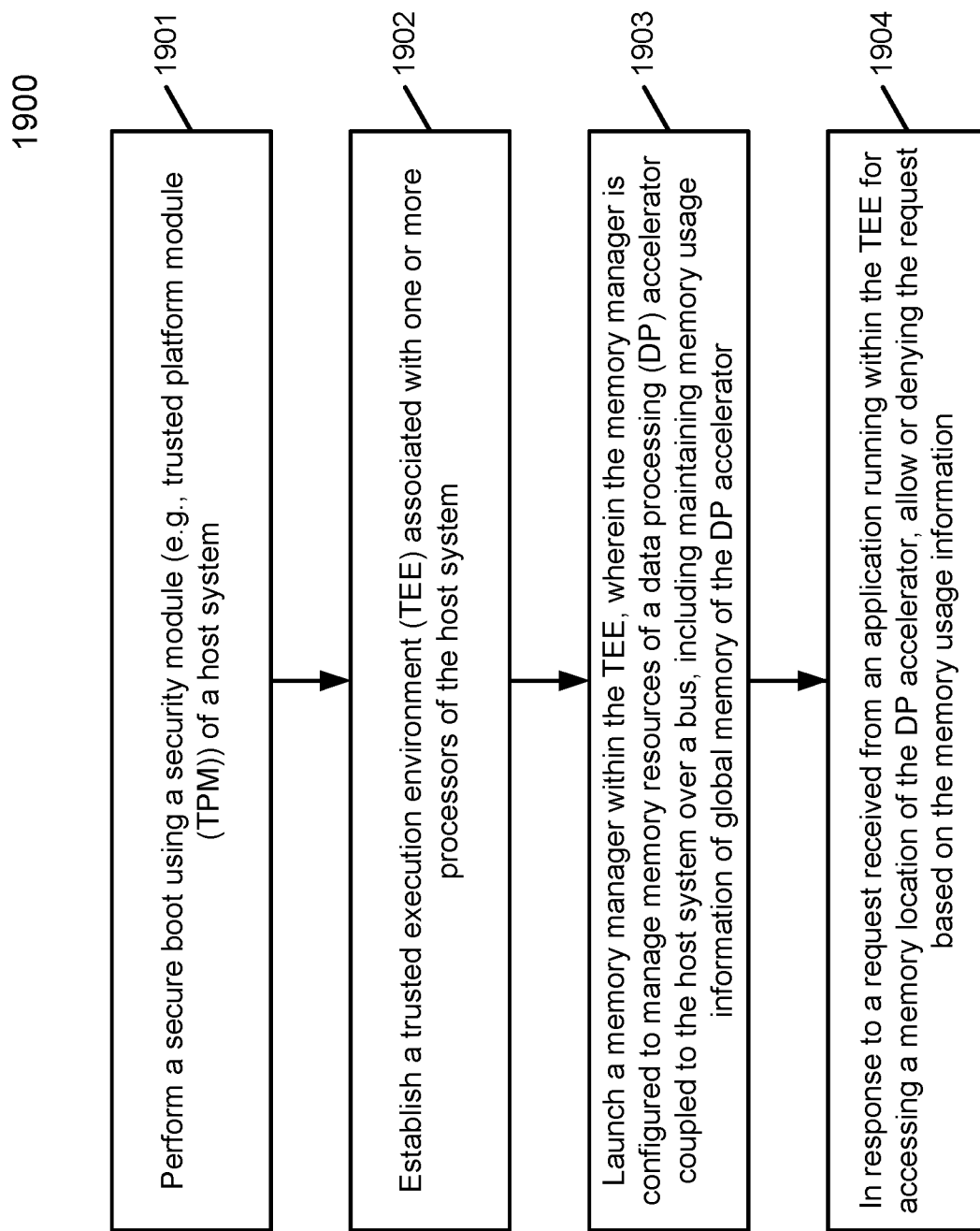
FIG. 19 is a flow diagram illustrating an example of a method according to one embodiment.

FIG. 19 is a flow diagram illustrating an example of a method according to one embodiment. Process 1900 may be performed by processing logic which may include software, hardware, or a combination thereof. For example, process 1900 may be performed by a host system, such as host 104 of FIG. 17. Referring to FIG. 19, at block 1901, processing logic performs a secure boot using a security module such as a trusted platform module (TPM) of a host system. At block 1902, processing logic establishes a trusted execution environment (TEE) associated with one or more processors of the host system. At block 1903, processing logic launches a memory manager within the TEE, where the memory manager is configured to manage memory resources of a data processing (DP) accelerator coupled to the host system over a bus, including maintaining memory usage information of global memory of the DP accelerator. At block 1904, in response to a request received from an application running within the TEE for accessing a memory location of the DP accelerator, processing logic allows or denies the request based on the memory usage information.

In one embodiment, the memory manager is implemented as a part of a runtime library associated with the DP accelerator, which is executed within the TEE of the host system. In one embodiment, maintaining memory usage information of global memory of the DP accelerator includes maintaining a memory usage data structure to record memory allocation of memory blocks of the global memory of the DP accelerator. In another embodiment, the memory usage data structure includes a number of entries, each entry recording a memory block of the global memory of the DP accelerator that has been allocated. In another embodiment, each entry stores a starting memory address of a corresponding memory block, a size of the corresponding memory block, and a flag indicating whether the corresponding memory block has been allocated.

In another embodiment, processing logic further receives a first request from the application to allocate a first memory block from the global memory of the DP accelerator. In response to the first request, processing logic determines whether the first memory block has been allocated based on the memory usage information stored in the memory usage data structure, without having to interrogate the DP accelerator. Processing logic then allocates the first memory block of the global memory to the application, in response to determining that the first memory block has not been allocated.

In another embodiment, processing logic further denies the first request, in response to determining that the first memory block has been allocated. In another embodiment, processing logic further receives a second request from the application to deallocate a second memory block from the global memory of the DP accelerator. In response to the second request, processing logic determines whether the second memory block has been allocated to the application based on the memory usage information stored in the memory usage data structure. Processing logic deallocates the second memory block from the global memory, in response to determining that the second memory block has been allocated to the application, and otherwise denies the second request.

Figure 20:
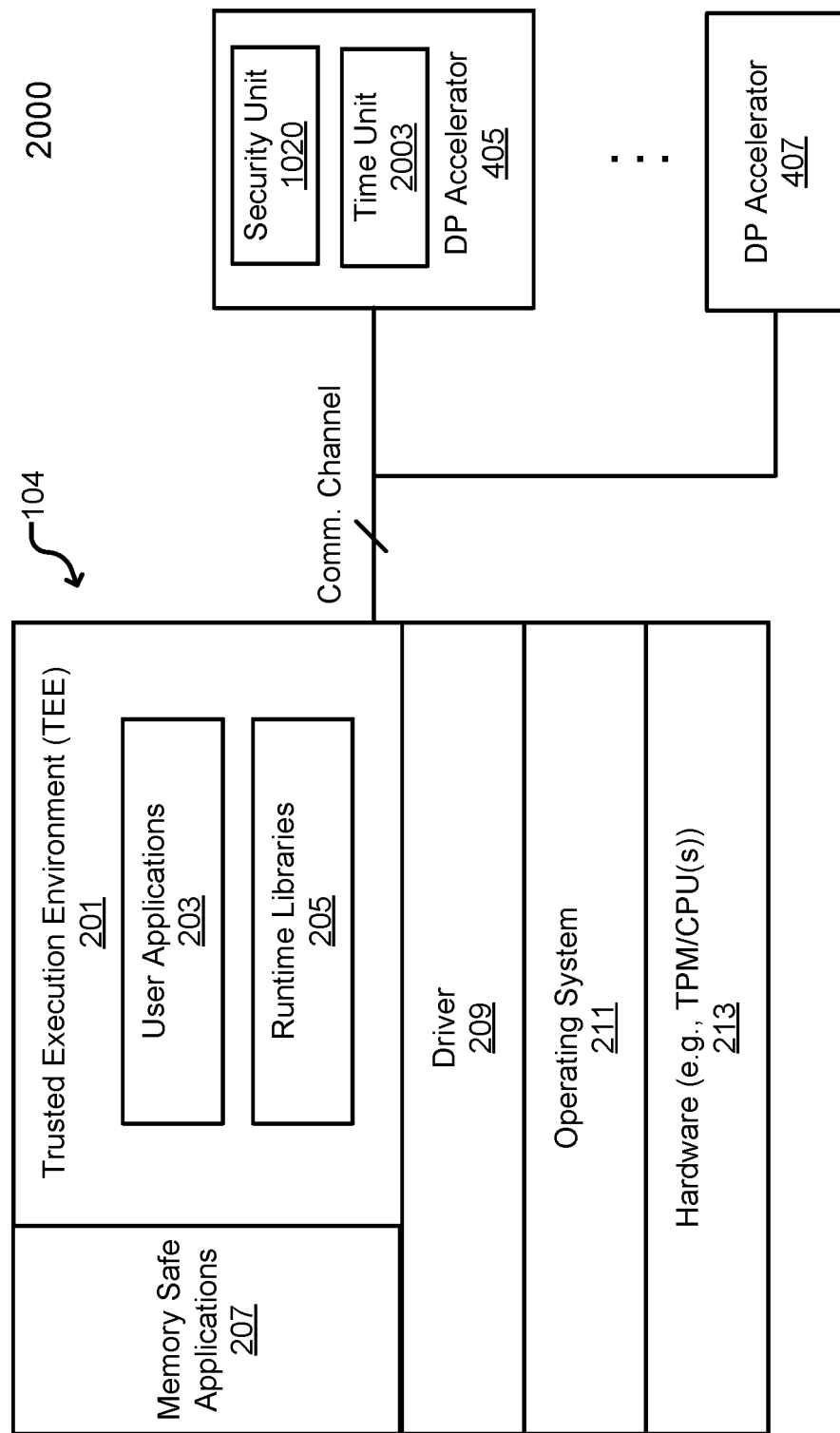
FIG. 20 is a block diagram illustrating an example of a host server communicatively coupled to a DP accelerator according to one embodiment.

FIG. 20 is a block diagram illustrating an example of a host communicatively coupled to a DP accelerator according to one embodiment. System 2000 may represent system 900 of FIG. 9, except system 2000 can provide root of trust services and timestamp generation services for DP accelerators 405-407. Referring to FIG. 20, in one embodiment, DP accelerator 405 includes security unit 1020 and time unit 2003. Security unit 1020 can provide a root of trust services to other modules/units of a DP accelerator using a number of encryption schemes while time unit 2003 can generate timestamps for authentication of cryptographic keys to support different encryption schemes. Note, time unit 2003 may be a standalone unit or may be integrated with security unit 1020.

In one embodiment, security unit 1020 requires a secure time source to keep track when cryptographic keys have been authenticated or when a session key has expired. Using a clock signal from an external source for security unit 1020 can be unsecure. For example, a clock frequency of a clock of the external source can be adjusted or a power supply to the clock can be tampered to prolong a session key beyond an intended time.

Figure 21:
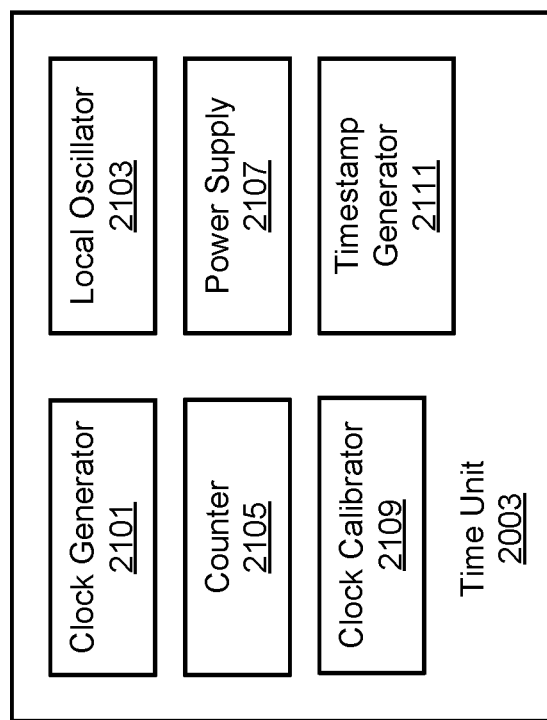
FIG. 21 is a block diagram illustrating an example of a time unit according to one embodiment.

FIG. 21 is a block diagram illustrating an example of a time unit according to one embodiment. Referring to FIG. 21, time unit 2003 can have a standalone clock generation and a standalone power supply for a secure clock signal. Time unit 2003 can include clock generator 2101, local oscillator 2103, counter(s) 2105, power supply 2107, clock calibrator 2109, and timestamp generator 2111. Clock generator 2101 can generate a clock signal locally without having to derive a clock signal from an external source. Local oscillator 2103 can be coupled to clock generator 2101 to provide a precise pulse signal. For example, local oscillator 2103 can include a crystal oscillator which can provide pulse signals having an accuracy greater than a certain threshold, e.g., 1 count per microsecond. Counter(s) 2105 can be coupled to clock generator 2101 to count one or more count value based on a clock signal generated from clock generator 2101. Power supply 2107 can provide a power to clock generator 2101 and timestamp generator 2111. Clock calibrator 2109 can calibrate clock generator 2101. Timestamp generator 2111 can be coupled to the clock generator to generate a timestamp based on a clock signal.

For example, power supply 2107 can provide a stable and persistent power through a battery such as a dime battery. Here, the dime battery would be situated on a board outside of security unit 1020. In other embodiments, a circuitry of power supply 2107 is situated outside of security unit 1020. Local oscillator 2103 can include a high performance crystal oscillator. Counter(s) can include one or more variable counters (e.g., 8-bit, 16-bit, 32-bit, or 64-bit, etc. variable counters) in non-volatile storage. Non-volatile storage or memory is a type of memory that has the capability to hold saved data even if the power is turned off. Unlike a volatile storage, non-volatile storage does not require its memory data to be periodically refreshed. In one embodiment, the non-volatile storage can include a first counter, which can increment by 1 for every single signal pulse of local oscillator 2103. The first counter can count up to a certain value, and the value can be changed by an external source or by clock calibrator 2109 to adjust the value to represent a microsecond's signal of a clock signal. The microsecond can then be accumulated by a second counter to generate a second's signal. A third counter, a fourth counter, etc., can be used to accumulate a minute, hour, day, month signals, etc. Clock generator 2101 can then generate a clock based on the accumulated signals. Based on a clock signal, timestamp generator can generate a timestamp. The timestamp can then be formatted for various purposes. Some example timestamp formats may be: yyyy-MM-dd HH:mm:ss.SSS, yyyyMMd-d.HHmmssSSS, and yyyy/MM/dd HH:mm:ss. In one embodiment, a converter can convert the timestamp from one format to another. In another embodiment, clock calibrator 2109 initially calibrates the clock generation signal to match an external source (e.g., an atomic clock) at a manufacturing phase of the DP accelerator.

Next, a security unit, such as security unit 1020 of DP accelerator, can request time unit 2003 to generate a timestamp on a per need basis. The timestamp can then be used by security unit 1020 to time stamp cryptographic key authentications, key generations, and/or key expirations. For example, if a session key is determined to be expired, based on a timestamp associated with when the session key is generated, a channel session associated with the session key may be terminated. Subsequently, a new session key may be generated if the session key is configured to be automatically renewed or a renewal authorization is obtained through a user application.

Figure 22:
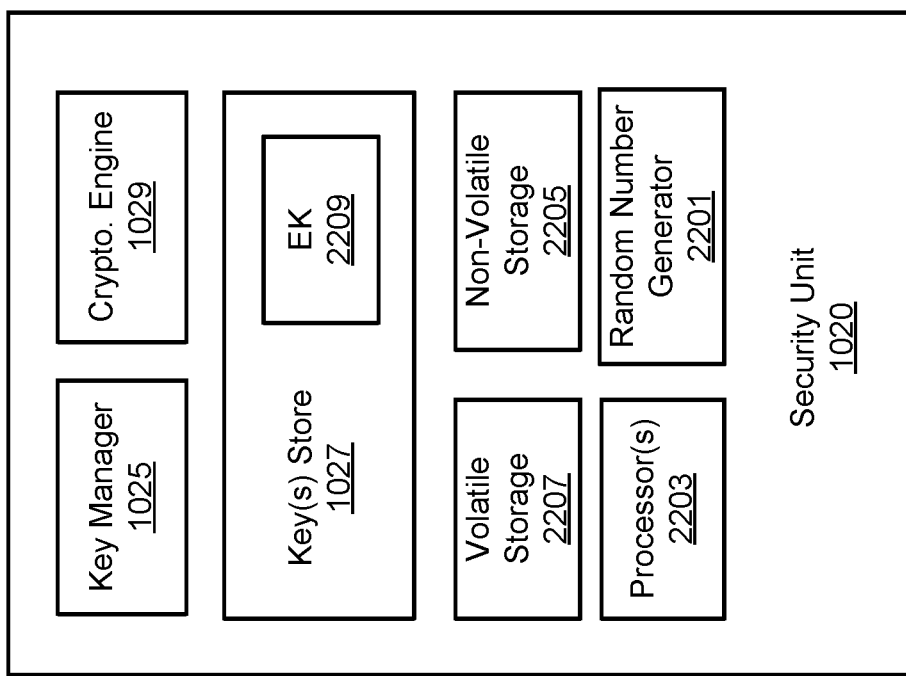
FIG. 22 is a block diagram illustrating an example of a security unit according to one embodiment.

FIG. 22 is a block diagram illustrating an example of a security unit according to one embodiment. Security unit 1020 can be used by a DP accelerator to establish and maintain a secure channel with a host server/system to exchange commands and data. Referring to FIG. 22, security unit 1020 can include key manager 1025, cryptography engine 1029, key(s) store 1027, which can include endorsement key (EK) 2209, volatile storage 2207, non-volatile storage 2205, processor(s) 2203, and random number generator 2201. Random number generator 2201 can generate a random number, such as a nonce. In one embodiment, random number generator 2201 can generate a random number based on a seed input, e.g., a timestamp. Cryptography engine 1029 can perform cryptographic operations, e.g., encryption and decryption. Non-volatile storage 2205 and volatile storage 2207 can be storage areas for security unit 1020. Key(s) store 1027 can be a key storage area of security unit 1020 which can safe keep a unique endorsement credential (EC) or endorsement key (EK) 2209. Here, EC or EK refers to a public key (e.g., PK_RK) of a public/private encryption root key pair (e.g., PK_RK and SK_RK) that is randomly generated and embedded in the security unit 1020 at the time of manufacturing. The private root key (e.g., SK_RK) corresponding to the EK may also be embedded in non-volatile storage 2205, however the private root key is never released outside of security unit 1020. An example key pair can be a 2048-bit RSA cryptographic key pair.

During a manufacturing/testing phase, a DP accelerator can be internally tested and configured and EK 2209 can be generated and embedded security unit 1020. In one embodiment, EK 2209 can be uploaded onto a trusted certification server where the public key or EK can be signed and a signed certificate of the EK can be used to verify that the EK is genuine. Here, the certification server can be a government endorsement server, a third-party trusted authentication server, or a local server.

During a deployment phase, after a DP accelerator is powered on, EK 2209 can be read from security unit 1020 and EK 2209 can be verified locally or through a certification server as genuine. A DP accelerator would be treated as genuine once EK verification is successful. The verified EK, as well as the private root key internal to security unit 1020, can then be used to derive other cryptographic keys, such as a channel session key as described above, or temporary public/private key pairs (e.g., PK_d and SK_d), etc.

Runtime kernels or kernels (or kernel objects) refer to mathematical or computational functions used to support operations of a DP accelerator. A kernel may be a math function called by a user application. For some embodiments, kernels may be uploaded from a host server or other servers to a DP accelerator to be executed by the DP accelerator. An example kernel may be a matrix multiplication kernel, which supports a matrix multiplication operation to be executed by the DP accelerator. Note that there can be hundreds of kernels, each dedicated to support a different mathematical or computational function to be executed by the DP accelerator. Keeping track of a source of kernels, which kernels are uploaded to a DP accelerator, and which are modified can be challenging. Thus, a kernel validation (or verification) and a kernel attestation protocol or schemes are needed to ensure genuine sources and integrity of the kernels.

Figure 23:
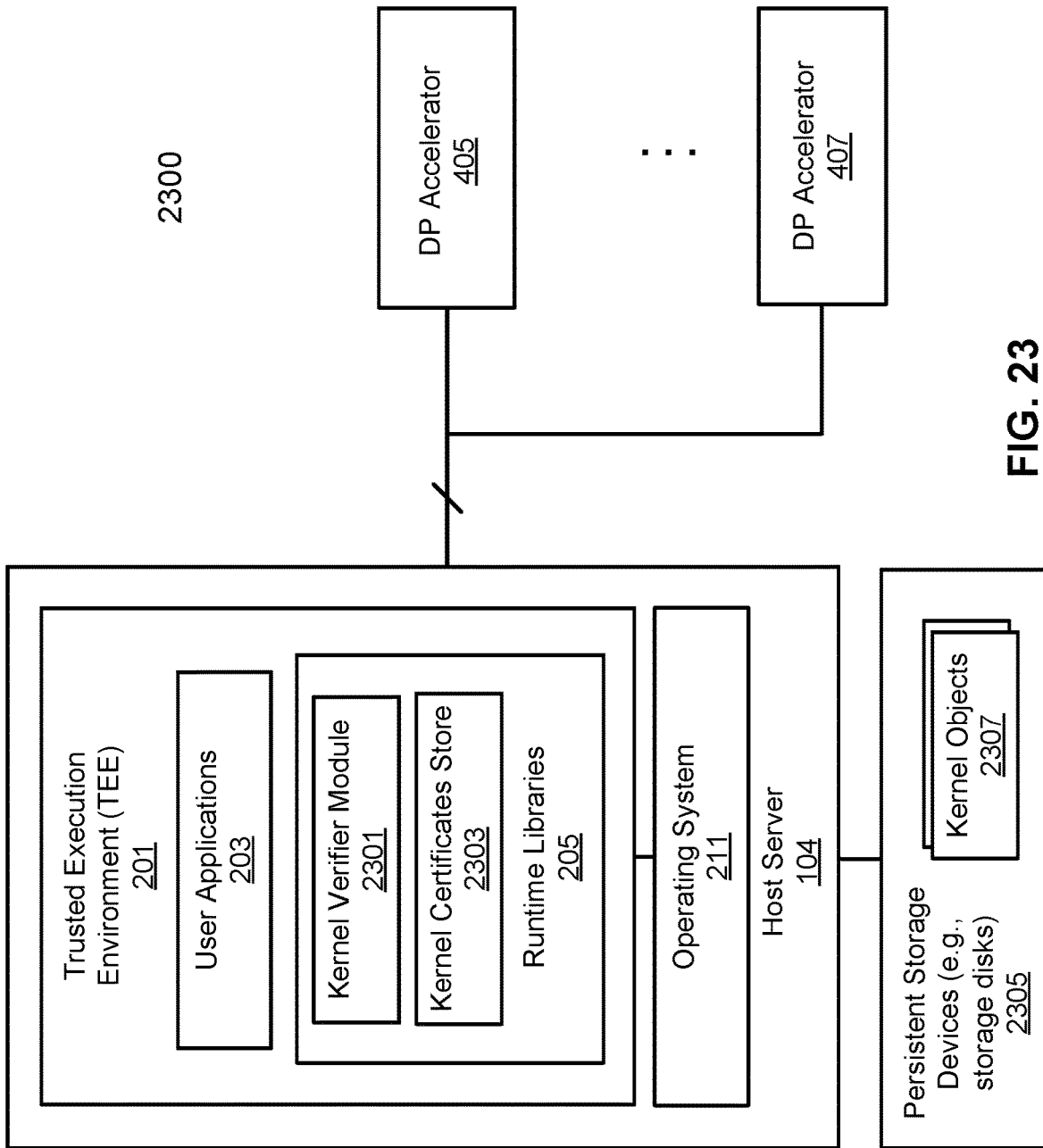
FIG. 23 is a block diagram illustrating an example of a host server communicatively coupled to a DP accelerator to validate kernel objects according to one embodiment.

FIG. 23 is a block diagram illustrating an example of a host server communicatively coupled to a DP accelerator to validate kernel objects according to one embodiment. System 2300 may be system 900 of FIG. 9. Referring to FIG. 23, in one embodiment, host server 104 includes TEE 201 which includes user application 203 and runtime libraries 205. Runtime libraries 205 can include kernel verifier module 2301 and kernel certificates store 2303. Kernel certificates store 2303 can store certificates for kernels (or simply a list of public keys) listed by kernel identifiers, where the certificates can be signed by trusted certification authorities (CAs) or a local trusted server. Kernel verifier module 2301 can verify a signed kernel object based on kernel certificates information from kernel certificates store 2303.

Host server 104 can be communicatively coupled to persistent storage devices (e.g., storage disks) 2305 and DP accelerators 405-407. Note that persistent storage devices 2305 may be part of host server 104 or may be a remote storage unit. Persistent storage devices 2305 can include kernel objects 2307. Because kernel objects 2307 may come from remote sources, signing the kernel objects ensure the objects are from a trusted source. A kernel object can refer to an object that includes a binary file for a kernel. In one embodiment, each kernel objects of kernel objects 2307 includes an executable image of the kernel and a corresponding signature. Furthermore, the executable image of the kernel may be encrypted. Note that a signature is a hash of a kernel signed using a private key of a public/private kernel key pair corresponding to the kernel object. The signature can be verified using a public key corresponding to the private key that was used to sign the kernel. E.g., the public key can be obtained from a kernel certificate for the kernel object). In some embodiments, the kernel objects are signed (using a private key of the kernel developer) as kernel developers initially generate the kernels. The signed kernels can then include corresponding kernel certificates (e.g. public keys) for verification (or validation) to ensure the kernels are genuine.

Figure 24:
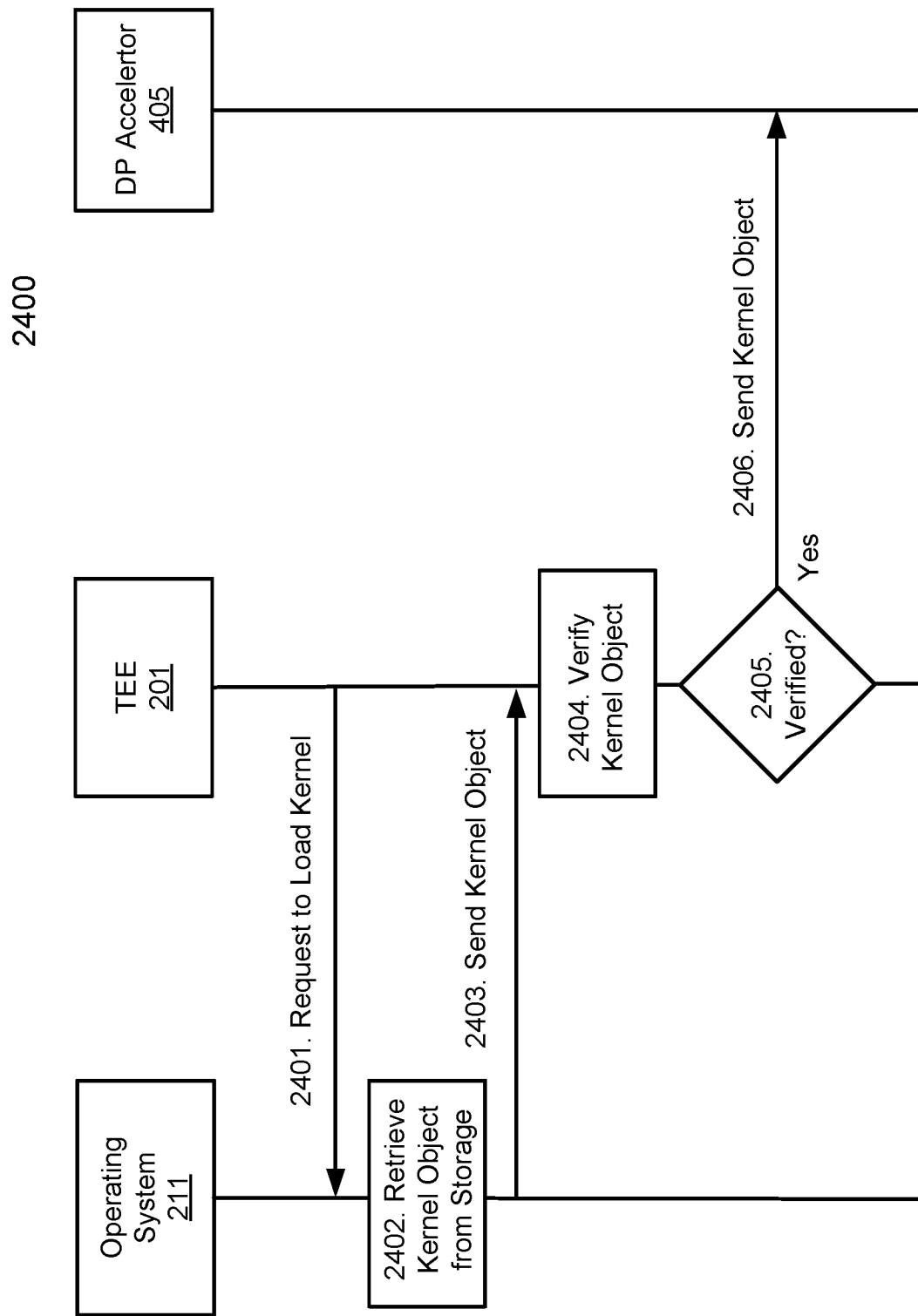
FIG. 24 is a flow chart illustrating an example kernel objects verification protocol according to one embodiment.

FIG. 24 is a flow chart illustrating an example kernel objects verification protocol according to one embodiment. Kernel objects verification refers to validation of kernel objects 2307 to be genuine before introducing kernel objects 2307 into TEE 201 of host server 104 and/or DP accelerator 405. Example 2400 can be performed by system 2300 of FIG. 23. In one embodiment, before verification, user application 203 (or runtime libraries 205) obtains a list of public keys, e.g., PK_i, PK_j ..., PK_n, from certificates of trusted certification authorities or trusted signers, where corresponding private keys, e.g., SK_i, SK_j, ..., SK_n are private keys of kernel developers that were used to sign kernel objects 2307. In one embodiment, when user application 203 (or runtime libraries 205) invokes a kernel (identified by a kernel identifier) to be executed by DP accelerator 405 (or any other DP accelerators), user application 203 (or runtime libraries 205) determines if the kernel has already been updated onto DP accelerator 405. If not, host server 104 performs operations 2400 to verify the kernel before uploading the kernel to DP accelerator 405 according to one embodiment. Note that runtime libraries 205 may invoke a chain of kernels, if invoking one kernel invokes other kernels.

In operation 2401, user application 203 (or runtime libraries 205) (as part of TEE 201) requests the kernel (as part of kernel objects 2307) to be loaded onto OS 211 based on a kernel identifier (ID). In one embodiment, the kernel ID can be a global unique identifier e.g., GUID or UUID. In one embodiment, a kernel object includes a kernel (e.g., an executable image), a kernel ID, and a signature for the kernel. The signature can be an encrypted hash of the kernel. In another embodiment, the kernel object includes an encrypted kernel (e.g., an encrypted executable image). In operation 2402, OS 211 retrieves the kernel object from persistent storage 2305 by kernel ID. In operation 2403, OS 211 sends kernel object back to TEE 201 of host server 104. In operation 2404, kernel verifier module 2301 retrieves a kernel certificate from kernel certificates store 2303 correspond to the kernel ID and verifies whether the kernel object is genuine. In one embodiment, verifying a kernel includes applying a public key to a signature of the kernel object to decrypt the signature to generate an expected hash value. Kernel verifier module 2301 then generates a hash value for the kernel, and compares to determine a difference of the expected hash value to the generated hash value. If there is no difference, the signature is valid. If the signature is valid then integrity of the kernel is verified, and the kernel object is deemed genuine and sourced by a trusted developer. In another embodiment, verifying a kernel includes applying a public key to an encrypted executable image of the kernel to decrypt and obtain the kernel, if the kernel is encrypted.

In operation 2405, if the kernel (e.g., executable image) is verified to be trusted then, in operation 2406, the kernel object is sent, by TEE 201 of host server 104, to DP accelerator 405. Thereafter, the invoked kernel can be executed by one or more execution unit(s) of DP accelerator 405.

Figure 25:
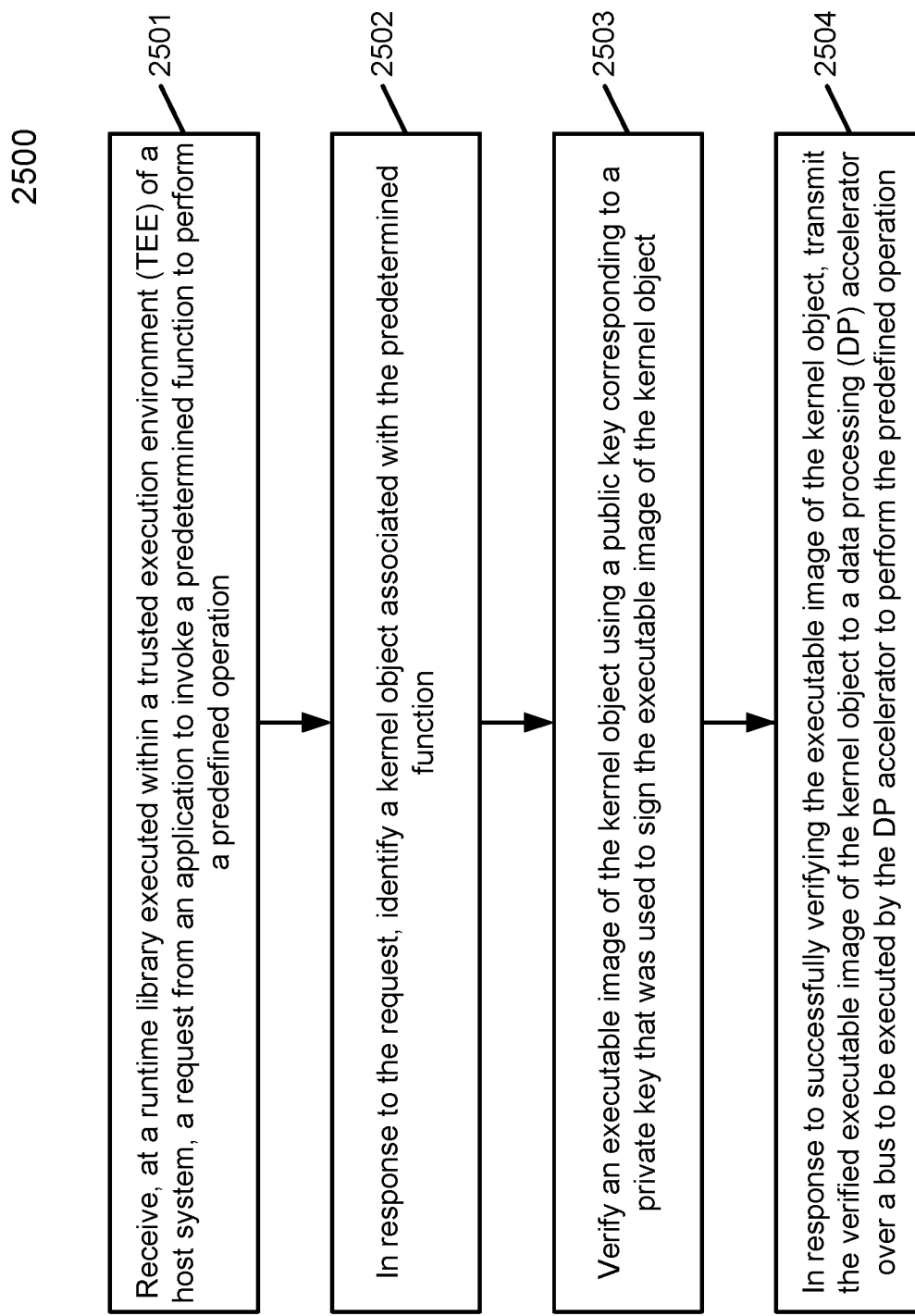
FIG. 25 is a flow diagram illustrating an example of a method according to one embodiment.

FIG. 25 is a flow diagram illustrating an example of a method according to one embodiment. Process 2500 may be performed by processing logic which may include software, hardware, or a combination thereof. For example, process 2500 may be performed by host system, such as host 104 of FIG. 23. Referring to FIG. 25, at block 2501, processing logic receives, at a runtime library executed within a trusted execution environment (TEE) of a host system, a request from an application to invoke a predetermined function to perform a predefined operation. At block 2502, in response to the request, processing logic identifies a kernel object associated with the predetermined function. At block 2503, processing logic verifies an executable image of the kernel object using a public key corresponding to a private key that was used to sign the executable image of the kernel object. At block 2504, in response to successfully verifying the executable image of the kernel object, processing logic transmits the verified executable image of the kernel object to a data processing (DP) accelerator over a bus to be executed by the DP accelerator to perform the predefined operation.

In one embodiment, the runtime library is configured to verify the kernel object by decrypting a signature of the kernel object using the public key corresponding to the private key, where the kernel object is to be transmitted to the DP accelerator in an unencrypted form. In another embodiment, processing logic further verifies an integrity of the kernel object by hashing the executable image of the kernel object using a predetermined hash function.

In one embodiment, the kernel object is stored in an unsecure location of a persistent storage device. In another embodiment, the kernel object is one of many kernel objects stored in the persistent storage device(s), where the runtime library maintains a list of public keys associated with the kernel objects respectively that are used to verify the kernel objects.

In one embodiment, the DP accelerator comprises one or more execution units configured to execute the executable image of the kernel object to on behalf of the application in a distributed manner. In one embodiment, the public key was obtained from a trusted server and the public key was provided by a provider of the kernel object, and where the kernel object includes a signature signed by the provider using the private key.

Figure 26:
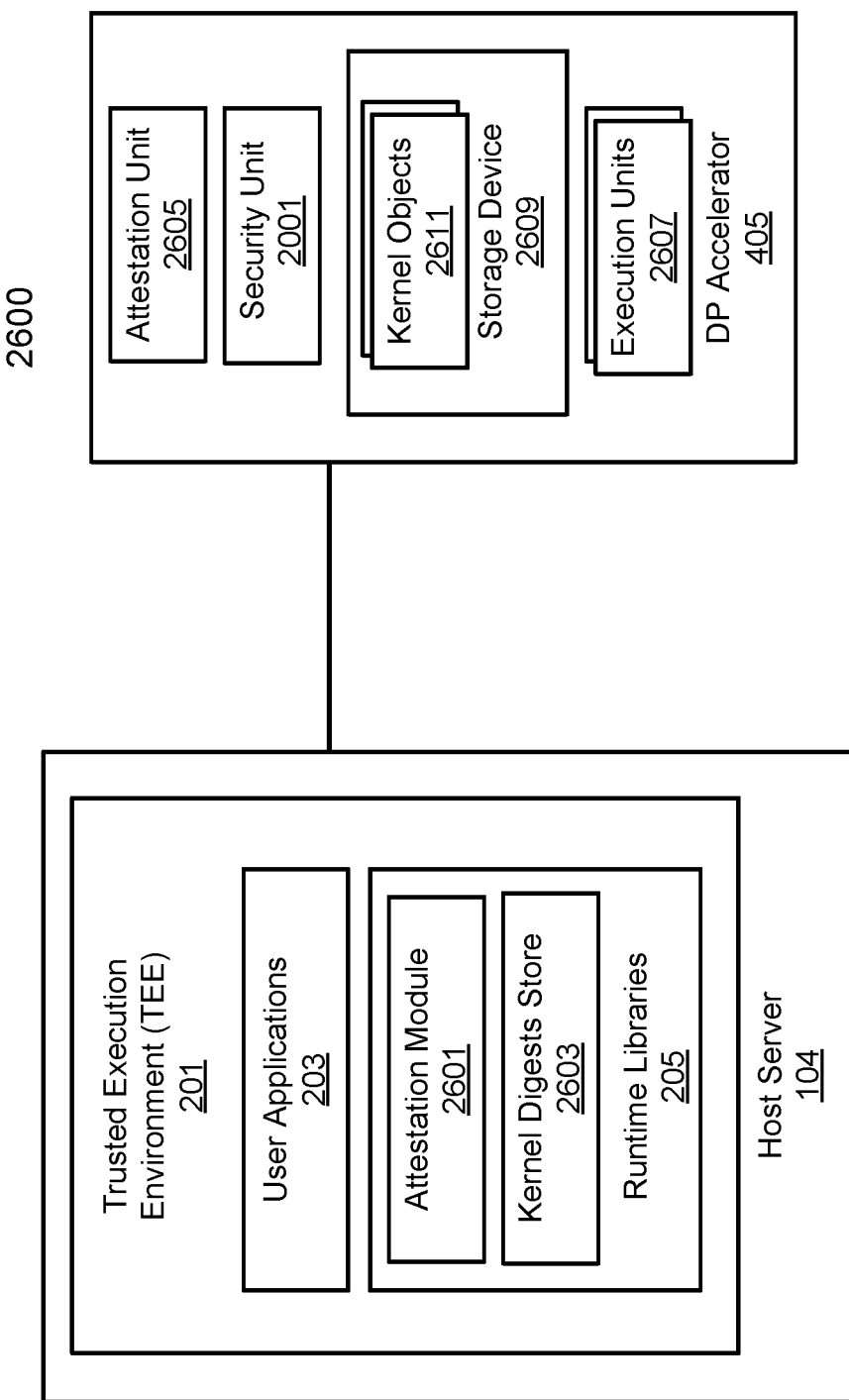
FIG. 26 is a block diagram illustrating an example of a host server communicatively coupled to a DP accelerator for kernels attestation according to one embodiment.

FIG. 26 is a block diagram illustrating an example of a host server communicatively coupled to a DP accelerator for kernels attestation according to one embodiment. Kernels attestation includes verifying an integrity of a kernel which has been already uploaded onto a DP accelerator, so to ensure the kernel has not been modified by some third party in transmission. The integrity of the kernel can be verified through verifying a signature for the kernel. System 2600 may be system 900 of FIG. 9. Referring to FIG. 26, in one embodiment, host server 104 includes TEE 201 which includes user application 203, runtime libraries 205, attestation module 2601, and kernel digests store 2603. Kernel digests store 2603 can store a number of kernel digests corresponding to kernels already uploaded onto different DP accelerators. In one embodiment, a kernel digest refers to a non-cryptographic hash of a kernel, or any type of function of the kernel (e.g., checksum, CRC, etc.). Kernel digests store 2603 can also store a mapping of kernel IDs, DP accelerator IDs for the kernel digests. The mappings can identify which kernels have already been uploaded to which DP accelerators. Based on kernel digests information from kernel digests store 2603, attestation module 2601 can attest a kernel based on kernel digests information from kernel digests store 2603.

Referring to FIG. 26, DP accelerator 405 can include security unit 1020, attestation unit 2605, execution units 2607, and storage devices 2609. Storage devices 2609 can include kernel objects 2611. Attestation unit 2605 can communicate with attestation module 2601 via an attestation protocol. Storage devices 2609 can be one or more storage devices storing kernel objects 2611. Kernel objects 2611 may include one or more kernels (and corresponding kernel IDs) previously uploaded to DP accelerator 405. Execution units 2607 can execute one or more invoked kernels from kernel objects 2611.

In one embodiment, user application 203 (or runtime libraries 205) can determine if a kernel object has already been updated onto DP accelerator 405 by generating a kernel digest to query if the generated kernel digest is found in the kernel digests information from kernel digests store 2603 to determine if the kernel already resides on a DP accelerator. Alternatively, a kernel ID can be queried to determine if the kernel already resides on a DP accelerator. If found, then attestation begins, otherwise user application 203 (or runtime libraries 205) verifies the kernel object (as described above) and generates a kernel digest for the kernel to be stored in kernel digests store 2603. User application 203 (or runtime libraries 205) then uploads a copy of the kernel binary file onto the DP accelerator. In a subsequent execution sessions, the kernel can be attested by the user application (or runtime library) in response to invocation of the kernel.

Figure 27:
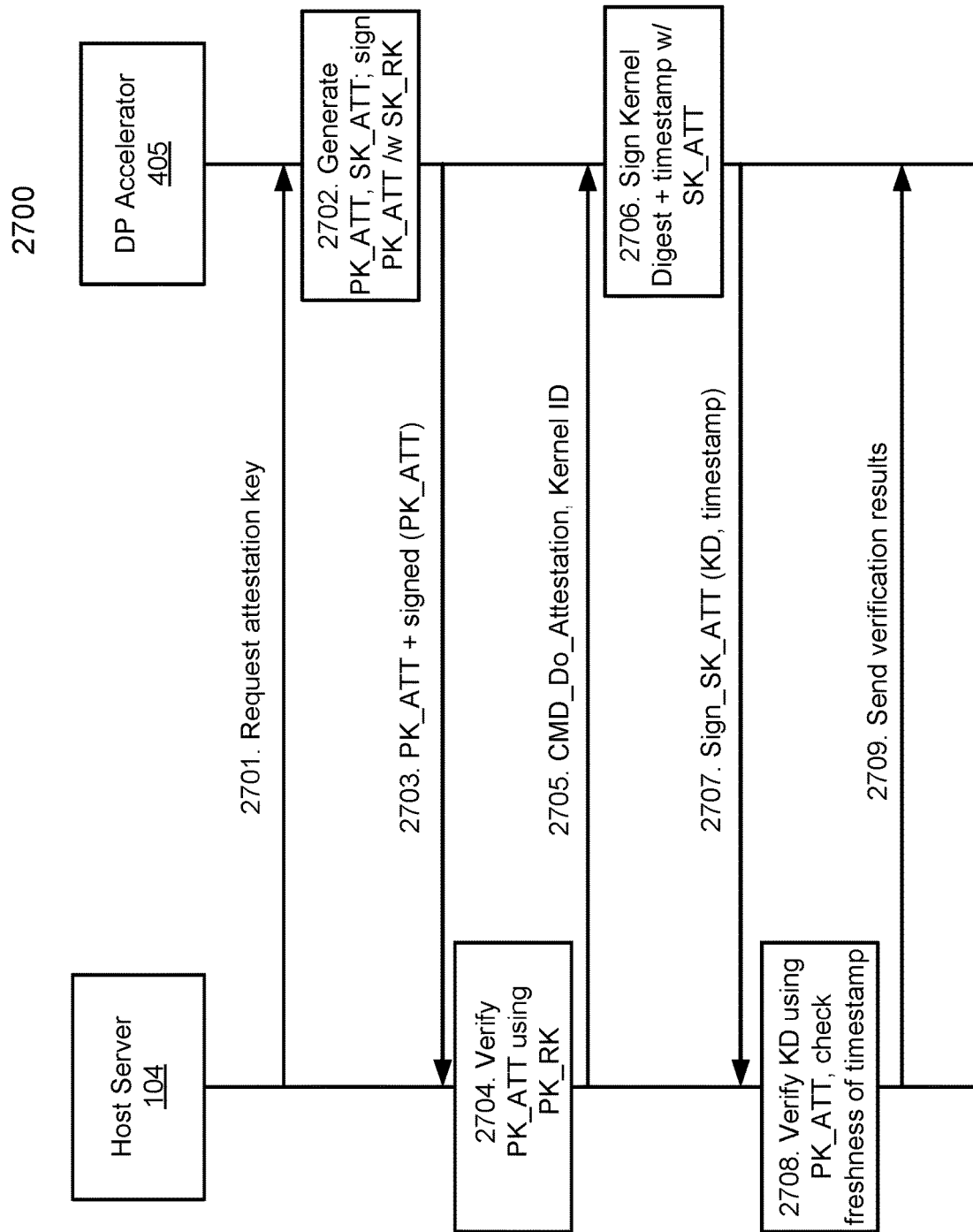
FIG. 27 is a flow chart illustrating an example attestation protocol according to one embodiment.

FIG. 27 is a flow chart illustrating an example attestation protocol according to one embodiment. In one embodiment, example 2700 can be performed between attestation module 261 of host server 104 and attestation unit 2605 of DP accelerator 405 of FIG. 26. Referring to FIG. 27, in operation 2701, host server 104 requests an attestation key from DP accelerator 405. In operation 2702, in response to the request, DP accelerator 405 generates a public/private attestation key pair (e.g., PK_ATT, SK_ATT) and signs PK_ATT with a private root key (e.g., SK_RK) associated with DP accelerator 405.

In operation 2703, DP accelerator 405 sends a message with the PK_ATT and signed (PK_ATT) back to host server 104. In operation 2704, host server 104 receives the message, decrypts the signed PK_ATT using a public root key (e.g., PK_RK) associated with DP accelerator 405, and compares the received PK_ATT and the decrypted PK_ATT to verify the signed PK_ATT. In one embodiment, the host system has previously received the PK_RK associated with the DP accelerator from the DP accelerator or from a trusted server over a network. If the received PK_ATT matches the decrypted PK_ATT, host server 104 has verified that the PK_ATT is indeed generated by DP accelerator 405. Note, operations 2701-2704 can be performed for attestation at any time before operation 2705. In other words, a same attestation key can be used fora predetermined period of time, e.g., a week, and the attestation key is not related to any attested kernel, e.g., the attestation key can be used for many kernels.

In operation 2705, host server 104 sends a command 'CMD_DO_ATTESTATION' together with a kernel ID of a kernel to DP accelerator 405 to requests for a quote. In operation 2706, in response to receiving the command request, DP accelerator 405 measures kernel integrity of the kernel. In one embodiment, the executable image of the kernel (as part of kernel objects 2611) is hashed to generate a kernel digest. The kernel digest together with a timestamp is then signed with SK_ATT. Here, the timestamp can be generated by a time unit such as time unit 2003 of FIG. 20.

In operation 2707, DP accelerator 405 sends a message with the signed kernel digest together with the timestamp to host server 104. In operation 2708, in response to receiving the message, host server 104 decrypts the signed kernel digest together with the timestamp using PK_ATT. Host server 104 then checks the timestamp to verify that the message has not elapsed for more than a predetermined time period (e.g., a day). Host server 104 then verifies that the kernel digest belongs to a kernel previous uploaded to DP accelerator. In one embodiment, host server 104 queries the receive kernel digest from the kernel digests information from kernel digests store 2603. If an entry matching a DP accelerator ID of DP accelerator 405 is found then the kernel attestation is successful. Otherwise, the attestation fails. In operation 2709, host server 104 can send the attestation or verification results to DP accelerator 405. Based on the results, the kernel is allowed or denied to be executed by an execution unit of DP accelerator 405.

Figure 28A:
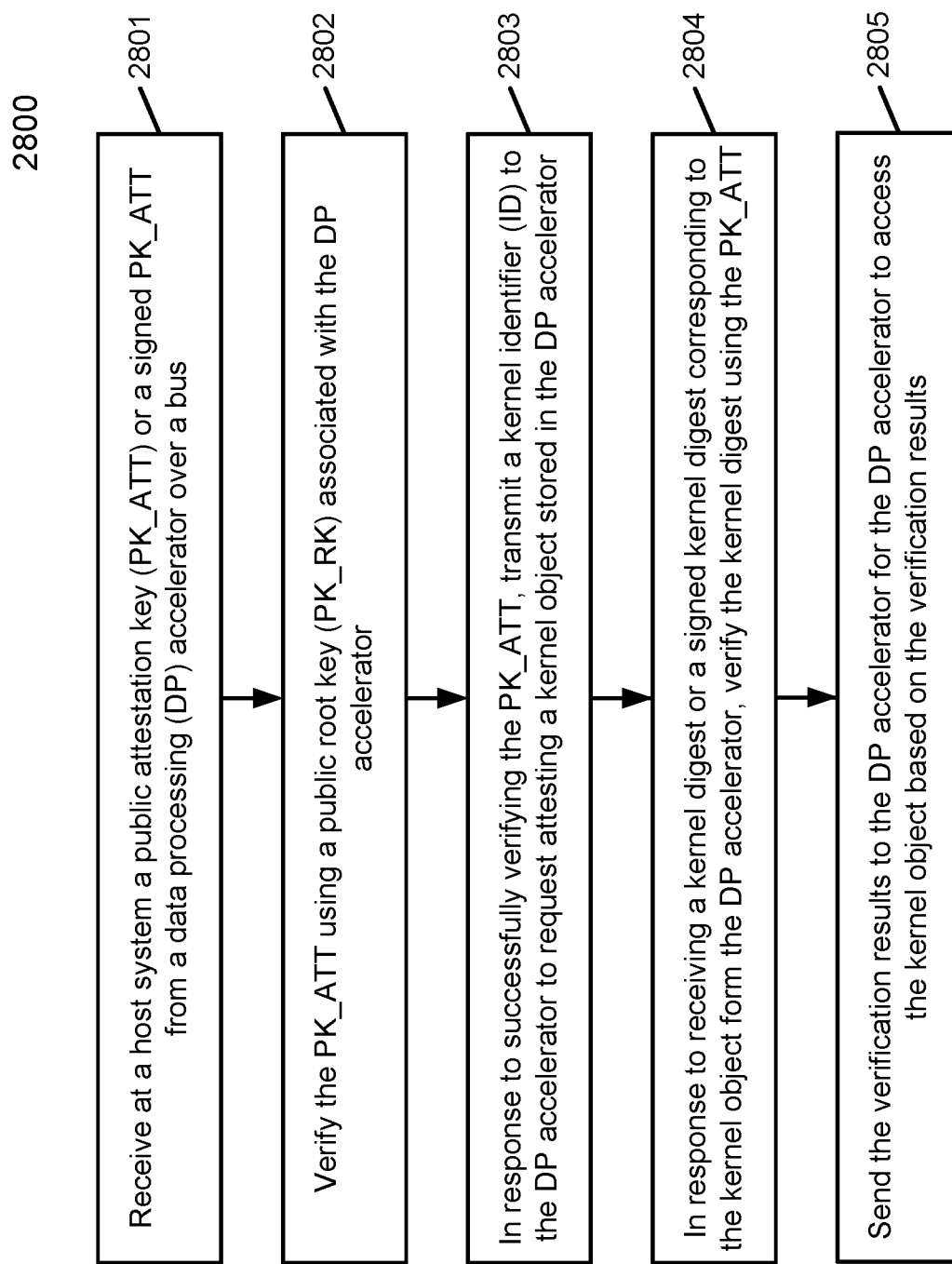
FIGS. 28A and 28B are flow diagrams illustrating example methods according to some embodiments.
Figure 28B:
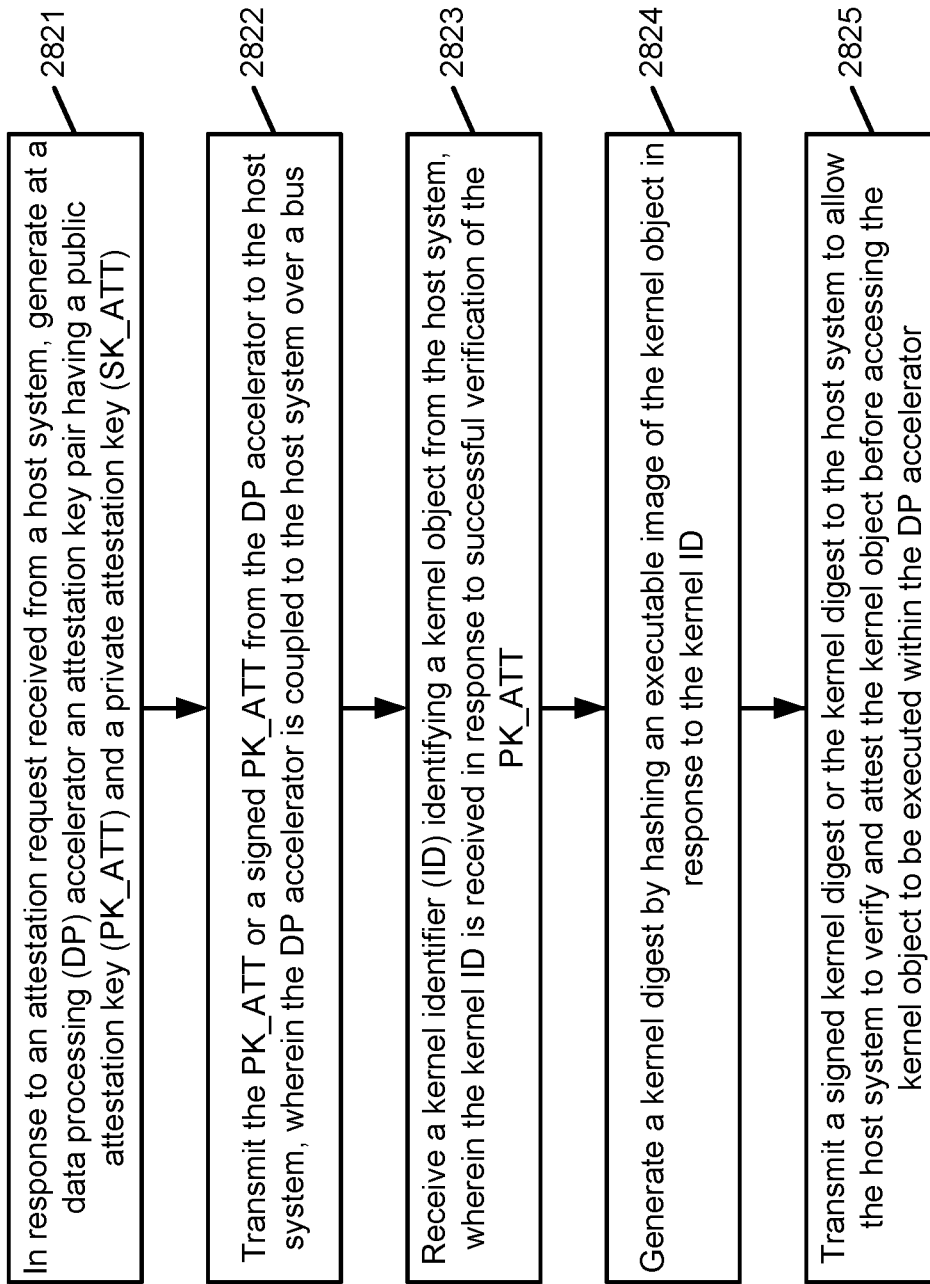

FIGS. 28A and 28B are flow diagrams illustrating example methods according to some embodiments. Processes 2800 and 2820 may be performed by processing logic which may include software, hardware, or a combination thereof. For example, process 2800 may be performed by host server 104 and process 2820 may be performed by DP accelerator 405 of FIG. 26. Referring to FIG. 28A, at block 2801, processing logic receives at a host system a public attestation key (PK_ATT) or a signed PK_ATT from a data processing (DP) accelerator over a bus. At block 2802, processing logic verifies the PK_ATT using a public root key (PK_RK) associated with the DP accelerator. At block 2803, in response to successfully verifying the PK_ATT, processing logic transmits a kernel identifier (ID) to the DP accelerator to request attestation of a kernel object stored in the DP accelerator. At block 2804, in response to receiving a kernel digest or a signed kernel digest corresponding to the kernel object form the DP accelerator, processing logic verifies the kernel digest using the PK_ATT. At block 2805, processing logic sends the verification results to the DP accelerator for the DP accelerator to access the kernel object based on the verification results.

In one embodiment, processing logic further transmits a request for attestation to the DP accelerator, where the DP accelerator generates an attestation key pair having the PK_ATT and a private attestation key (SK_ATT), in response to the request for attestation. Processing logic then receives from the DP accelerator an encrypted PK_ATT signed using a private root key (SK_RK) of the DP accelerator. In another embodiment, processing logic further decrypts at the host system the encrypted PK_ATT using a public root key (PK_RK) associated with the DP accelerator, and verifies that the PK_ATT received from the DP accelerator is identical to the decrypted PK_ATT. In one embodiment, the public root key (PK_RK) associated with the DP accelerator may be received by host server 104 come from a trusted server over a network.

In one embodiment, the kernel digest is generated by hashing an executable image of the kernel object by the DP accelerator. In another embodiment, the kernel digest is signed using a private attestation key (SK_ATT) corresponding to the PK_ATT. In another embodiment, the kernel digest is signed together with a timestamp generated at a point in time, where the timestamp is utilized by the host system to verify that the kernel digest was generated within a predetermined period of time. In one embodiment, the host system receives the PK_RK associated with the DP accelerator from a predetermined trusted server over a network.

Referring to FIG. 28B, in block 2821, in response to an attestation request received from a host system, processing logic generates at a data processing (DP) accelerator an attestation key pair having a public attestation key (PK_ATT) and a private attestation key (SK_ATT). At block 2822, processing logic transmits the PK_ATT or a signed PK_ATT from the DP accelerator to the host system, where the DP accelerator is coupled to the host system over a bus. At block 2823, processing logic receives a kernel identifier (ID) identifying a kernel object from the host system, where the kernel ID is received in response to successful verification of the PK_ATT. At block 2824, processing logic generates a kernel digest by hashing an executable image of the kernel object in response to the kernel ID. At block 2825, processing logic transmits the kernel digest or a signed kernel digest to the host system to allow the host system to verify and attest the kernel object before accessing the kernel object to be executed within the DP accelerator.

In one embodiment, processing logic further signs the PK_ATT using a private root key (SK_RK) associated with the DP accelerator and sends the signed PK_ATT to the host system to allow the host system to verify that the PK_ATT come from the DP accelerator. In another embodiment, the host system is configured to decrypt the signed PK_ATT using a public root key (PK_RK) corresponding to the SK_RK and verify the PK_ATT by comparing the PK_ATT received from the DP accelerator and the decrypted PK_ATT.

In one embodiment, processing logic further signs the kernel digest using the SK_ATT and sends the signed kernel digest to the host system to allow the host system to verify that the kernel digest is sent by the DP accelerator. In another embodiment, the host system is configured to decrypt the signed kernel digest using the PK_ATT and verify the kernel digest by comparing the kernel digest received from the DP accelerator and the decrypted kernel digest. In another embodiment, processing logic further generates a timestamp and signs the kernel digest together with the timestamp, where the timestamp is utilized by the host system to verify freshness of the kernel digest.

The DP accelerators communicatively coupled to a host server can be further validated to be the DP accelerators to be expected by the host server. The assurance can be achieved by ways of a third party trusted server and/or certification authority.

Figure 29:
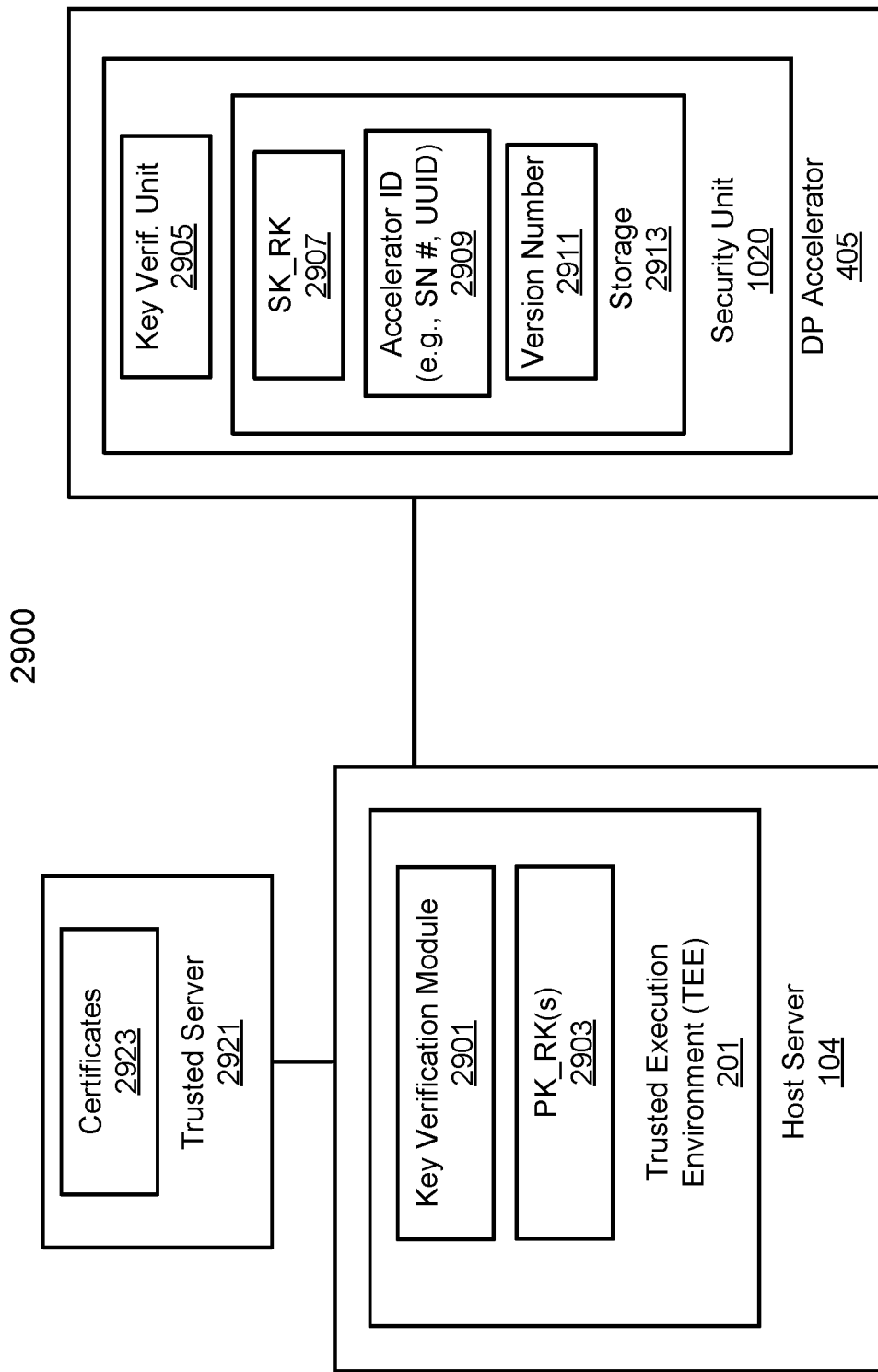
FIG. 29 is a block diagram illustrating an example of a host server communicatively coupled to trusted server and a DP accelerator according to one embodiment.

FIG. 29 is a block diagram illustrating an example of a host server communicatively coupled to trusted server and a DP accelerator according to one embodiment. DP accelerator validation refers to verifying a certificate of the DP accelerator from a trusted server. The trusted server can be a third party certification authority or a local server. System 2900 may be system 900 of FIG. 9. Referring to FIG. 29, in one embodiment, host server 104 includes TEE 201, which includes key verification module 2901 and PK_RK(s) 2903. PK_RK(s) 2903 can store public keys associated with DP accelerators. Key verification module 2901 can verify a public key for a DP accelerator via a trusted server, such as trusted server 2921. Trusted server 2921 can include DP accelerator certificates 2923.

Referring to FIG. 29, DP accelerator can include security unit 1020 which can include key verification unit 2905 and storage 2913. Storage 2913 can include SK_RK 2907, accelerator ID (e.g., serial number and/or UUID) 2909, and version number 2911. Version number can denote a firmware version for DP accelerator 405, and the version number can be updated according to a firmware version of DP accelerator 405. Key verification unit 2905 can communicate with a key verification module, such as key verification module 2901 of host server 104, to provide information about the DP accelerator (e.g., accelerator ID 2909 and/or version number 2911) to host server 104.

As a preliminary matter, in one embodiment, host server 104 may already have a copy of PK_RK associated with DP accelerator 405. However, when DP accelerator 405 is initially introduced to host server 104 or when DP accelerator 405 is reintroduced, a PK_RK for DP accelerator 405 may need to be validated or re-validated for host server 104.

Figure 30:
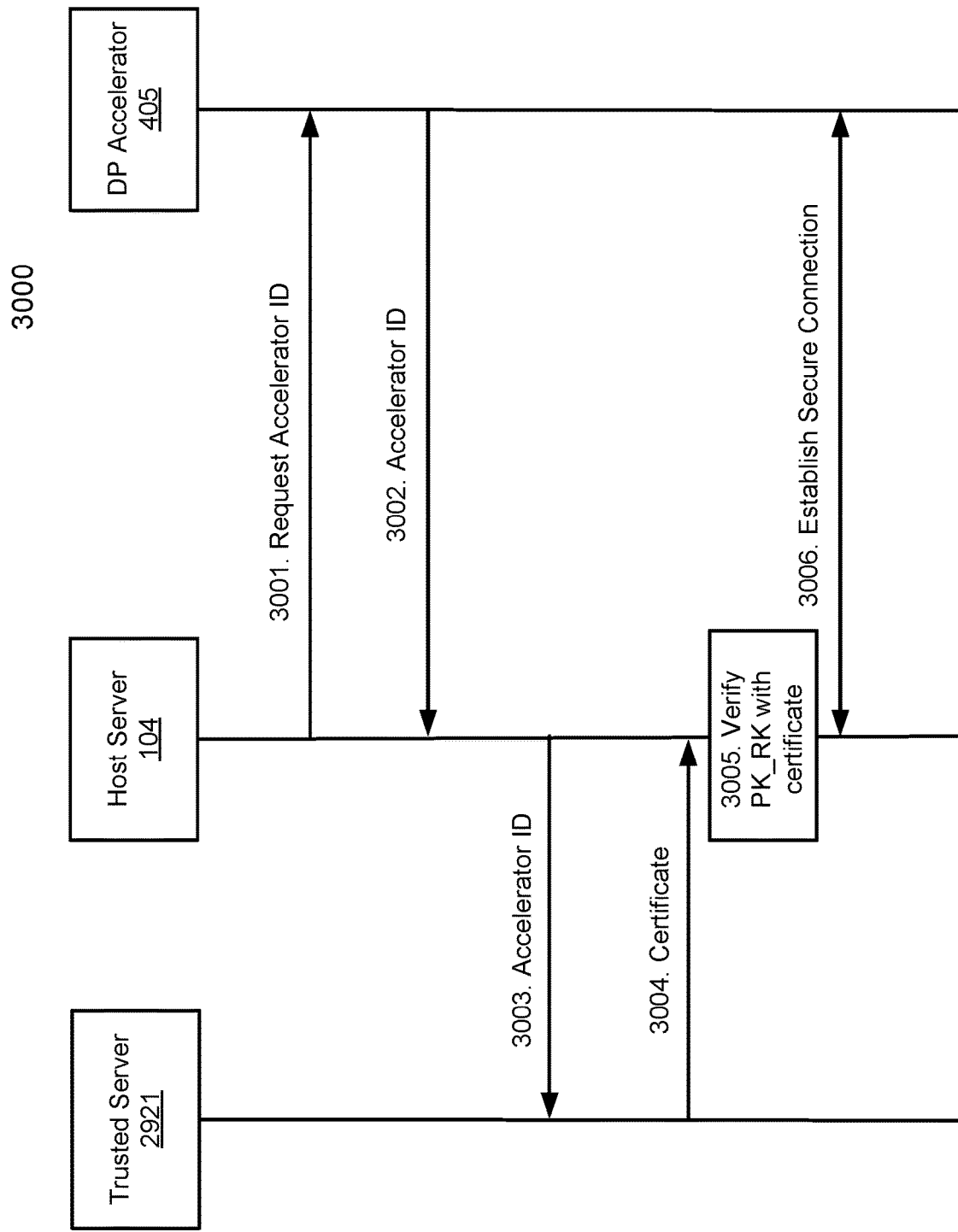
FIG. 30 is a flow chart illustrating an example DP accelerator validation protocol according to one embodiment.

FIG. 30 is a flow chart illustrating an example DP accelerator validation protocol according to one embodiment. Protocol 3000 can be an example embodiment to validate a PK_RK for DP accelerator 405. Referring to FIGS. 29-30, protocol 3000 can be performed between key verification module 2901 of host server 104 and key verification unit 2905 of DP accelerator 405.

Referring to FIG. 30, in operation 3001, host server 104 requests an accelerator ID from accelerator 405. In operation 3002, in response to the request, DP accelerator 405 returns accelerator ID 2909 to host server 104 (e.g., a serial number or a UUID of the DP accelerator). In operation 3003, host server 104 sends the received accelerator ID to trusted server 2921. Here, trusted server 2921 may be a certification authority, a third party trusted server or a local trusted server with certificate information about DP accelerator 405. In operation 3004, in response to the request, trusted server 2921 sends a certificate associated with the accelerator ID of DP accelerator 405 to host server 104.

In operation 3005, host server 104 extracts the certificate information (e.g., a public key PK_RK) from the certificate associated with the accelerator ID and stores the certificate information along with the accelerator ID in local storage, e.g., PK_RK(s) 2903. In one embodiment, the extracted PK_RK may be verified against an existing PK_RK for DP accelerator 405 (e.g., the existing PK_RK as part of PK_RK(s) 2903) which may have been previously obtained for DP accelerator 405. Optionally, the certificate information can be verified by verifying a certificate chain of the trusted server 2921. A certificate chain is an ordered list of certificates that enables a receiver to verify that a sender and the trusted server (e.g., a certificate authority) are trustworthy. In operation 3006, based on the verification and/or the certificate information, e.g., PK_RK, host server 104 then requests a secure connection (e.g., one or more secure channels) to be established with DP accelerator 405.

Note that thereafter, host server 104 can use the PK_RK to decrypt secure messages sent by DP accelerator 405, where the secure messages are encrypted by SK_RK. These messages can include verification messages associated with attestation key pairs (e.g., PK_ATT, SK_ATT), to verify a signature for a public attestation key to attest a kernel object stored in the DP accelerator, as described above. The messages can also include verification messages for temporary public/private key pairs (e.g., PK_d, SK_d), and session keys for DP accelerator 405, as described above. In some embodiments, a randomly generated number together with version number 2911 of FIG. 29, can be used to generate the attestation key pairs and the temporary public/private key pairs. In this case, if the version number 2911 is updated, e.g., due to a firmware upgrade, the attestation key pairs and temporary public/private key pairs for a session would expire.

The DP accelerator can generate public/private attestation key pairs (e.g., PK_ATT, SK_ATT) further based on a version number (version number 2911 of FIG. 29) of the accelerator and/or a random number generated by a random number generator. Similarly, temporary public/private key pairs (e.g., PK_d, SK_d, where SK_d is used to establish a session key associated with a communication session between the host system and the DP accelerator) can be generated further based on a version number (version number 2911 of FIG. 29) of the accelerator and/or a random number generated by a random number generator.

Figure 31:
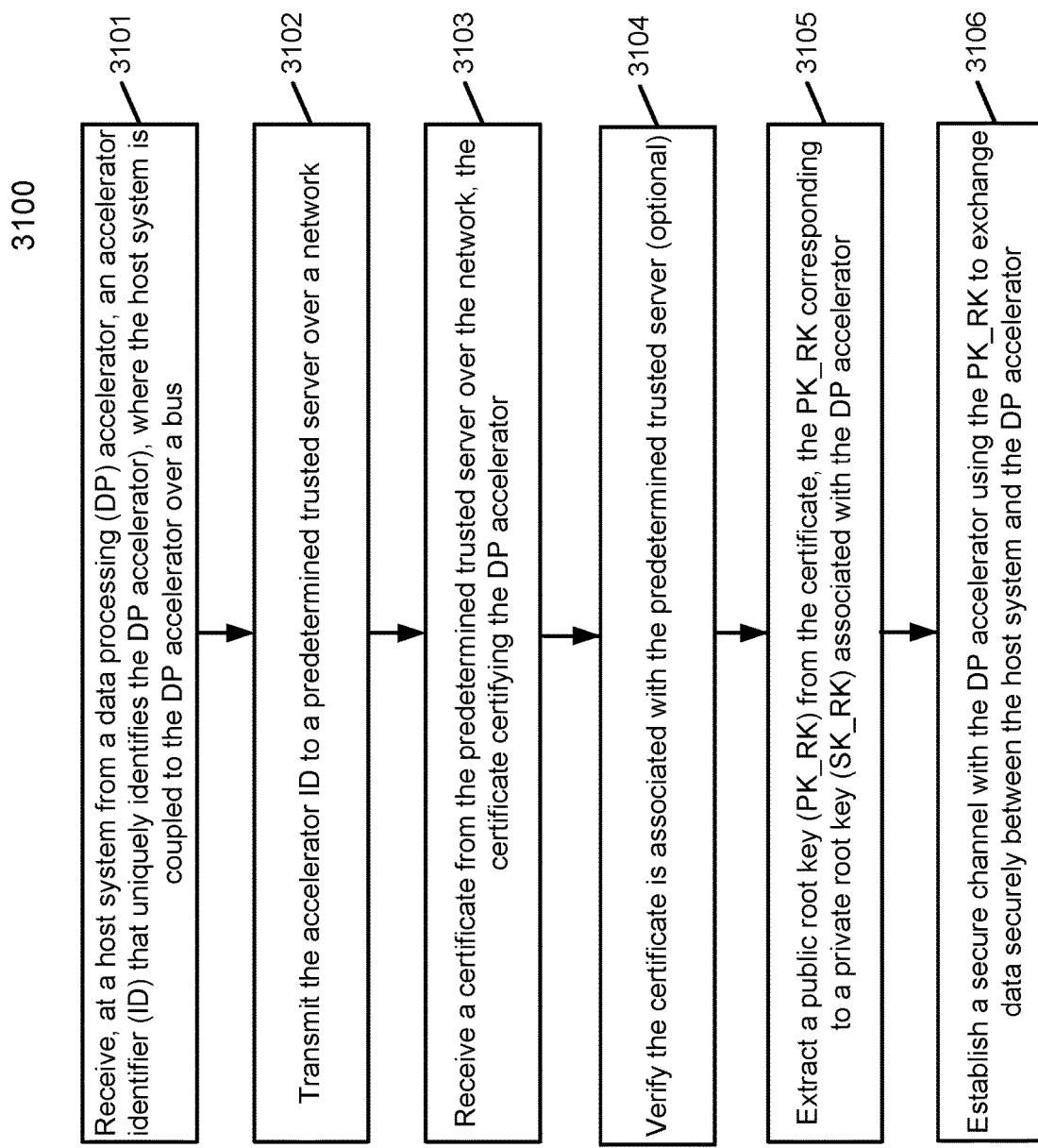
FIG. 31 is a flow diagram illustrating an example of a method according to one embodiment.

FIG. 31 is a flow diagram illustrating an example of a method according to one embodiment. Process 3100 may be performed by processing logic which may include software, hardware, or a combination thereof. For example, process 3100 may be performed by host system, such as host 104 of FIG. 29. Referring to FIG. 31, at block 3101, processing logic receives, at a host system from a DP accelerator, an accelerator ID that uniquely identifies the DP accelerator, where the host system is coupled to the DP accelerator over a bus. At block 3102, processing logic transmits the accelerator ID to a predetermined trusted server over a network. At block 3103, process logic receives a certificate from the predetermined trusted server over the network, where the certificate includes a public key (PK_RK) associated with the DP accelerator. At block 3104, optionally, in one embodiment, processing logic verifies the certificate is associated with the predetermined trusted server, e.g, by verifying a certificate chain for the trusted server. At block 3105, process logic extracts the public root key (PK_RK) from the certificate, and verifies the extracted PK_RK with a PK_RK previously sent by the DP accelerator, to certify that the DP accelerator is indeed the DP accelerator it is claiming to be. At block 3106, processing logic establishes a secure channel with the DP accelerator using the PK_RK based on the verification to exchange data securely between the host system and the DP accelerator.

In one embodiment, the DP accelerator includes one or more execution units operable to perform data processing operations on behalf of an application hosted within the host system. In one embodiment, the predetermined trusted server is associated with a provider of the application. In one embodiment, the predetermined trusted server is associated with a provider of the DP accelerator. In one embodiment, the PK_RK is further utilized to verify a signature generated for the DP accelerator.

In another embodiment, the PK_RK is utilized by the host system to establish a session key associated with a communication session between the host system and the DP accelerator. In another embodiment, the PK_RK is utilized by the host system to verify a signature for a public attestation key to attest a kernel object stored in the DP accelerator.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 32:
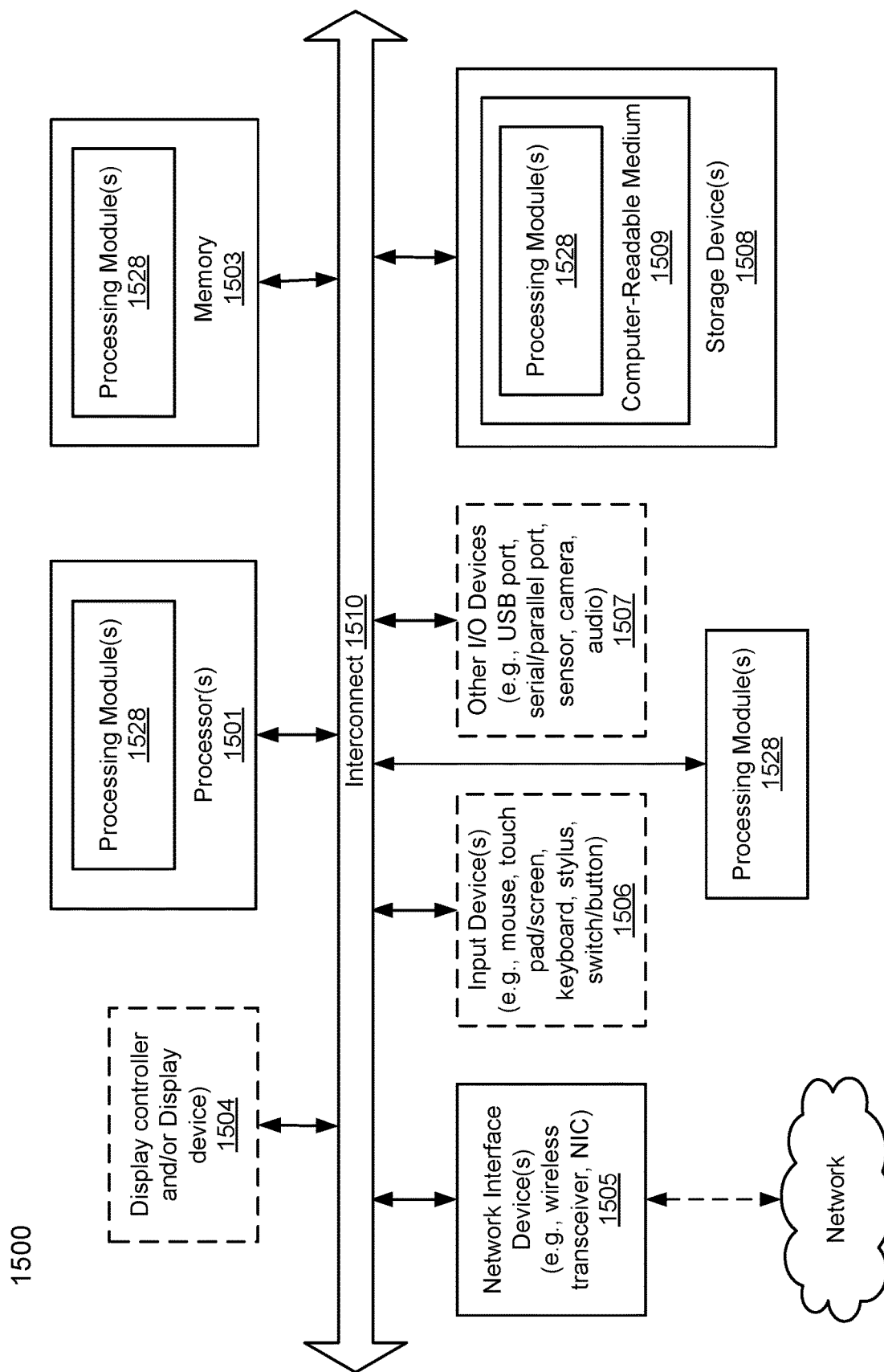
FIG. 32 is a block diagram illustrating a data processing system according to one embodiment.

FIG. 32 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102, and server 104, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device (s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104 of FIG. 2, runtime libraries 205 of FIG. 2, DP accelerator 405 of FIG. 4, IO manager 401 or IO interface 415 of FIG. 4, HCM 901 or ACM 915 of FIGS. 9 and 14, and MM 1701 of FIG. 17, security unit 1020 and time unit 2003 of FIG. 20, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term. "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for generating a session key for a secure channel between a host system and a data processing (DP) accelerator, the method comprising:
   in response to receiving a temporary public key (PK_d) from the DP accelerator, generating a first nonce (nc) at the host system, wherein the DP accelerator is coupled to the host system over a bus;
   transmitting a request to create a session key from the host system to the DP accelerator, the request including a host public key (PK_O) and the first nonce;
   receiving a second nonce (ns) from the DP accelerator, wherein the second nonce is encrypted using the host public key and a temporary private key (SK_d) corresponding to the temporary public key; and
   generating a first session key based on the first nonce and the second nonce, which is utilized to encrypt or decrypt subsequent data exchanges between the host system and the DP accelerator.

2. The method of claim 1, further comprising transmitting a request from the host system to the DP accelerator to request the DP accelerator to generate a temporary key pair having the temporary public key and the temporary private key, wherein the DP accelerator created the temporary key pair in response to the request to generate the temporary key pair.

3. The method of claim 1, wherein the temporary public key from the DP accelerator is a first temporary public key, wherein the method further comprises receiving an encrypted temporary public key that has been encrypted using an accelerator private root key (SK_RK) by the DP accelerator.

4. The method of claim 3, further comprising:
   decrypting the encrypted temporary public key using an accelerator public root key (PK_RK) corresponding to the accelerator private root key to recover a second temporary public key; and
   verifying whether the first temporary public key and the second temporary public key are identical, wherein the first nonce is generated when the first and second temporary public keys are identical.

5. The method of claim 1, wherein receiving a second nonce from the DP accelerator comprises receiving the first nonce and the second nonce that have been encrypted using the temporary private key corresponding to the temporary public key.

6. The method of claim 5, further comprising decrypting the encrypted first nonce and second nonce using the temporary public key at the host system to recover the first nonce and the second nonce.

7. The method of claim 5, wherein the first nonce and the second nonce encrypted by the temporary private key are further encrypted using the host public key by the DP accelerator.

8. The method of claim 7, further comprising decrypting the encrypted first nonce and second nonce using a host private key corresponding to the host public key to recover the first nonce and the second nonce.

9. A non-transitory machine-readable medium having instructions stored therein, which when executed by a processor, cause the processor to perform operations, the operations comprising:
   in response to receiving a temporary public key from a data processing (DP) accelerator, generating a first nonce at a host system, wherein the DP accelerator is coupled to the host system over a bus;
   transmitting a request to create a session key from the host system to the DP accelerator, the request including a host public key and the first nonce;
   receiving a second nonce from the DP accelerator, wherein the second nonce is encrypted using the host public key and a temporary private key corresponding to the temporary public key; and
   generating a first session key based on the first nonce and the second nonce, which is utilized to encrypt or decrypt subsequent data exchanges between the host system and the DP accelerator.

10. The machine-readable medium of claim 9, wherein the operations further comprise transmitting a request from the host system to the DP accelerator to request the DP accelerator to generate a temporary key pair having the temporary public key and the temporary private key, wherein the DP accelerator created the temporary key pair in response to the request to generate the temporary key pair.

11. The machine-readable medium of claim 9, wherein the temporary public key from the DP accelerator is a first temporary public key, wherein the operations further comprises receiving an encrypted temporary public key that has been encrypted using an accelerator private root key by the DP accelerator.

12. The machine-readable medium of claim 11, wherein the operations further comprise:
   decrypting the encrypted temporary public key using an accelerator public root key corresponding to the accelerator private root key to recover a second temporary public key; and
   verifying whether the first temporary public key and the second temporary public key are identical, wherein the first nonce is generated when the first and second temporary public keys are identical.

13. The machine-readable medium of claim 9, wherein receiving the second nonce from the DP accelerator comprises receiving the first nonce and the second nonce that have been encrypted using the temporary private key corresponding to the temporary public key.

14. The machine-readable medium of claim 13, wherein the operations further comprise decrypting the encrypted first nonce and second nonce using the temporary public key at the host system to recover the first nonce and the second nonce.

15. The machine-readable medium of claim 13, wherein the first nonce and the second nonce encrypted by the temporary private key are further encrypted using the host public key by the DP accelerator.

16. The machine-readable medium of claim 15, wherein the operations further comprise decrypting the encrypted first nonce and second nonce using a host private key corresponding to the host public key to recover the first nonce and the second nonce.

17. A computer-implemented method for generating a session key for a secure channel between a host system and a data processing (DP) accelerator, the method comprising:
   in response to a request received from the host system, generating, at the data processing (DP) accelerator, a temporary private key and a temporary public key, wherein the DP accelerator is coupled to the host system over a bus;
   encrypting the temporary public key using an accelerator private root key associated with the DP accelerator;
   transmitting the temporary public key in an unencrypted form and the encrypted temporary public key to the host system to allow the host system to verify the temporary public key;
   receiving a first nonce from the host system, wherein the first nonce was generated by the host system after the temporary public key has been verified; and
   generating a session key based on the first nonce and a second nonce, wherein the second nonce has been generated locally at the DP accelerator.

18. The method of claim 17, further comprising:
   encrypting the first nonce and the second nonce using the temporary private key to generate encrypted first nonce and second nonce; and
   transmitting the encrypted first nonce and second nonce to the host system to enable the host system to create a corresponding host session key.

19. The method of claim 18, further comprising encrypting the encrypted first nonce and second nonce using a host public key associated with the host system, prior to transmitting the encrypted first nonce and second nonce.

20. The method of claim 19, wherein the host system is configured to decrypt the encrypted first nonce and second nonce using a host private key associated with the host system and the temporary public key to recover the first nonce and the second nonce.

21. The method of claim 18, wherein the host system is configured to verify freshness of the first nonce, wherein the host session key is generated only if the first nonce was generated within a predetermined period of time.

* * * * *